(12) United States Patent
Ichihara et al.

(10) Patent No.: US 8,847,751 B2
(45) Date of Patent: Sep. 30, 2014

(54) LINE STATUS DETECTION APPARATUS, COMMUNICATION APPARATUS, AND LINE STATUS DETECTION METHOD

(75) Inventors: Fumio Ichihara, Fukuoka (JP); Akihiro Yamashita, Saga (JP); Hidekazu Matsunobu, Fukuoka (JP); Nobutaka Kodama, Fukuoka (JP); Masahiro Maki, Fukuoka (JP); Tsunehiro Hanada, Fukuoka (JP); Yuji Igata, Fukuoka (JP); Toshiyuki Wakisaka, Fukuoka (JP); Kazuaki Kusune, Fukuoka (JP); Mutsuhiko Oishi, Fukuoka (JP); Ryota Yukizane, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1595 days.

(21) Appl. No.: 11/722,502

(22) PCT Filed: Dec. 22, 2005

(86) PCT No.: PCT/JP2005/024189
§ 371 (c)(1),
(2), (4) Date: Jun. 21, 2007

(87) PCT Pub. No.: WO2006/068327
PCT Pub. Date: Jun. 29, 2006

(65) Prior Publication Data
US 2008/0107242 A1    May 8, 2008

(30) Foreign Application Priority Data

Dec. 24, 2004 (JP) ................................. 2004-373508
Dec. 28, 2004 (JP) ................................. 2004-378960
Dec. 28, 2004 (JP) ................................. 2004-380465

(51) Int. Cl.
*H04Q 1/30* (2006.01)
*H04B 3/04* (2006.01)
*H04B 3/54* (2006.01)

(52) U.S. Cl.
CPC .......... *H04B 3/54* (2013.01); *H04B 2203/5416* (2013.01); *H04B 2203/5483* (2013.01); *H04B 2203/5445* (2013.01); *H04B 2203/5408* (2013.01); *H04B 2203/5491* (2013.01); *H04B 2203/5495* (2013.01); *H04B 3/04* (2013.01)
USPC .................. 340/538.13; 340/12.35; 340/538; 340/12.32; 375/278

(58) Field of Classification Search
USPC ......... 375/346, 285, 221, 222, 254, 278, 284, 375/296; 370/241, 484–486, 491, 432, 437, 370/503, 509; 340/12.32–12.39
See application file for complete search history.

(56) References Cited

U.S. PATENT DOCUMENTS 4,218,655 A * 8/1980 Johnston et al. ................. 455/39
4,328,590 A * 5/1982 Lee ............................... 455/203

(Continued)

FOREIGN PATENT DOCUMENTS

| EP | 1411645 | 4/2004 |
|----|---------|--------|
| JP | 2-261232 | 10/1990 |
| JP | 2000-165304 | 6/2000 |
| JP | 2001-168821 | 6/2001 |

(Continued)

OTHER PUBLICATIONS

Office Action for JP 2004-378960 dated Oct. 12, 2010 with English Translation of relevant portion.

(Continued)

*Primary Examiner* — Nabil Syed
*Assistant Examiner* — Nay Tun
(74) *Attorney, Agent, or Firm* — Seed IP Law Group PLLC

(57) ABSTRACT

A first communication apparatus 100 transmits a pilot signal which was generated by a pilot signal generation section 14, at predetermined timing, and detects an unbalance component of a transmission line 300 at the time of pilot signal transmission in an unbalance component detection section 13, and controls a transmission signal in such a manner that an unbalance component is reduced by a transmission control section 12 on the basis of the detected unbalance component.

17 Claims, 37 Drawing Sheets

(56) References Cited

U.S. PATENT DOCUMENTS

| | | | |
|---|---|---|---|
| 5,991,269 A * | 11/1999 | Williamson et al. | 370/241 |
| 6,574,310 B1 * | 6/2003 | Hartman et al. | 379/21 |
| 2002/0159548 A1 * | 10/2002 | Evans et al. | 375/346 |
| 2002/0172329 A1 * | 11/2002 | Rashid-Farrokhi et al. | 379/22.02 |
| 2003/0095591 A1 * | 5/2003 | Rekai et al. | 375/225 |
| 2003/0123414 A1 * | 7/2003 | Tong et al. | 370/337 |
| 2003/0156014 A1 * | 8/2003 | Kodama et al. | 340/310.01 |
| 2004/0057529 A1 | 3/2004 | Koga | |
| 2004/0131123 A1 * | 7/2004 | Maki et al. | 375/257 |
| 2005/0152409 A1 * | 7/2005 | Zhao et al. | 370/535 |

FOREIGN PATENT DOCUMENTS

| | | |
|---|---|---|
| JP | 2004140565 | 5/2004 |
| JP | 2004-166217 | 6/2004 |
| WO | 2004/075502 | 9/2004 |
| WO | 2005117384 | 12/2005 |

OTHER PUBLICATIONS

Office Action for JP 2004-380465 dated Aug. 31, 2010 with English Translation of relevant portion.
Office Action for JP 2004-373508 dated Aug. 31, 2010 with English Translation of relevant portion.
International Search Report dated Mar. 13, 2006.

* cited by examiner

TRANSMISSION CARRIER

UNBALANCE COMPONENT
MEASUREMENT VALUE
BEFORE CONTROL

DETECTION VALUE
DUE TO FFT

TRANSMISSION CARRIER
AFTER CONTROL

UNBALANCE COMPONENT
MEASUREMENT VALUE
AFTER CONTROL

TRANSMISSION CARRIER

UNBALANCE COMPONENT
MEASUREMENT VALUE
BEFORE CONTROL

DETECTION VALUE
DUE TO FFT

THRESHOLD VALUE A
THRESHOLD VALUE B

FFT NUMBER  0  1  ...  X  ...  99

TRANSMISSION CARRIER
AFTER CONTROL

UNBALANCE COMPONENT
MEASUREMENT VALUE
AFTER CONTROL

TRANSMISSION CARRIER

UNBALANCE COMPONENT MEASUREMENT VALUE BEFORE CONTROL

DETECTION VALUE DUE TO FFT    THRESHOLD VALUE A
THRESHOLD VALUE B

FFT NUMBER

TRANSMISSION CARRIER AFTER CONTROL

UNBALANCE COMPONENT MEASUREMENT VALUE AFTER CONTROL

TRANSMISSION CARRIER

UNBALANCE COMPONENT
MEASUREMENT VALUE
BEFORE CONTROL

DETECTION VALUE
DUE TO FFT

THRESHOLD VALUE A
THRESHOLD VALUE B

FFT NUMBER

TRANSMISSION CARRIER
AFTER CONTROL

UNBALANCE COMPONENT
MEASUREMENT VALUE
AFTER CONTROL

TRANSMISSION CARRIER

UNBALANCE COMPONENT MEASUREMENT VALUE BEFORE CONTROL

DETECTION VALUE DUE TO FFT   THRESHOLD VALUE A
THRESHOLD VALUE B

TRANSMISSION CARRIER AFTER CONTROL

UNBALANCE COMPONENT MEASUREMENT VALUE AFTER CONTROL

LINE STATUS DETECTION APPARATUS, COMMUNICATION APPARATUS, AND LINE STATUS DETECTION METHOD

TECHNICAL FIELD

This invention relates to a line status detection apparatus which detects a status of a transmission line in a balance communication system for carrying out data transmission by use of a pair of conductors, and a communication apparatus which is equipped with this, and a line status detection method.

BACKGROUND ART

Conventionally, a balance communication system for carrying out data transmission by use of a pair of transmission lines which are in a balanced status has been used widely. In this kind of the balance communication system, there are many cases in which a transmission line by use of a dedicated communication line etc. such as a telephone line, is used, and normally, a certain level of balancing is kept, One example of a transmission section and a transmission line of a conventional balance transmission apparatus is shown in FIG. 28. This balance transmission apparatus is configured so as to send out a signal from a transmission section 91 to a transmission line which is composed of a pair of conductors W1, W2, through a transmission transformer T92. At this time, a current of a transmission signal which is sent out from the transmission section 91 is dependent on characteristics of the transmission section 91 and the transmission lines W1, W2.

It is required that a transmission line leading from a transmission section to a reception section is completely balanced by nature, but in a practical sense, there are unbalance elements in the transmission section and the reception section, and unbalance components etc. due to a status of wiring on a transmission path and a device which is connected in midstream, and an actual condition is that it is not possible to say that currents, which flow through the conductors W1; W2 as the transmission line, are balanced completely. In this manner, when a current flowing through a transmission line is unbalanced, a part of electric power is leaked from the transmission line to outside, and there occur such problem that a transmission characteristic of data is deteriorated and interference is generated, and so on.

In recent days, such a balance communication system that a high frequency signal is overlapped with an electric power line for feeding electric power such as a commercial power source to carry out data transmission has been proposed. Especially, the suchlike electric power line is not a communication line by nature, and therefore, there is such a case that balancing fluctuates, depending on a wiring status in individual house, a device which is connected to a power source, and so on. On this account, there is such fear that, in case that an electric power line is used as a transmission line, balancing is changed by individual environments, and a transmission characteristic differs substantially.

Patent Document 1 describes a balance transmission apparatus which detects an unbalance component from a voltage or current of a conductor on a transmission side or a reception side, and carries out transmission control in such a manner that the detected unbalance component gets smaller.

However, Patent Document 1 does not describe about a concrete method for detecting an unbalance component.

[Patent Document 1] JP-A-2004-140565 publication

DISCLOSURE OF INVENTION

The invention is made in view of the above-described circumstances, and aims to provide a line status detection apparatus or a line status detection method which enables detecting a balance status of a transmission line in a balance communication system, easily with high accuracy.

In addition, the invention aims to provide a communication apparatus of a balance communication system which can control a balance status of a transmission line on the basis of a detection result, and enables improving balancing.

A line status detection apparatus of the invention is a line status detection apparatus which detects a status of a transmission line in a balance communication system for carrying out data transmission by use of a pair of conductors, and is a thing which is equipped with an unbalance component detection section which detects an unbalance component between the above-described pair of conductors, and in which the above-described unbalance component detection section detects the above-described unbalance component on the basis of a status of the above-described pair of conductors at the time of transmitting a pilot signal for detecting the above-described unbalance component.

According to the invention, it is possible to utilize such a thing that its features (level, quality etc.) have been already known, as a pilot signal which is transmitted through a transmission line, and therefore, it is possible to detect a balance status of a transmission line in a balance communication system easily with high accuracy.

A line status detection apparatus of the invention includes such a thing that the above-described unbalance component detects an unbalance component between the above-described pair of conductors, directly.

A line status detection apparatus of the invention includes such a thing that the above-described unbalance component detection section detects a current flowing through the above-described conductor or a voltage of the above-described conductor or both of them, and calculates a difference of current with respect to each conductor or a difference of voltages with respect to each conductor, to calculate the above-described unbalance component.

A line status detection apparatus of the invention includes such a thing that the above-described pair of conductors are electric power lines.

A line status detection apparatus of the invention includes such a thing that the above-described pilot signal is a single carrier signal in which a signal level is known.

A line status detection apparatus of the invention includes such a thing that the above-described pilot signal is a single carrier signal in which a signal level is known and which is swept across a communication frequency band. According to the invention, it is possible to surely detect a balance status of an entire communication band.

A line status detection apparatus of the invention includes such a thing that the above-described pilot signal is a signal which frequency is different with respect to each communication frame. According to the invention, it is possible to detect a balance status of a transmission line without enlarging an influence to communication, and it is possible to heighten a data transmission rate. Meanwhile, here, a pilot signal for detecting an unbalance component is not limited to the single carrier signal.

A line status detection apparatus of the invention includes such a thing that the above-described pilot signal is all carrier signals which are used in a communication frequency band and in which a data transmission rate is known. According to the invention, it is possible to simultaneously detect balance statuses in necessary frequency bands, at short times.

A line status detection apparatus of the invention includes such a thing that adjacent carrier signals among the above-described plurality of carrier signals are signals which are orthogonal each other. According to the invention, a plurality of carrier signals do not interfere with each other, and an amplitude of a pilot signal becomes large. Therefore, it is possible to detect a balance status of a transmission line without giving a large influence to transmission of data.

A line status detection apparatus of the invention includes such a thing that the above-described pilot signal is a plurality of carrier signals which were selected discretely among all carrier signals which are used in a communication frequency band and in each of which a signal level is known. According to the invention, it is possible to detect a balance status of an entire communication band by use of less number of carriers, at short times. In addition, since it is possible to avoid frequency in which there is known disturbance, it is possible to improve detection accuracy of a balance status.

A line status detection apparatus of the invention includes a thing which is equipped with a calculation section which calculates the above-described unbalance component of a communication band of frequency other than frequency of the above-described pilot signal, on the basis of an output of the above-described unbalance component detection section.

A line status detection apparatus of the invention includes such a thing that the above-described calculation section calculates the above-described unbalance component of a communication band of frequency other than frequency of the above-described pilot signal, by arithmetic average of outputs in adjacent frequency bands among outputs of the above-described unbalance component detection section.

A line status detection apparatus of the invention includes such a thing that the above-described calculation section calculates the above-described unbalance component of a communication band of frequency other than frequency of the above-described pilot signal, by weighting of outputs in adjacent frequency bands among outputs of the above-described unbalance component detection section.

A line status detection apparatus of the invention includes such a thing that the above-described substitutes the above-described unbalance component which is obtained from the above-described pilot signal in the most adjacent frequency band, for the above-described unbalance component outside a frequency band which is outputted by the above-described unbalance component detection section.

A line status detection apparatus of the invention includes such a thing that the above-described pilot signal is a first carrier signal that is a plurality of carrier signals which are used in a communication frequency band and in which a signal level is known, and is a single carrier signal with specific frequency in which a signal level to be further transmitted is known, after it was transmitted as the above-described first pilot signal. According to the invention, it is possible to detect a balance status of an entire communication band at short times, and to detect a status of a specific frequency band with high accuracy.

A line status detection apparatus of the invention includes such a thing that the above-described single carrier signal with specific frequency is a carrier signal which was detected by utilizing the above-described first carrier signal and in which an unbalance component is large. According to the invention, monitoring of a balance status with high accuracy becomes possible. For example, after a frequency band having high necessity of monitoring a balance status was extracted by detecting a balance status of an entire communication band, it is possible to detect change of the balance status only by monitoring of that frequency band.

A line status detection apparatus of the invention includes such a thing that the above-described pilot signal is transmitted during a period of transmission stop of data to be transmitted. According to the invention, even during a period of communication or a period of communication stop, it is possible to detect a balance status by the same method.

A line status detection apparatus of the invention includes such a thing that the above-described pilot signal is included in a part of or a plurality of portions of signal strings of data to be transmitted. According to the invention, detection of a balance status during a period of communication becomes possible without allocating special detection time.

A line status detection apparatus of the invention includes such a thing that the above-described pilot signal is transmitted within a given length of time from a reference timing signal which is common to a communication system. According to the invention, it is possible to easily recognize processing timing for balance status detection.

A line status detection apparatus of the invention includes such a thing that the above-described pilot signal is transmitted in a time-division multiplex, at timing which corresponds to each communication apparatus that configures the communication system, within a given length of time from a reference timing signal which is common to a communication system. According to the invention, it is possible to easily recognize processing timing for balance status detection, with respect to each communication apparatus.

A line status detection apparatus of the invention includes such a thing that the above-described pilot signal is allocated with respect to each communication apparatus which configures the communication system, and allocated respective pilot signals are transmitted in communication frequency bands and band which are different from each other. According to the invention, it is possible to simultaneously detect pilot signals at a plurality of terminals.

A line status detection apparatus of the invention includes such a thing that the above-described pilot signal is an AGC reference signal which is transmitted for AGC (Auto Gain Control) on a reception side. According to the invention, the AGC reference signal, which is a reference signal to be inserted for determining an operation point of AGC, is used as a pilot signal for detecting the above-described unbalance component, and therefore, means for preparing a signal for detection becomes unnecessary. In addition, time for pilot signal transmission becomes unnecessary, and a data transmission rate is improved.

A line status detection apparatus of the invention includes such a thing that the above-described pilot signal is a characteristic estimation reference signal for estimating a transmission characteristic of a transmission line. According to the invention, the characteristic estimation reference signal, which is a reference signal for determining a usable band that is suitable for communication by estimating a transmission characteristic of a transmission line, is used as a pilot signal for detecting the above-described unbalance component, and therefore, means for preparing a signal for detection becomes unnecessary. In addition, time for pilot signal transmission becomes unnecessary, and a data transmission rate is improved.

A line status detection apparatus of the invention includes such a thing that the above-described pilot signal is a demodulation reference signal for demodulation on a reception side. According to the invention, the demodulation reference signal, which is a reference signal to be inserted for demodulation synchronization, is used as a pilot signal for detecting the above-described unbalance component, and therefore, means for preparing a signal for detection becomes unnecessary. In addition, time for pilot signal transmission becomes unnecessary, and a data transmission rate is improved.

a line status detection apparatus of the invention includes such a thing that the above-described pilot signal is a header signal which shows a head of a communication signal. According to the invention, the header signal, which is inserted for showing a head of a communication signal, is used as a pilot signal for detecting the above-described unbalance component, and therefore, means for preparing a signal for detection becomes unnecessary. In addition, time for pilot signal transmission becomes unnecessary, and a data transmission rate is improved.

A line status detection apparatus of the invention includes such a thing that the above-described pilot signal is transmitted at a zero cross point of a commercial power source or in the vicinity thereof. According to the invention, in case that an electric power line is used as a transmission line, it is possible to surely detect an influence of a device with a rectifier which is connected to that electric power line, especially a device with a half-wave rectifier.

A line status detection apparatus of the invention includes such a thing that the above-described pilot signal is transmitted with phase which becomes 90 degrees from a zero cross point of a commercial power source or in the vicinity thereof or phase which becomes −90 degrees from the above-described zero cross point or in the vicinity thereof.

A line status detection apparatus of the invention includes such a thing that the above-described pilot signal is transmitted within a given length of time from a zero cross point of a commercial power source. According to the invention, it is possible to transmit a pilot signal for a plurality of communication apparatuses, without utilizing a reference timing signal.

A communication apparatus of the invention is a communication apparatus which is used in a balance communication system for carrying out data transmission by use of a pair of conductors, and equipped with a transmission section which transmits a transmission signal including the above-described pilot signal, and a transmission occasion line status detection apparatus which is composed of the above-described line status detection apparatus, and is of such a thing that the above-described unbalance component detection section in the above-described transmission occasion line status detection apparatus detects the above-described unbalance component on the basis of a status of the above-described pair of conductors at the time of transmission of the above-described pilot signal which is transmitted from the above-described transmission section.

A communication apparatus of the invention includes a thing which is equipped with a transmission signal control section that controls a transmission signal to be outputted to the above-described conductor, on the basis of an output of the above-described transmission side line status detection apparatus.

A communication apparatus of the invention includes such a thing that the above-described transmission signal control section carries out control for reducing an unbalance component of the above-described transmission line.

A communication apparatus of the invention includes such a thing that the above-described transmission signal control section controls electric power of the above-described transmission signal.

A communication apparatus of the invention includes such a thing that the above-described transmission signal control section carries out selection of carriers which are utilized for communication.

A communication apparatus of the invention is a communication apparatus which is used in a balance communication system for carrying out data transmission by use of a pair of conductors, and includes a thing which is equipped with a reception occasion line status detection apparatus that is composed of the above-described line status detection apparatus, and in which the above-described unbalance component detection section detects the above-described unbalance component on the basis of a status of the above-described pair of conductors at the time of transmission of the above-described pilot signal to be transmitted from another communication apparatus.

A communication apparatus of the invention includes a thing which is equipped with a transmission signal control section that controls a transmission signal to be outputted to the above-descried conductor, on the basis of an output of the above-described reception occasion line status detection apparatus.

A communication apparatus of the invention includes such a thing that the above-described transmission signal control section carries out control for reducing an unbalance component of the above-described transmission line.

A communication apparatus of the invention includes such a thing that the above-described transmission signal control section controls electric power of the above-described transmission signal.

A communication apparatus of the invention includes such a thing that the above-described transmission signal control section carries out selection of carriers which are used for communication.

A transmission system of the invention is a balance communication system which carries out data transmission by use of a pair of conductors, an is a thing which is equipped with a communication including the above-described transmission occasion line status detection apparatus.

A transmission system of the invention is a thing which is further equipped with a communication apparatus including the above-described reception occasion line status detection apparatus.

A communication method of the invention is a communication method for carrying out data transmission by use of a pair of conductors, and a thing which is equipped with a process for transmitting a pilot signal for detecting an unbalance component between the above-described pair of conductors, and a process for detecting the above-described unbalance component on the basis of a status of the above-described pair of conductors at the time of transmitting the above-described pilot signal.

As apparent from the above-described explanations, according to the invention, it is possible to provide a line status detection apparatus or a line status detection method which enables detecting a balance status of a transmission line in a balance communication system easily with high accuracy. In addition, it is possible to provide a communication apparatus which can control a balance status of a transmission line on the basis of a detection result, and enables improving balancing.

BEST MODE FOR CARRYING OUT THE INVENTION

Hereinafter, embodiments of the invention will be described by use of drawings.

Figure 1:
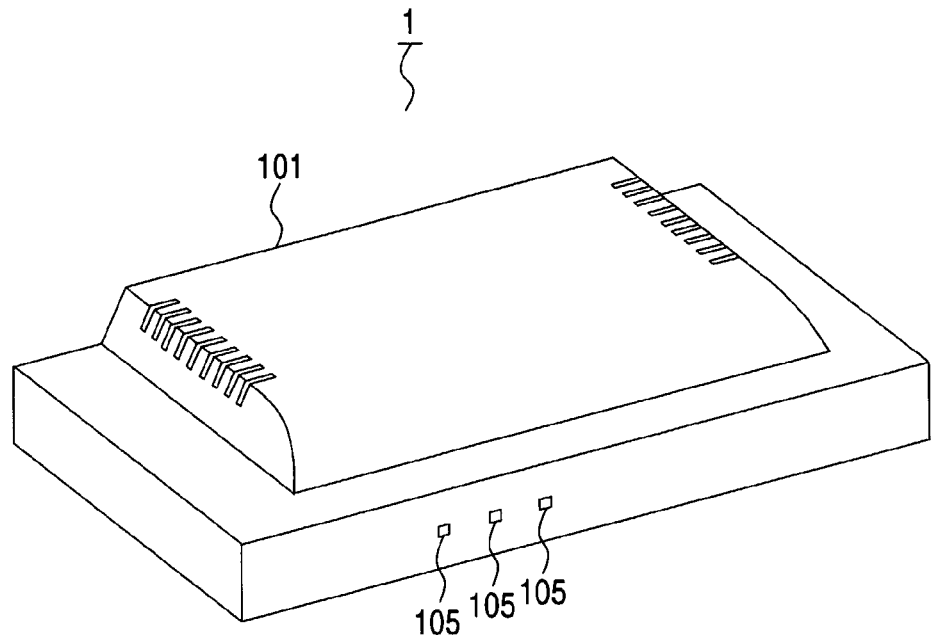
FIG. 1 is an external appearance perspective view which shows a front view of a communication apparatus.
Figure 2:
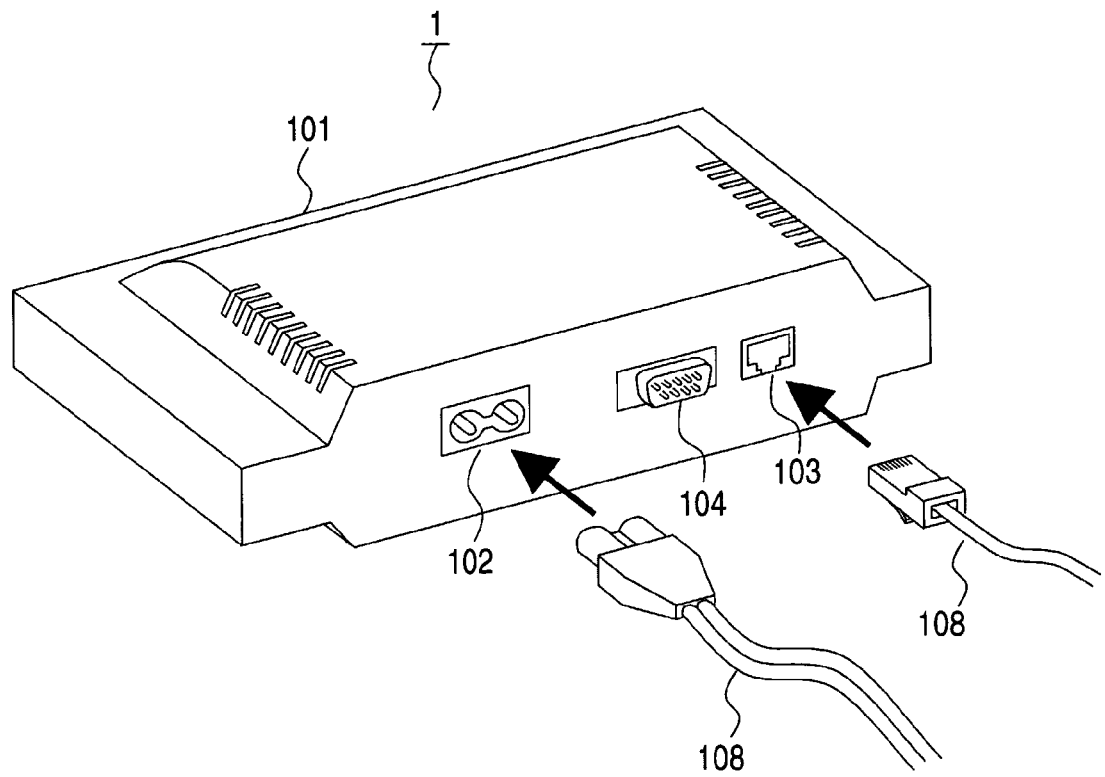
FIG. 2 is an external appearance perspective view which shows a back view of the communication apparatus.

FIG. 1 is an external appearance perspective view which shows a front view of a communication apparatus, and FIG. 2 is an external appearance perspective view which shows a back view of the communication apparatus. A communication apparatus 100 (200; see, FIG. 3) in this embodiment is a modem as shown in FIGS. 1 and 2. The communication apparatus 100 has a housing 101. On a front of the housing 101, a display section 105 such as LED (Light Emitting Diode) is disposed as shown in FIG. 1. On a back of the housing 101, a power connector 102, a LAN (Local Area Network) modular jack 103 such as RJ45, and a D-sub connector 104 are disposed as shown in FIG. 2. To the power connector 102, a pair of transmission lines 31, 32 (a transmission line 300 which will be described later), which are electric power lines such as a parallel cable, are connected as shown in FIG. 2. To the modular jack 103, a LAN cable 109 is connected. To the D-sub connector 104, a D-sub cable, which is not shown in the figure, is connected. Meanwhile, as one example of the communication apparatus, the model in FIGS. 1 and 2 was shown but there is particularly no need to limit it to a modem, and it is also all right even if the communication apparatus is an electric device which is equipped with a modem (e.g., a household electric appliance such as TV).

Figure 3:
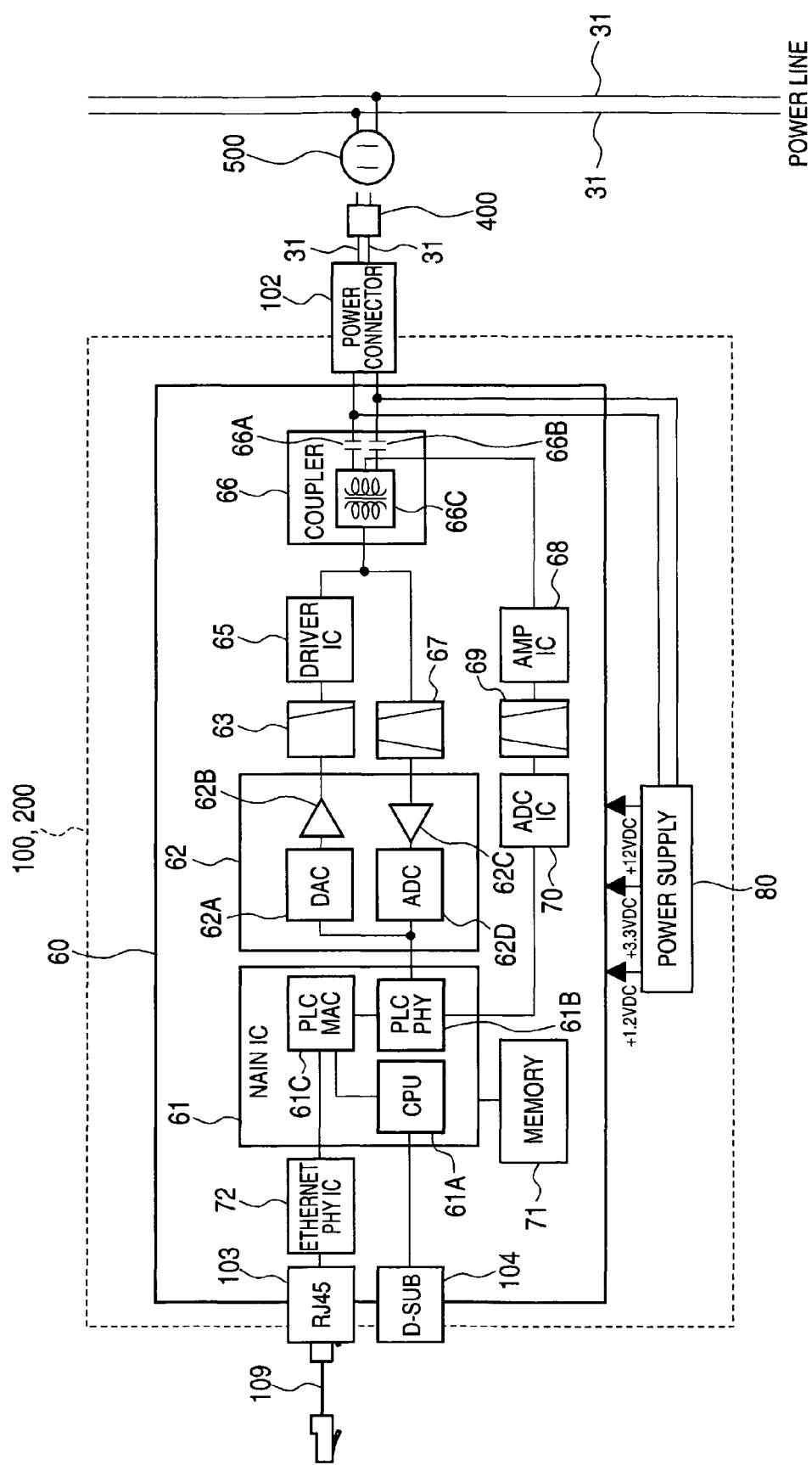
FIG. 3 is a block diagram which shows one example of hardware of the communication apparatus.

FIG. 3 is a block diagram which shows one example of hardware of the communication apparatus. The communication apparatus 100 has a circuit module 60 and a switching power supply 80 as shown in FIG. 3. The switching power supply 80 supplies various voltages (e.g., +1.2V, +3.3V, +12V) to the circuit module 60. In the circuit module 60, a main IC 61, an AFE IC (Analog Front End IC) 62, a low pass filter 63, a driver IC 65, a coupler 66, a band pass filter 67, an AMP (amplifier) IC 68, a band pass filter 69, an ADC (AD Conversion) IC 70, a memory 71, and an Ethernet PHY IC 72 are disposed. The power connector 102 is connected to the pair of transmission lines 31, 32 through a plug 400 and a socket 500.

The main IC 61 is configured by CPU (Central Processing Unit) 61A, a PLC MAC (Power Line Communication Media Access Control layer) block 61C, and a PLC PHY (Power Line Communication Physical layer) block 61B. A 32 bit RISC (Reduced Instruction Set Computer) processor is mounted on CPU 61A. The PLC MAC block 61C manages a MAC layer of a transmission signal, and the PLC PHY block 61B manages a PHY layer of the transmission signal. The AFE IC 62 is configured by a DA converter (DAC) 62A, an AD converter (ADC) 62D, and variable amplifiers (VGA) 62B, 62C. The coupler 66 is configured by a coil transformer 66C and coupling capacitors 66A, 66B.

First Embodiment

Figure 4:
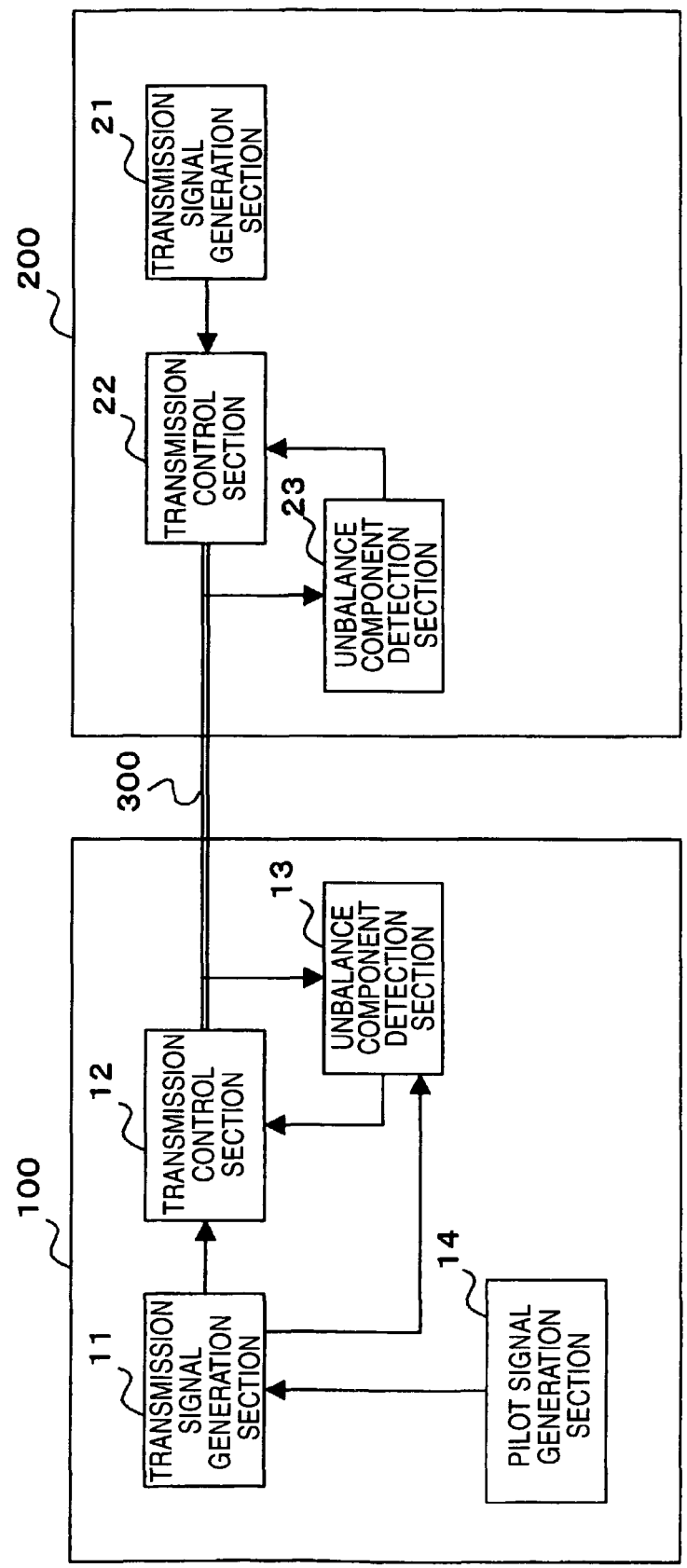
FIG. 4 is a view which shows a schematic configuration of one example of a balance communication system for explaining.

FIG. 4 shows a schematic configuration of one example of a balance communication system for explaining a first embodiment of the invention. The balance communication system of FIG. 4 is a thing which carries out communication between the first communication apparatus 100 and the second communication apparatus 200, through a transmission line 300 which is composed of a pair of conductors such as power lines.

The first communication apparatus 1 is configured by including a transmission signal generation section 11, a transmission control section 12, an unbalance component detection section 13 and a pilot signal generation section 14. The second communication apparatus 200 is configured by including a transmission signal generation section 21, a transmission control section 22, and an unbalance component detection section 23. Meanwhile, FIG. 4 shows only elements which relates to transmission of signals, and omits to show other elements such as elements etc. which relates to reception of signals. In addition, only two communication apparatuses of the first communication apparatus and the second communication apparatus are connected to the transmission line, but there is also such a case that another communication apparatus is connected thereto. A plurality of communication apparatuses, which are connected to the transmission line 300 may be the first communication apparatus 100 or the second communication apparatus 200, but at least one communication apparatus is the first communication apparatus 100.

Meanwhile, the transmission signal generation sections 11, 21, and the pilot signal generation section 14 are realized by the main IC 61 shown in FIG. 3. The transmission control sections 12, 22 are realized by the AFE IC 62 shown in FIG.

3. The unbalance component detection sections 13, 23 are realized by the AMP IC 68, the band pass filter 69, and the ADC IC 70.

The transmission signal generation section 111 is a thing which generates a transmission signal to be transmitted through the transmission line 300, and a transmission signal (multi-carrier transmission signal) for carrying out transmission by use of a plurality of sub-carriers. A transmission system using a plurality of sub-carriers is, for example, an OFDM (Orthogonal Frequency Division Multiplexing) system utilizing wavelet transform. The transmission signal generation section 11 transmits a pilot signal which was generated by the pilot signal generation section 14, at the same time. Information of transmission timing etc. of a pilot signal is sent to the unbalance component detection section 13. Meanwhile, the pilot signal is a signal which is transmitted for detecting an unbalance component of a transmission line, and details will be described later.

The transmission control section 12 is a thing which controls a transmission signal that was generated by the transmission signal generation section 11, depending on a status of a transmission line, and for example, carries out balancing control of a transmission signal, and electric power control. These controls are control for reducing an unbalance component of the transmission line 300 (an unbalance component between a pair of conductors which configure the transmission line 300) which was detected by the unbalance component detection section 13.

Figure 5:
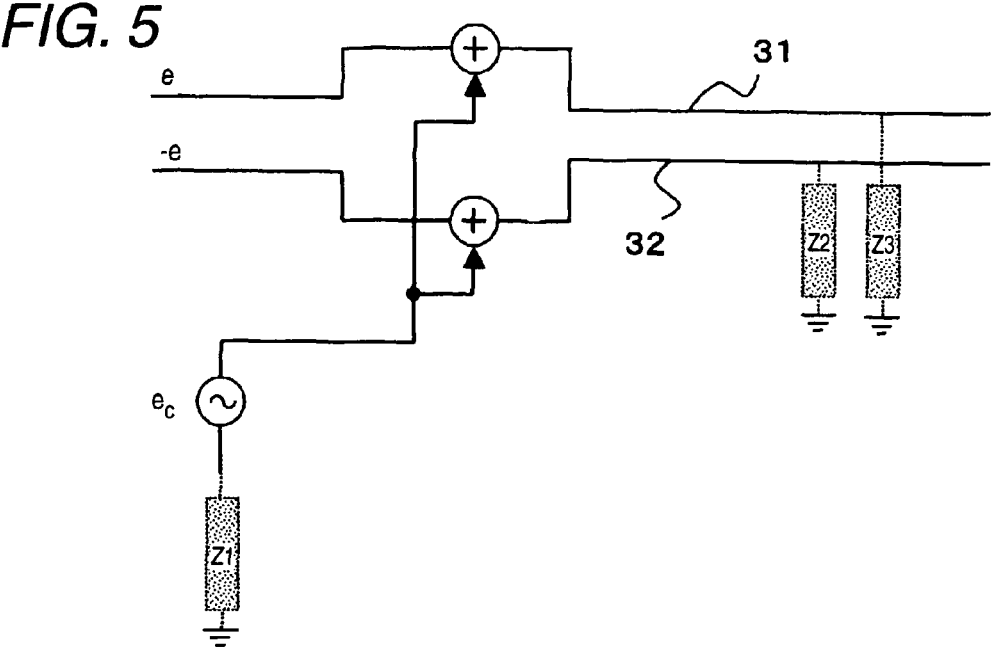
FIG. 5 is a view which shows one example of balancing control in the balance communication system for explaining the first embodiment of the invention.

In case of carrying out balancing control of a transmission signal, for example, a compensation signal, which was calculated on the basis of an unbalance component, is added to a pair of transmission signals, respectively. FIG. 5 is a conceptual view of one example of balancing control. In FIG. 5, transmission signals e, –e coming from the transmission signal generation section 11 are transmitted to the conductors 31, 32, respectively, after a compensation signal ec is added thereto. In addition, in case of carrying out electric power control of a transmission signal, for example, amplification levels of amplifiers (not shown in the figure), which were added to the pair of conductors 31, 32 of the transmission line 300, respectively, are controlled.

Meanwhile, the example of FIG. 4 is configured in such a manner that an unbalance component is reduced by control of the transmission control section 12, mainly by analog processing, but it is all right even if it is configured in such a manner that information of an unbalance component is sent to the transmission signal generation section 11 to generate a transmission signal in which an unbalance component was reduced by digital processing. In addition, it is also all right even if an unbalance component of the transmission line 300 is reduced by not using a sub-carrier in a frequency band in which an unbalance component is large.

Figure 6:
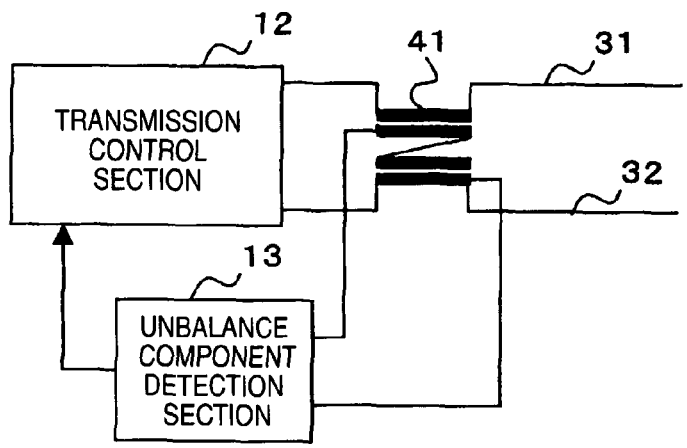
FIG. 6 is a view which shows a schematic configuration of one example of an unbalance component detection section in the balance communication system for explaining the first embodiment of the invention.

The unbalance component detection section 13 is a thing which detects an unbalance component between a pair of conductors which configure the transmission line 300, and detects an unbalance component at the time of transmitting a pilot signal. FIG. 6 shows a schematic configuration of one example of the unbalance component detection section 13. What is shown in FIG. 6 is a thing which detects an unbalance component between a pair of conductors directly, and the current transformer 41 is serially connected to the conductors 31, 32. When a secondary winding of the current transformer 42 is connected so as to detect currents of the conductors 31, 32 in an identical direction as shown in FIG. 6, a secondary winding current is to show an unbalance component between the conductors 31, 32. The unbalance component detection section 13 outputs an unbalance component signal between the conductors 31, 32 on the basis of this secondary winding current.

Figure 7:
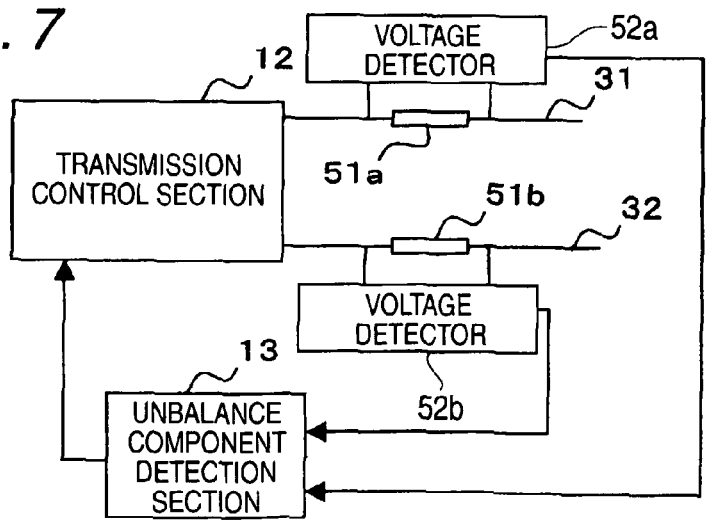
FIG. 7 is a view which shows a schematic configuration of another example of the unbalance component detection section in the baranco balance communication system for explaining the first embodiment of the invention.

FIG. 7 shows a schematic configuration of another example of the unbalance component detection section 13. What is shown in FIG. 7 is a thing which detects an unbalance component between a pair of conductors indirectly, and detects currents flowing through the conductors 31, 32 which configure a transmission line, separately, and obtains a difference of them to calculate an unbalance component.

The currents flowing through the conductors 31, 32 are obtained by detecting voltages at both ends of impedance 51a, 51b which were serially connected to the conductors 31, 32 through the use of voltage detectors 52a, 52b. The unbalance component detection section 13 outputs an unbalance component signal between the conductors 31, 32 on the basis of voltage values of the voltage detectors 52a, 52b. Meanwhile, in the example of FIG. 7, an unbalance component was calculated by obtaining a difference of currents flowing through the conductors 31, 32, but it is also possible to calculate it by detecting voltages of the conductors 31, 32 individually and obtaining its difference. In addition, it is all right even if both of a difference of currents and a difference of voltages are utilized. Meanwhile, the voltage detectors 52a, 52b are realized by the AMP IC 68, the band pass filter 69 and the ADC IC 70 shown in FIG. 3.

The pilot signal generation section 14 is a thing which generates a pilot signal to be transmitted to the transmission line 300 for the purpose of detecting an unbalance component of the transmission line 300. As to an unbalance component of the transmission line 300, since an unbalance component during a period of transmitting signals through the transmission line 300 is to be detected, it is desirable that signals during a period of transmission are of known and good quality ones. Concretely speaking, it is desirable that a frequency band spans across an entire band to be used, and features (level, quality etc.) of signals are known, and a normal communication operation is not prevented by transmitting a pilot signal. In addition, it is desirable that there is no need to add a special circuit etc. for generation of a pilot signal, and detection of an unbalance component is possible by short-time transmission, and further, it is possible to make transmission at appropriate cycles, and it can be changed depending on change of a status. A concrete example of a pilot signal will be described later.

The first communication apparatus 100 having the above-described configuration transmits a pilot signal which was generated by the pilot signal generation section 14, at predetermined timing, and detects an unbalance component of the transmission line 300 at the time of pilot signal transmission, in the unbalance component detection section 13, and controls a transmission signal in the transmission control section 12 on the basis of the detected unbalance component in such a manner that the unbalance component is reduced.

The transmission signal generation section 21, the transmission control section 22, and the unbalance component detection section 23 of the second communication apparatus are the same as the transmission signal generation section 11, the transmission control section 12, and the unbalance component detection section 13 of the first communication apparatus 100, and therefore, detail explanations will be omitted. In this regard, however, the unbalance component detection section 23 detects an unbalance component of the transmission line 300 during a period of receiving the above-described pilot signal. The transmission control section 22 controls a transmission signal from the transmission signal generation section 21 on the basis of the detected unbalance component.

Next, a type of a pilot signal which is generated by the pilot signal generation section 14, and signal timing of the pilot signal will be described.

Second Embodiment

Figure 8:
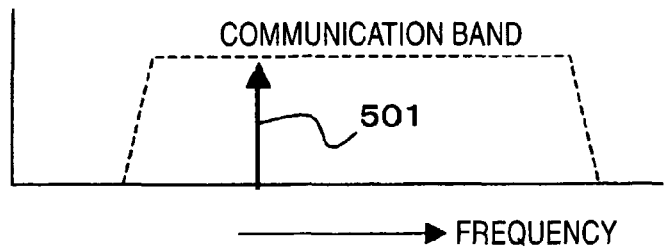
FIGS. 8(a) to 8(c) are views which explain one example of an operation in case that a single carrier signal is used as a pilot signal, in the balance communication system for explaining the first embodiment of the invention.
Figure 8:
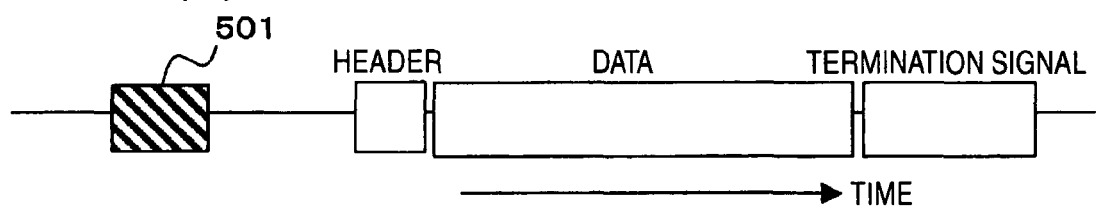
Figure 8:
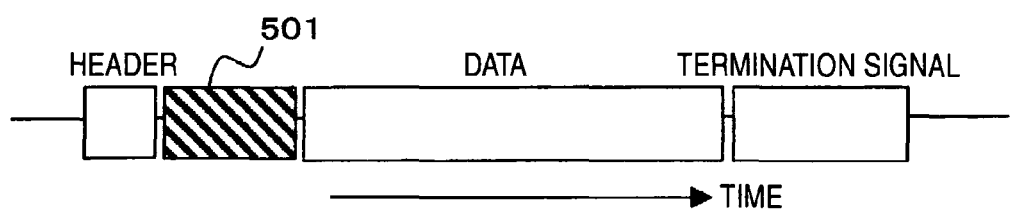

One example of an operation in case of utilizing a single carrier signal as a pilot signal will be described by use of FIG. 8. FIG. 8(a) shows a relation of a pilot signal and a communication band, and FIGS. 8(b) and (c) show transmission timing of a pilot signal.

As shown in FIG. 8(a), a pilot signal 501 is a carrier signal with arbitrary frequency in a communication band, and its signal level is known. The pilot signal 501 may be transmitted in advance of transmission data which is composed of a header signal showing a beginning of a transmission signal (hereinafter, simply referred to as header signal), a data signal, and an end signal showing an end of the transmission signal (hereinafter, simply referred to as end signal) (see, FIG. 8(b)), and may be transmitted between the header signal and the data signal (see, FIG. 8(c)).

In this case, the unbalance component detection sections 13, 23 are to detect unbalance components of the transmission line 300 in a specific frequency band, and control the transmission control sections 12, 22 by these unbalance component signals.

Figure 9:
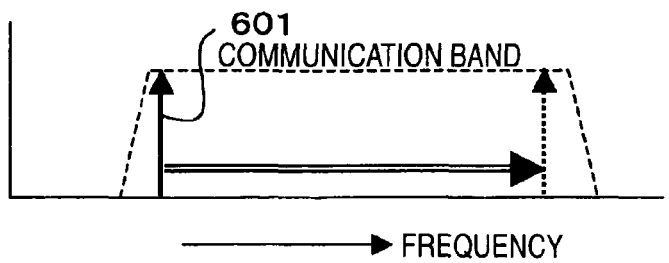
FIGS. 9(a) and 9(b) are views which explain another example of an operation in case that a single carrier signal is used as a pilot signal, in the bar-anee balance communication system for explaining the first embodiment of the invention.
Figure 9:
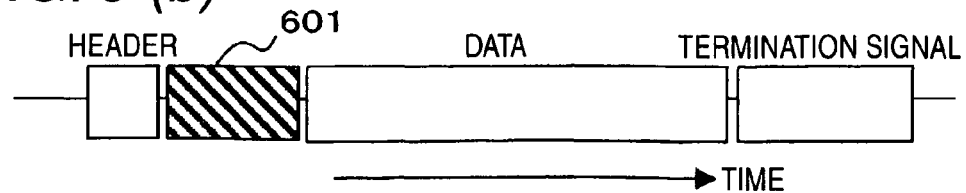

Another example of an operation in case of utilizing a single carrier signal as a pilot signal will be described by use of FIG. 9. FIG. 9(a) shows a relation of a pilot signal and a communication band, and FIG. 9(b) shows transmission timing of the pilot signal. A pilot signal 601 of FIG. 9 is a single carrier signal which swept across an entire communication frequency band. When this pilot signal 601 is transmitted, it is possible to surely detect an unbalance component in an entire communication band.

Figure 10:
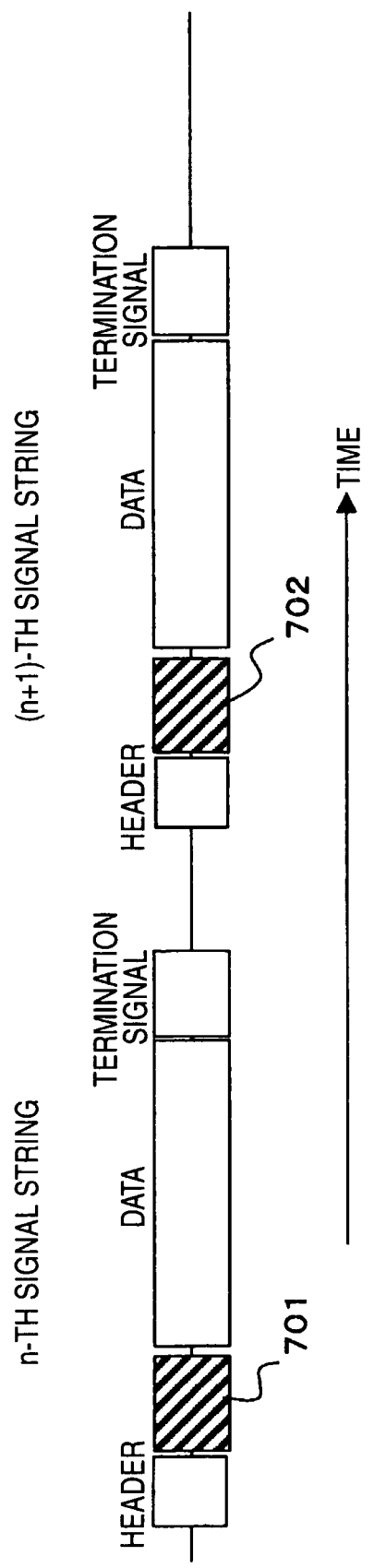
FIG. 10 is a view which explains a further example of an operation in case that a single carrier signal is used as a pilot signal, in the balance communication system for explaining the first embodiment of the invention.

A still another example of an operation in case of utilizing a single carrier signal as a pilot signal will be described by use of transmission timing of a pilot signal shown in FIG. 10. Pilot signals 701, 702 of FIG. 10 are carrier signals having different frequencies, and are transmitted alternately with respect to each transmission frame. In the example of FIG. 10, a pilot signal 701 is transmitted in an n-th signal string, and a pilot signal 702 is transmitted in an (n+1)-th signal string. When the suchlike pilot signals are transmitted, it is possible to detect unbalance components in an entire communication band, after transmission of a given frame. In addition, it is possible to detect a balance status of a transmission line without enlarging an influence to communication, and it is possible to heighten a data transmission rate.

Meanwhile, the example of FIG. 10 was explained in such a manner that a pilot signal to be transmitted is a single carrier signal, but there occurs no problem even if it is a multi-carrier signal. In that case, by selecting a carrier to be used with respect to each frame, it is possible to detect unbalance components in an entire communication band at short times.

Third Embodiment

One example of an operation in case of utilizing a plurality of carrier signals as a pilot signal will be described by use of FIG. 11. FIG. 11(a) shows a relation of a pilot signal and a communication band, and FIG. 11(b) shows transmission timing of the pilot signal.

As shown in FIG. 11(a), a pilot signal 801 is carrier signals of all frequencies in a communication band, and its signal level is known. The pilot signal 801 is transmitted between a header signal and a data signal in the example of FIG. 11(b).

When the suchlike pilot signal is transmitted, it is possible to detects unbalance components in a necessary frequency band simultaneously at short times. In addition, carrier signals which are adjacent to each other among a plurality of carrier signals are made orthogonal each other, and thereby, they do not interfere with each other, and an amplitude of a pilot signal doe not become large, and therefore, it is possible to detect a balance status of a transmission line without giving a heavy influence to transmission of data.

Figure 12:
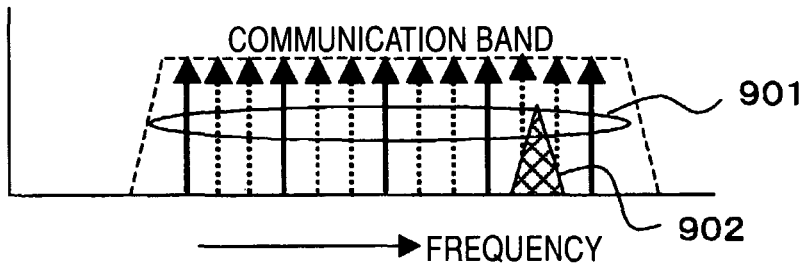
FIGS. 12(a) and 12(b) are views which explain another example of an operation in case that a plurality of carrier signals are used as a pilot signal, in the balance communication system for explaining the first embodiment of the invention.
Figure 12:
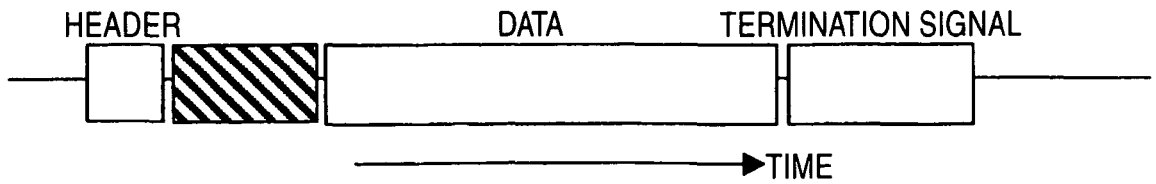

Another example of an operation in case of utilizing a plurality of carrier signals as a pilot signal will be described by use of FIG. 12. FIG. 12(a) shows a relation of a pilot signal and a communication band, and FIG. 12(b) shows transmission timing of the pilot signal.

As shown in FIG. 12(a), a pilot signal 901 is a plurality of carrier signals which were selected discretely among all carrier signals which are used in a communication band (a broken line in FIG. 12(a) shows a carrier which is a carrier to be used for communication but is not included in a pilot signal.). The pilot signal 901 is transmitted between a header signal and a data signal in the example of FIG. 12(b).

When the suchlike pilot signal 901 is transmitted, it is possible to detect unbalance components across an entire communication band although they are of the small number of carriers and discrete. In addition, since it is possible to avoid frequency in which there is known disturbance (number 902 in FIG. 12(a)), it is possible to improve detection accuracy of a balance status.

On the occasion of detecting an unbalance component in an are which corresponds to all carriers in an entire communication band, predetermined computing is carried out on the basis of unbalance components in an area which is included in a pilot signal to carry out calculation. A calculation section for carrying out this calculation may be combined with the unbalance component detection sections 13, 23, and a calculation section (not shown in the figure) may be disposed outside the unbalance component detection sections 13, 23, As the suchlike computing, for example, arithmetic average and weighting average of unbalance component outputs in adjacent frequency bands can be adopted. In addition, as to unbalance components in a outside band of a frequency band, which are outputted by the unbalance component detection sections 13, 23, they are substituted with unbalance components in the most adjacent frequency band.

Fourth Embodiment

Figure 13:
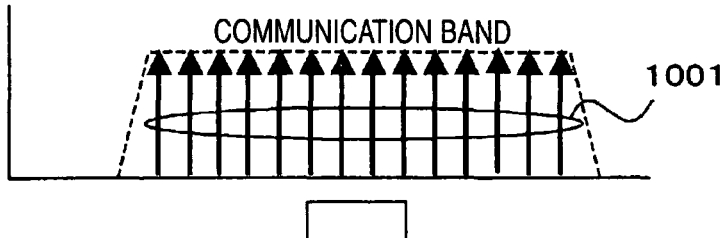
FIGS. 13(a) and 13(b) are views which explain one example of an operation in case that a plurality of carrier signals are used as a pilot signal, and thereafter, a single carrier signal is used as the pilot signal, in the balance communication system for explaining the first embodiment of the invention.
Figure 13:

One example of an operation in case of utilizing a single carrier signal as a pilot signal after a plurality of carrier signals were utilized as a pilot signal will be described by use of FIG. 13. FIG. 13(a) shows a relation of a first pilot signal 1001 which is a plurality of carrier signals and a communication band, and FIG. 13(b) shows a relation of a second pilot signal 1002 which is a single carrier signal and a communication band.

The first pilot signal 1001 is carrier signals of all frequencies in a communication band, in the same manner as the pilot signal 801 shown in FIG. 11(a), and its signal level is known. In addition, the second pilot signal 1002 is a single carrier signal of specific frequency, in the same manner as the pilot signal 501 shown in FIG. 8(a). The second pilot signal 1002 is one for detecting a balance status of a transmission line in specific frequency, and utilized for the purpose of, for example, taking hold of detail data of an unbalance component, and detecting an unbalance component in specific monitoring frequency which corresponds to operation environment etc., and so on.

In this example, the first pilot signal 1001 is transmitted for short time, and unbalance components in an entire communication band are detected, and thereafter, the second pilot signal 1002 is transmitted, and unbalance components in a selected frequency band are detected with high accuracy.

Figure 14:
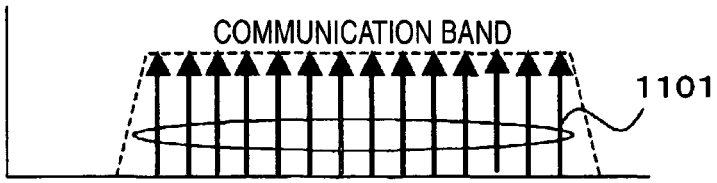
FIGS. 14(a) to 14(c) are views which explain another example of an operation in case that a plurality of carrier signals are used as a pilot signal, and thereafter, a single carrier signal is used as the pilot signal, in the balance communication system for explaining the first embodiment of the invention.
Figure 14:
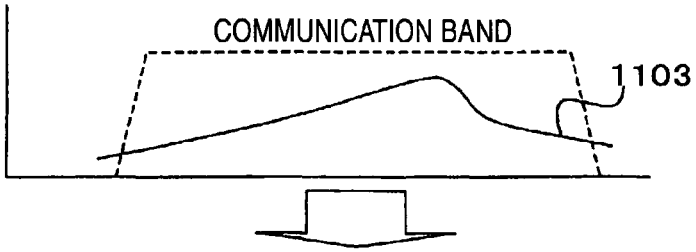
Figure 14:
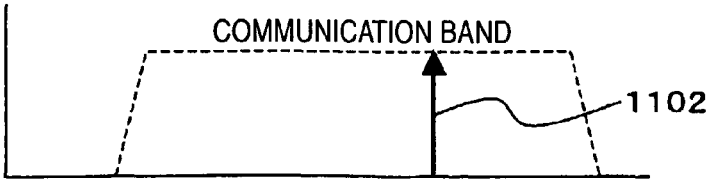

Another example of an operation in case of utilizing a single carrier signal as a pilot signal after a plurality of carrier signals were utilized as a pilot signal will be described by use of FIG. 14. FIG. 14(*a*) shows a relation of a first pilot signal 1001 which is a plurality of carrier signals and a communication band, and FIG. 14(*c*) shows a relation of a second pilot signal 1002 which is a single carrier signal and a communication band. In addition, FIG. 14(*b*) shows an unbalance component 1103 which was detected by transmitting the first pilot signal 1101.

Figure 11:
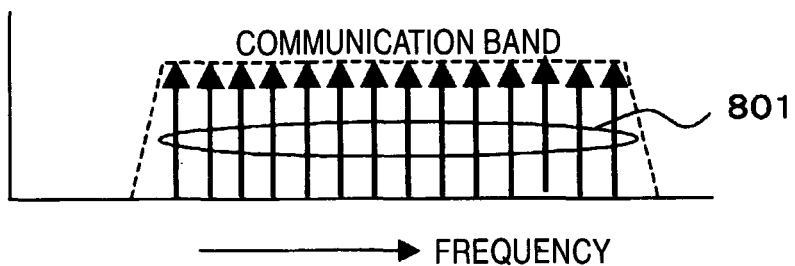
FIGS. 11(a) and 11(b) are views which explain one example of an operation in case that a plurality of carrier signals are used as a pilot signal, in the balance communication system for explaining the first embodiment of the invention.
Figure 11:
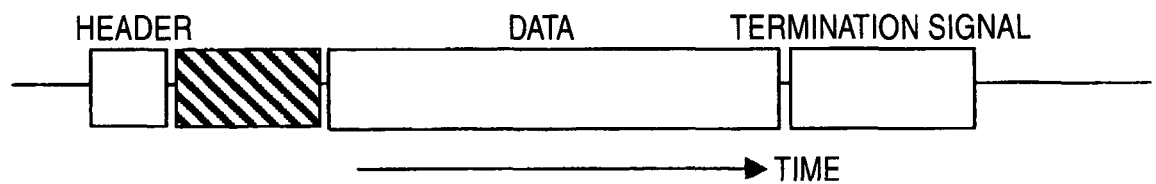

The first pilot signal 1001 is carrier signals of all frequencies in a communication band, in the same manner as the pilot signal 801 shown in FIG. 11(*a*), and its signal level is known. In addition, the second pilot signal 1002 is a single carrier signal of specific frequency, in the same manner as the pilot signal 501 shown in FIG. 8(*a*). The second pilot signal 1002 is a single carrier signal of selected frequency which was selected on the basis of a size of an unbalance component shown in FIG. 14(*b*).

In this example, the first pilot signal 1001 is transmitted for short time, and unbalance components in an entire communication band are detected, and thereafter, the second pilot signal 1002 is transmitted in a frequency band in which an unbalance component is large (i.e., a band including a peak of the unbalance component 1103), and an unbalance component in an area in which a balance status is not good. It is possible to carry out detection of an unbalance component at short times with high accuracy, and high accurate monitoring of a balance status becomes possible without enlarging processing burden.

Fifth Embodiment

Transmission timing of a pilot signal will be described by use of FIGS. 15 through 22.

Figure 15:
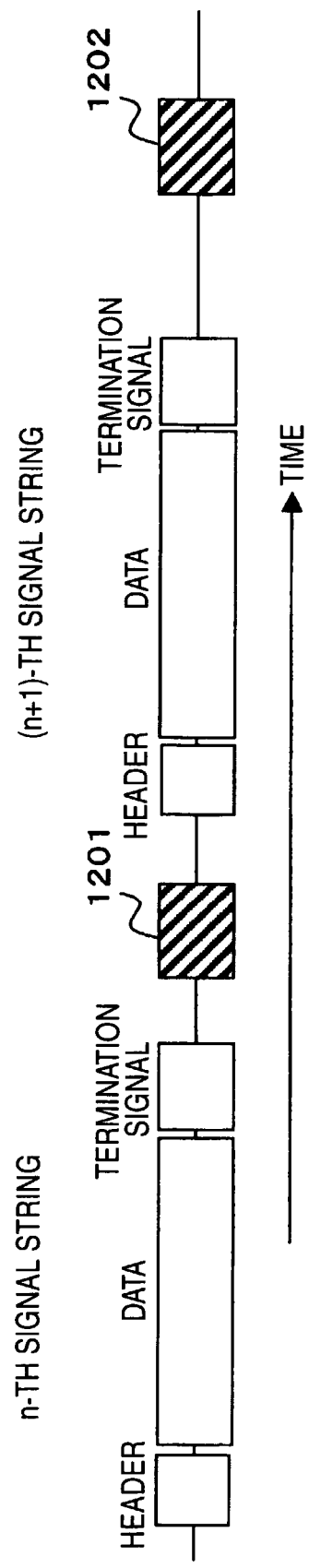
FIG. 15 is a view which shows transmission timing in case of transmitting a pilot signal during a period of transmission stop of data to be transmitted, in the balance communication system for explaining the first embodiment of the invention.

FIG. 15 is a view which shows transmission timing in case of being transmitted during a period of transmission stop of data to be transmitted. As shown in FIG. 15, a pilot signal 1201 is transmitted between an n-th signal string and an (n+1)-th signal string, and a pilot signal 1202 is transmitted between an (n+1)-th signal string and an (n+2)-th signal string which is not shown in the figure. When it is configured so as to transmit them at these timings, it is possible to detect a balance status even during a period of communication and a period of communication stop, by use of the same method.

Figure 16:
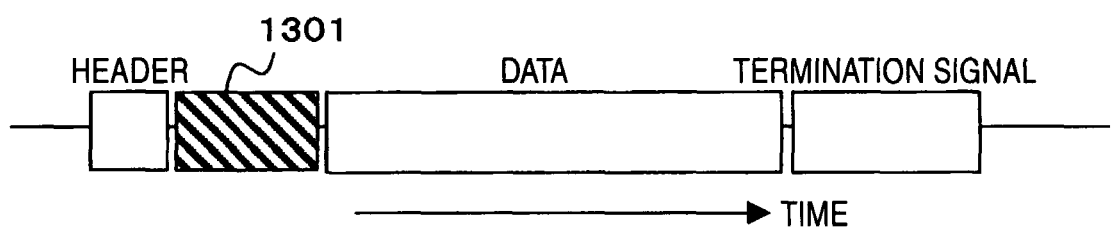
FIG. 16 is a view which shows a transmission timing in case of including a pilot signal in a signal string of data to be transmitted and transmitting it, in the balance communication system for explaining the first embodiment of the invention.

FIG. 16 is a view which shows transmission timing in case of being included in a signal string of data to be transmitted and being transmitted. As shown in FIG. 16, a pilot signal 1301 is transmitted between a header signal and a data signal. When it is configured so as to transmit it at this timing, detection of a balance status becomes possible during a period of communication, without allocating special detection time. Meanwhile, in the example of FIG. 16, a pilot signal was inserted into one place in one signal string, but may be inserted into a plurality of places.

Figure 17:
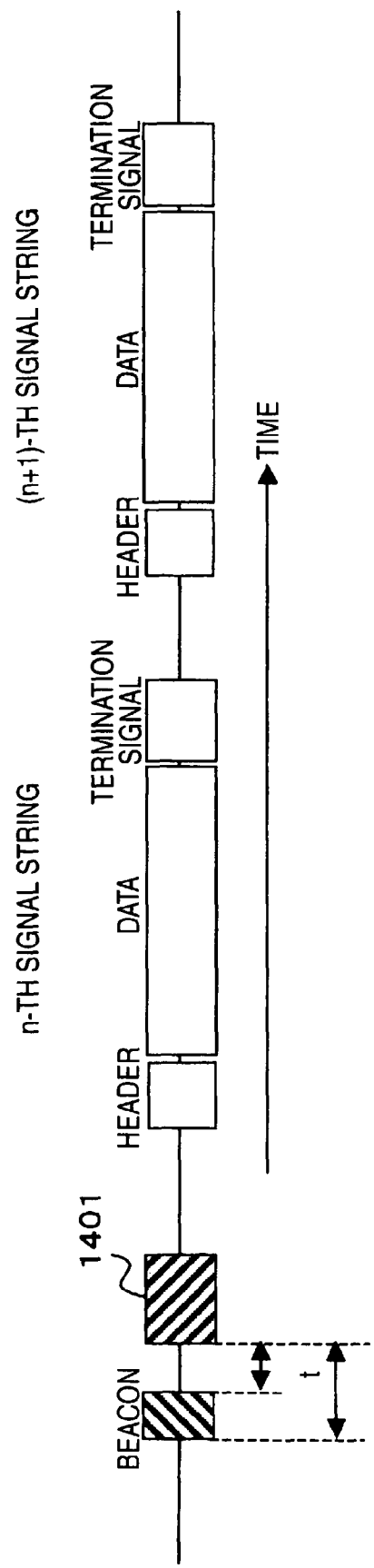
FIG. 17 is a view which shows transmission timing in case of transmitting a pilot signal after a given length of time from beacon signal sending-out, in the balance communication system for explaining the first embodiment of the invention.
Figure 18:
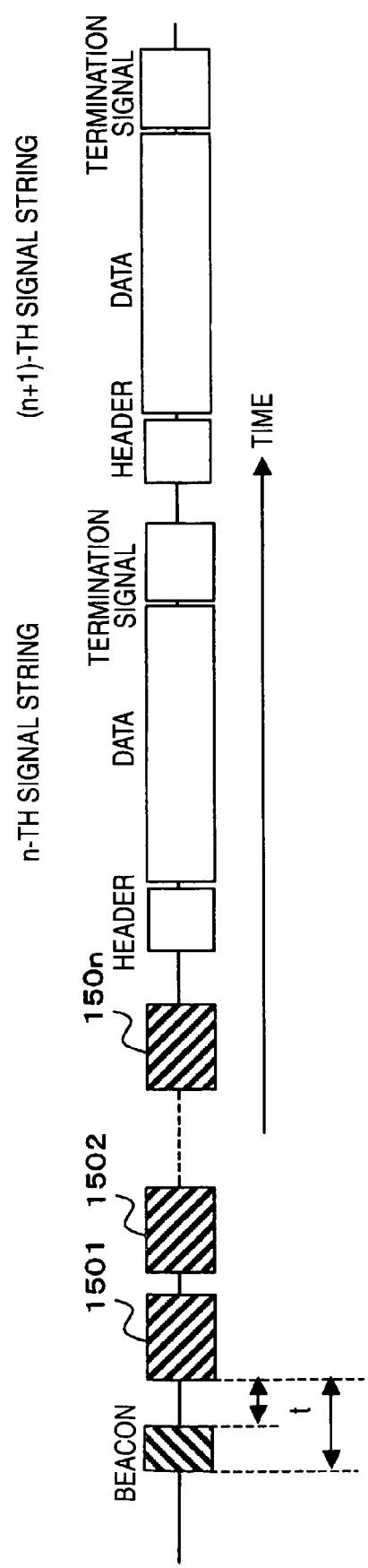
FIG. 18 is a view which shows transmission timing in case of transmitting a pilot signal which corresponds to each communication apparatus, in a time-division multiplex, after a given length of time from beacon signal sending-out, in the balance communication system for explaining the first embodiment of the invention.

FIGS. 17, 18 are views which show transmission timing in case of being transmitted at timing based on a reference timing signal (hereinafter, described as beacon signal) which is common to a communication system.

FIG. 17 is a thing which shows a case of transmitting a pilot signal 1401 after a given length of time t from sending-out of a beacon signal. When a pilot signal is transmitted at this timing, the unbalance component detection sections 13, 23 easily recognize processing timing for balance status detection. Meanwhile, a given length of time t in FIG. 17 was set to time to be counted from a forward edge of a beacon signal, but may be set to time to be counted from a backward edge.

FIG. 18 is a thing which shows a case of transmitting pilot signals 1501 through 150*n* which correspond to respective communication apparatuses in a time-division multiplex, after a given length of time t from sending-out of a beacon signal. When a pilot signal is transmitted at this timing, the unbalance component detection sections 13, 23 with respect to each communication apparatus can easily recognize processing timing for balance status detection. Meanwhile, a given length of time t in FIG. 18 was set to time to be counted from a forward edge of a beacon signal, but may be set to time to be counted from a backward edge.

Figure 19:
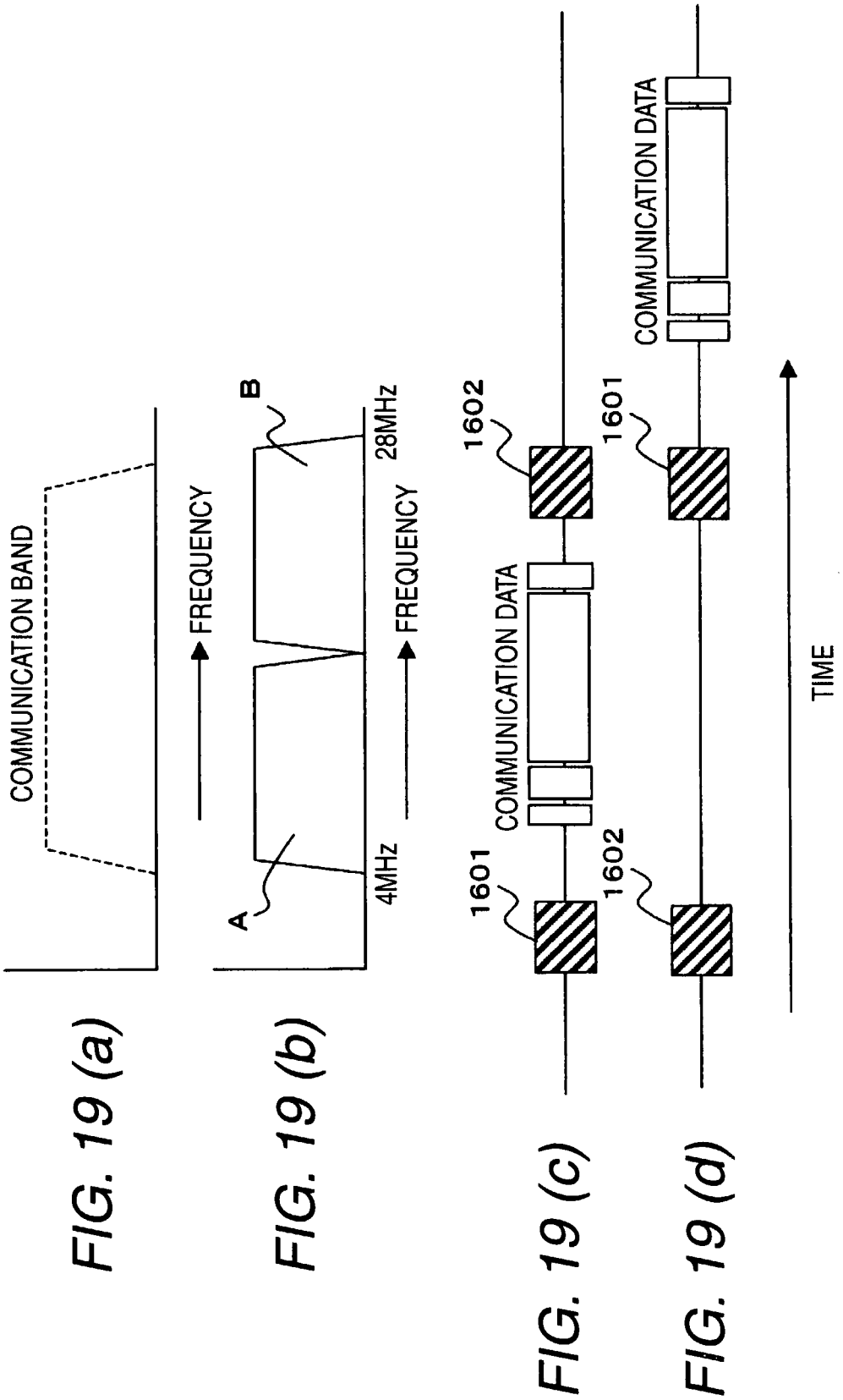
FIGS. 19(a) to 19(d) are views which explain an operation in case of transmitting a pilot signal which is allocated with respect to each of plural communication apparatuses that configure a communication system, in the balance communication system for explaining the first embodiment of the invention.

FIG. 19 is a view for explaining an operation case of transmitting a pilot signal which was allocated with respect to each of a plurality of communication apparatuses that configure a communication system. FIG. 19(*a*) shows a communication band, and FIG. 19(*b*) shows different frequency bands for pilot signals 1601, 1602. That is, the pilot signal 1601 is a carrier signal in an area A, and the pilot signal 1602 is a carrier signal in an area B. In addition, FIGS. 19(*c*) and 19(*d*) show pilot signal detection timing in different communication apparatuses. In this case, a pilot signal is allocated with respect to each communication apparatus which configures a communication system, and allocated respective pilot signals are transmitted in band which are different from one another, in a communication frequency band. When a pilot signal is transmitted at this timing, it is possible to detect pilot signals at the same time in a plurality of terminals. In addition, it is also possible to further transmit each pilot signal in a time-division multiplex.

Transmission timing of a pilot signal in case of being applied to electric power line communication etc. will be described by use of FIGS. 20 through 22.

Figure 20:
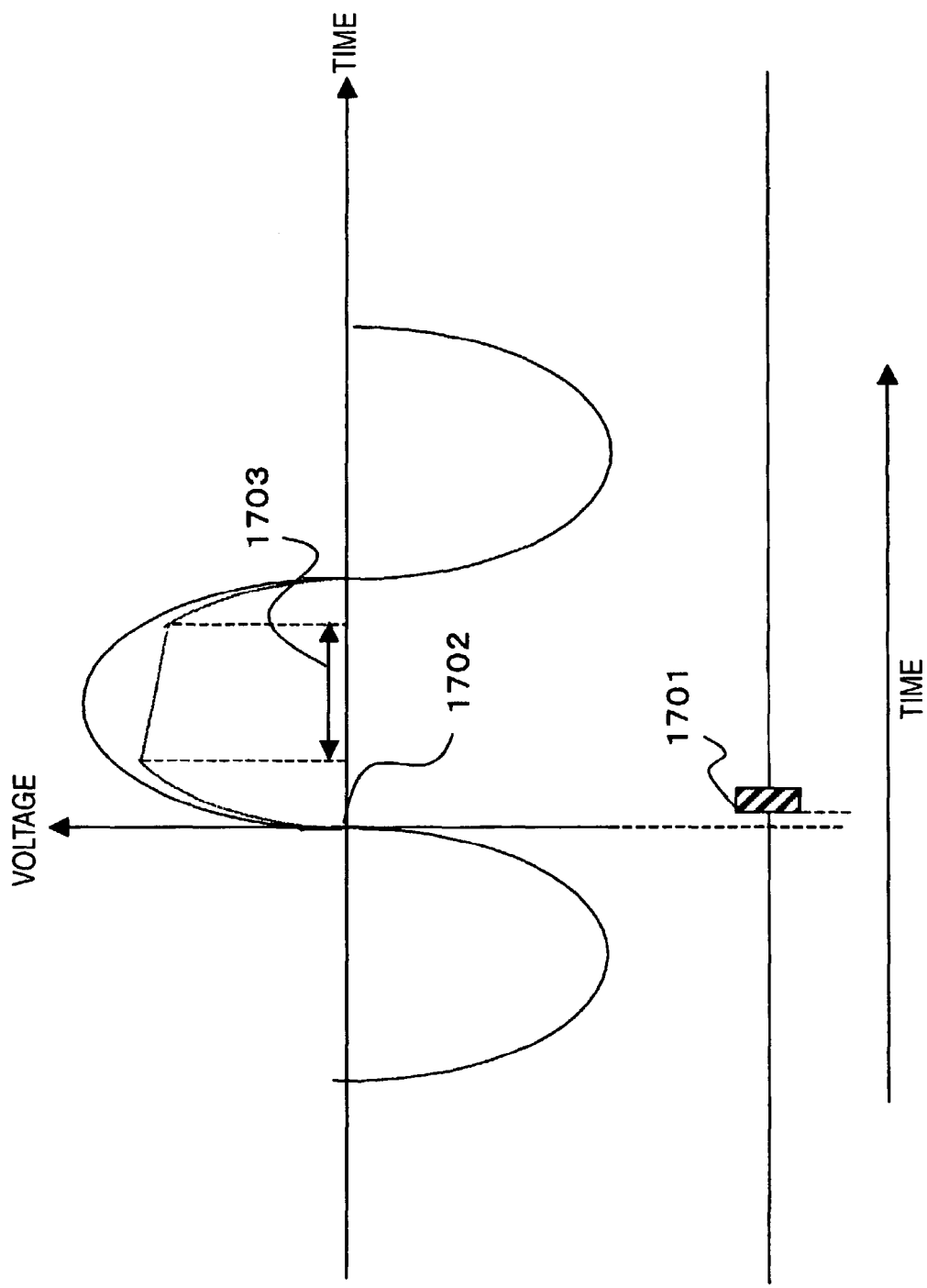
FIG. 20 is a view which shows transmission timing in case of transmitting a pilot signal in the vicinity of a zero cross point of a commercial power source, in the balance communication system for explaining the first embodiment of the invention.

FIG. 20 is a thing which shows transmission timing in case of transmitting a pilot signal in the vicinity of a zero cross point of a commercial power source. As shown in FIG. 20, a pilot signal 1701 is transmitted in the vicinity of a zero cross point 1702 of a commercial power source. The commercial power source easily comes under the influence of a peripheral device, especially a device with a half-wave rectifier during a period 1703, and therefore, by transmitting it in the vicinity of the zero cross point 1702, it is possible to surely detect an unbalance component without having an influence of a peripheral device. Meanwhile, it is also possible to transmit a pilot signal at a zero cross point.

Figure 21:
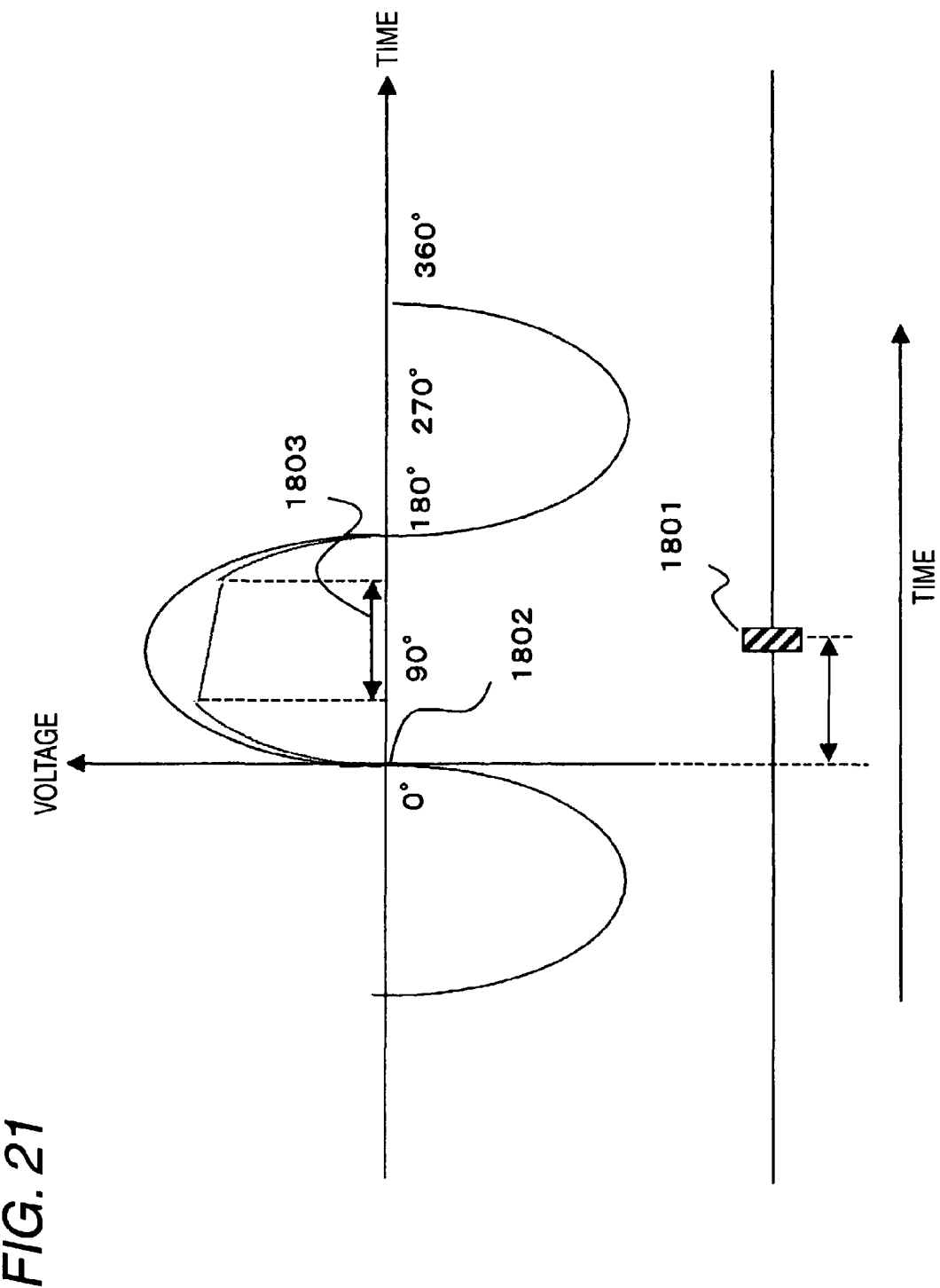
FIG. 21 is a view which shows transmission timing in case of transmitting a pilot signal in the vicinity of 90 degrees from a zero cross point of a commercial power source, in the balance communication system for explaining the first embodiment of the invention.

FIG. 21 is a thing which shows transmission timing in case of transmitting a pilot signal in the vicinity of 90 degrees from a zero cross point of a commercial power source. As shown in FIG. 21, a pilot signal 1801 is transmitted with phase which becomes 90 degrees from a zero cross point 1802 of a commercial power source. This period 1803 easily comes under the influence of a peripheral device, especially a device with a half-wave rectifier, and therefore, it is possible to surely detect an influence of a peripheral device. Meanwhile, in FIG. 21, transmission was carried out with the phase which becomes 90 degrees from the zero cross point 1802 of a commercial power source, but even if transmission is carried out with phase which becomes −90 degrees from the zero cross point, the same advantage will be obtained.

Figure 22:
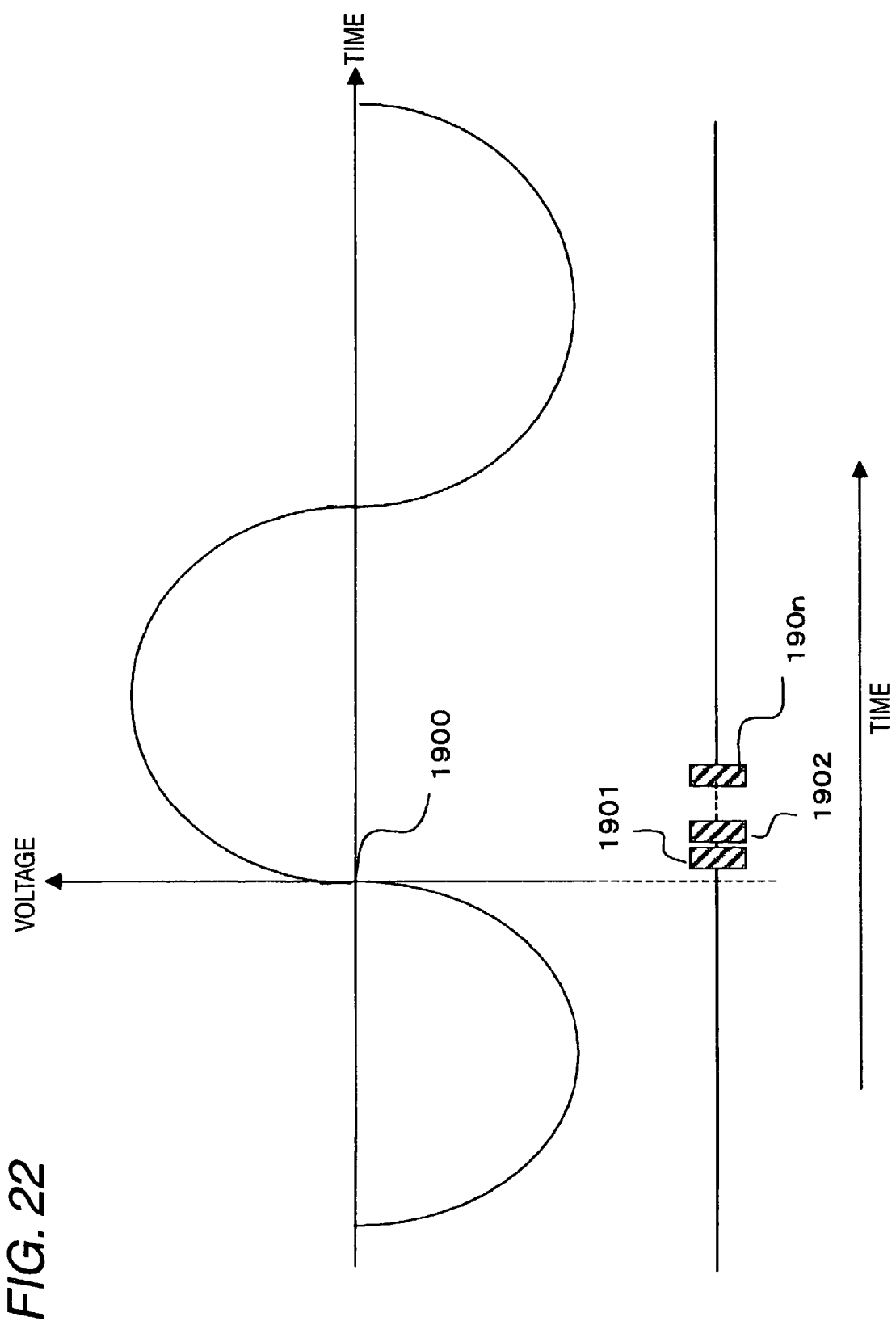
FIG. 22 is a view which shows transmission timing in case of transmitting a pilot signal within a given length of time by using a zero cross point of a commercial power source as a reference.

FIG. 22 is a thing which shows transmission timing in case of transmitting a pilot signal within a given period on the basis of a zero cross point of a commercial power source. The example of FIG. 22 shows an example of transmitting a plurality of pilot signals 1901, 1902, . . . 190n which correspond to a plurality of communication apparatuses.

When a pilot signal is transmitted at the suchlike timing, it is possible to transmit it at accurate timing, without utilizing a beacon signal.

Sixth Embodiment

Figure 23:
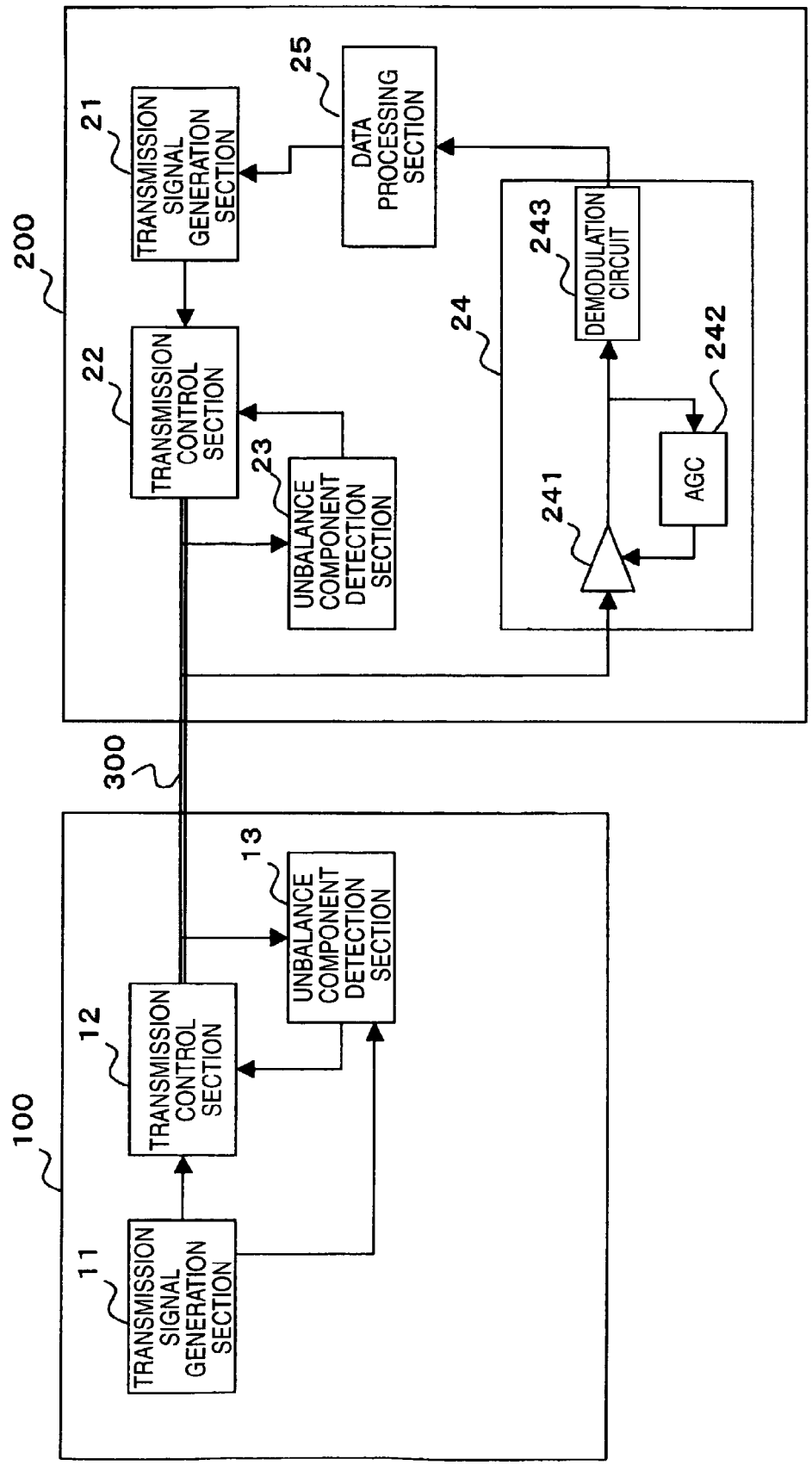
FIG. 23 is a conceptual view of one example of balancing control in a balance communication system for explaining a second embodiment of the invention.

FIG. 23 shows a schematic configuration of one example of a balance communication system for explaining a sixth embodiment of the invention. A point, which is different from the first embodiment, is such a point that the pilot signal generation section 14 is omitted. As a pilot signal, a communication control signal, which is included in a transmission string of data, is utilized. Concretely speaking, an AGC reference signal (e.g., a reference signal for controlling gain of a reception circuit) which is transmitted for AGC (Auto Gain Control) on a reception side, a characteristic estimation reference signal for estimating a transmission characteristic of a transmission line, a demodulation reference signal (e.g., phase and amplitude of a reference signal) for demodulation on a reception side, a header signal which shows a head of a communication signal, and so on are utilized.

A second communication apparatus 200 shown in FIG. 23 further includes a reception section 24 which is equipped with a signal amplification circuit 241, an AGC circuit 242 and a demodulation circuit 243, and a data processing section 25, and carries out AGC control, transmission characteristic estimation etc. Since AGC control, transmission characteristic estimation processing of the signal amplification circuit are known well, explanations will be omitted. Meanwhile, the data processing section 25 and the demodulation circuit 243 are realized by the main IC 61 shown in FIG. 3. The signal amplification circuit 241 and the AGC circuit 242 are realized by the AFE IC 62 shown in FIG. 3.

Transmission timing of a pilot signal in a balance communication system for explaining the sixth embodiment will be described by use of FIGS. 24 through 27.

Figure 24:
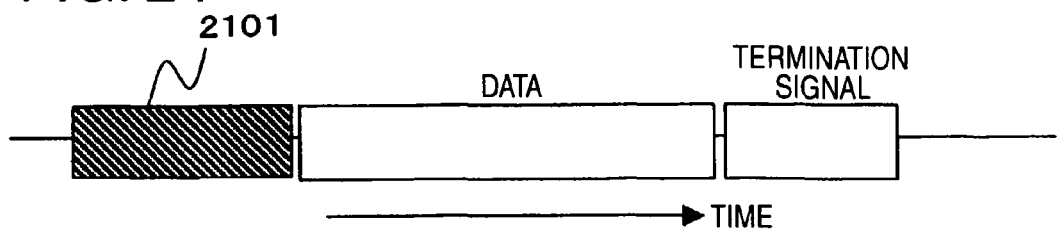
FIG. 24 is a view which explains transmission timing of a pilot signal in the balance communication system for explaining the second embodiment of the invention.

FIG. 24 shows a case of utilizing an AGC reference signal 2101. As shown in FIG. 24, the AGC reference signal 2101 is transmitted in advance of a data signal.

Figure 25:
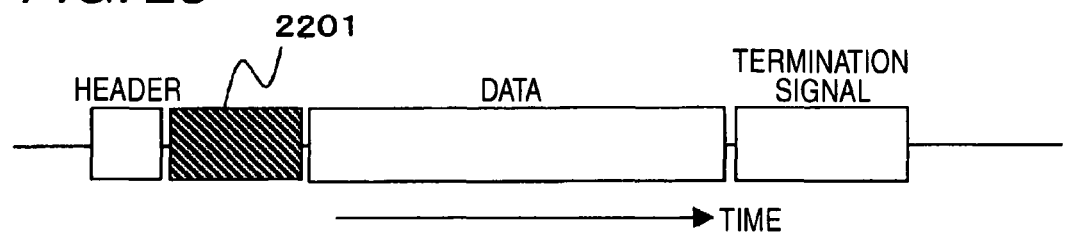
FIG. 25 is a view which explains transmission timing of a pilot signal in the balance communication system for explaining the second embodiment of the invention.

FIG. 25 shows a case of utilizing a characteristic estimation reference signal 2201 for estimating a transmission characteristic of a transmission line. As shown in FIG. 25, the characteristic estimation reference signal 2201 is transmitted between a header signal and a data signal.

Figure 26:
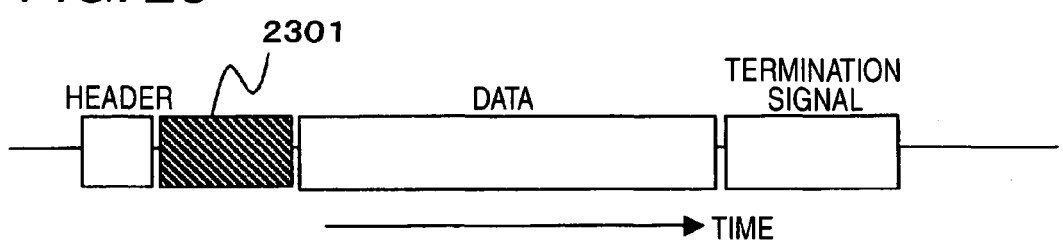
FIG. 26 is a view which explains transmission timing of a pilot signal in the balance communication system for explaining the second embodiment of the invention.

FIG. 26 shows a case of utilizing a demodulation reference signal 2301 for demodulation on a reception side. As shown in FIG. 26, the demodulation reference signal 2301 is transmitted between a header signal and a data signal.

Figure 27:
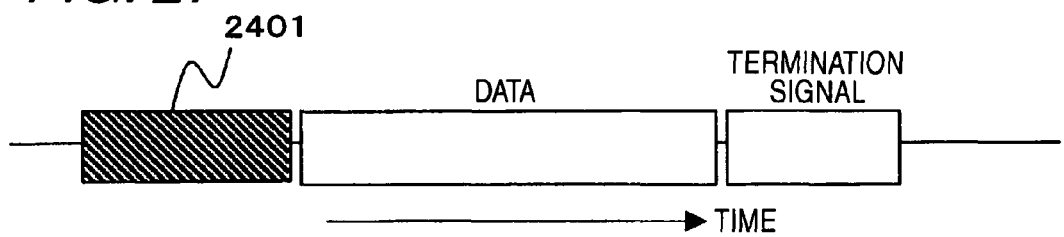
FIG. 27 is a view which explains transmission timing of a pilot signal in the balance communication system for explaining the second embodiment of the invention.
Figure 28:
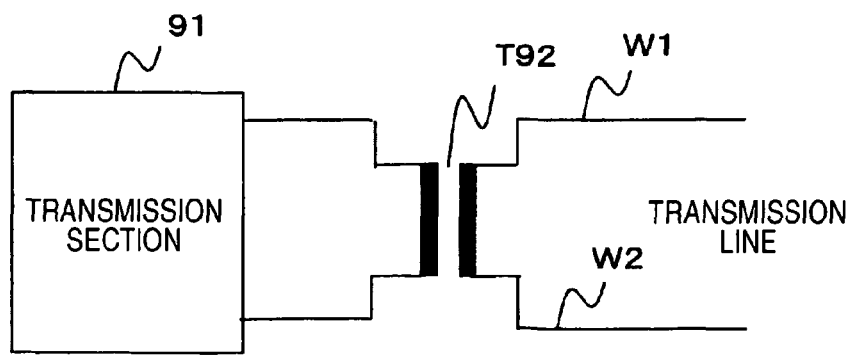
FIG. 28 is a view which shows one example of a transmission section and a transmission line of a conventional balance transmission apparatus

FIG. 27 shows a case of utilizing a header signal 2410 which shows a head of a communication signal. As shown in FIG. 27, the header signal 2401 is transmitted at the head of a communication signal.

Seventh Embodiment

A seventh embodiment of the invention shows a configuration example of a multi-carrier communication apparatus which carries out analysis processing of an unbalance component for analyzing a frequency characteristic of the unbalance component of a transmission line in a balance communication system which carries out data transmission through a balance transmission path, transmission processing and reception processing. A multi-carrier communication apparatus and a multi-carrier transmission method in this embodiment are suitably used for a balance communication system such as an electric power line communication system using electric power lines as a transmission line. In addition, as data communication, it is applicable to electric power line communication using a frequency division multiplex signal, OFDM (Orthogonal Frequency division Multiplexing) and so on, and data communication such as ADSL (Asymmetric Digital Subscriber Line).

Figure 29:
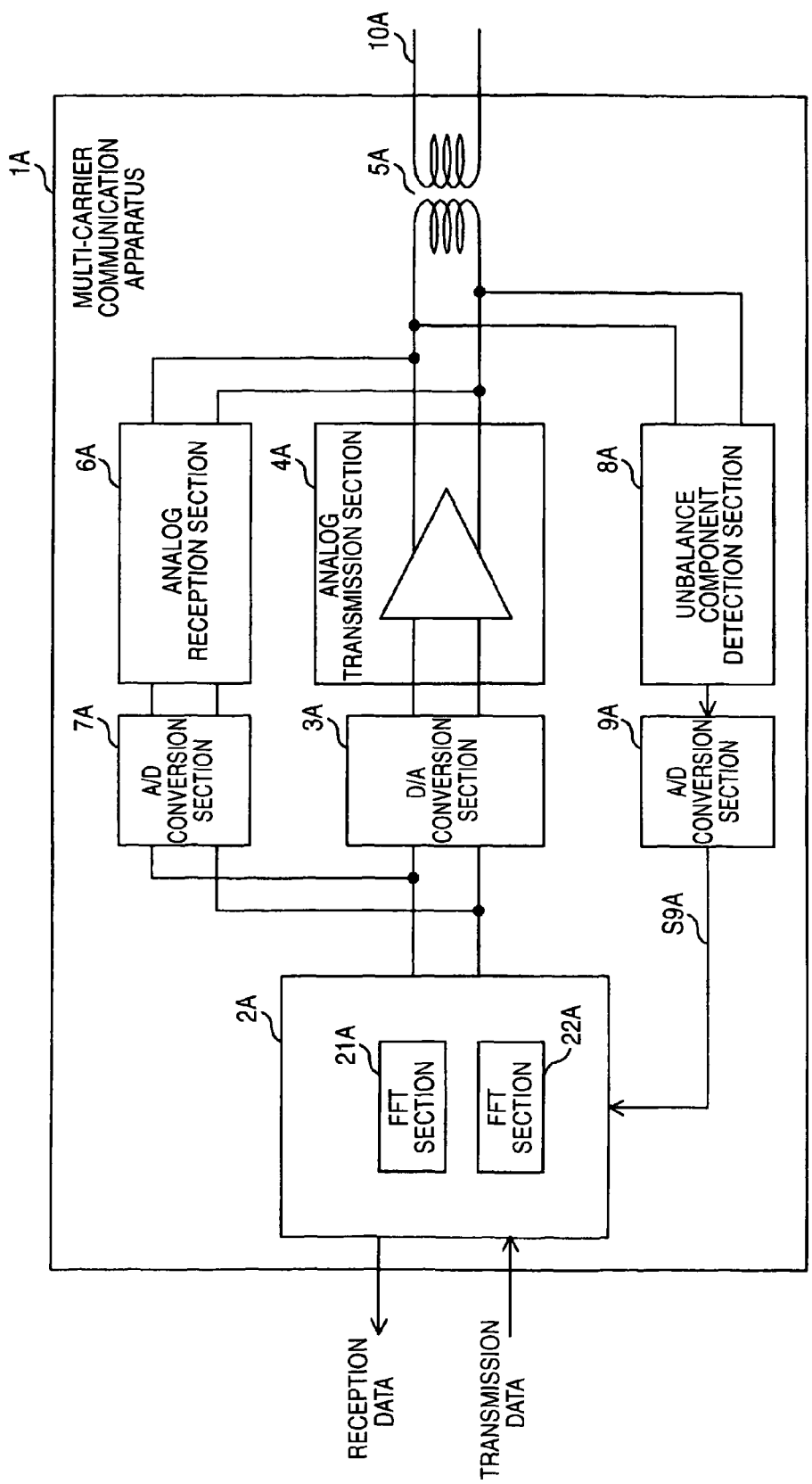
FIG. 29 is a block diagram which shows a schematic configuration of a multi-carrier communication apparatus which relates to a seventh embodiment of the invention.

FIG. 29 is a block diagram which shows a schematic configuration of a multi-carrier communication apparatus that relates to the seventh embodiment of the invention. As shown in FIG. 29, a multi-carrier communication apparatus 1 of this embodiment is a thing which utilizes an electric power line 10 such as an in-house electric lighting line as a transmission line, and carries out transmission and reception by a multi-carrier transmission system using OFDM etc., and is used as an electric power line communication modem. Meanwhile, as to the communication apparatus 1, there is no need to limit it to the electric power line communication model, in case of an electric device having a communication function, and for example, it may be an electric household appliance such as TV having a communication function (so-called network electric household appliance) and a personal computer. In addition, as to the multi-carrier communication apparatus, it may be an apparatus which carries out any one of transmission or reception.

As shown in FIG. 29, a multi-carrier communication apparatus 1A is equipped with a digital processing section 2A, an D/A conversion section 3A which carries out digital-to-analog conversion as to transmission data, an analog transmission section 4A, a coupling transformer 5A, an analog reception section 6A, an A/D conversion section 7A, an unbalance component detection section 8A, and an A/D conversion section 9A.

The digital processing section 2A carries out digital processing as to data which was received from an electric power line 10A and transmission data which is transmitted to the electric power line 10A. In addition, the data processing section 2A is configured by having two FFT sections 21A, 22A. The FFT sections 21A, 22A are things which correspond to a time-frequency transformation section, and carry out inverse FFT computing in multi-carrier modulation at the time of transmission as digital processing in a multi-carrier transmission system, FFT computing in a multi-carrier demodulation at the time of reception, and FFT computing for frequency analysis as to a detection signal which was detected by the unbalance component detection section 8A. Meanwhile, FFT (Fast Fourier Transform) is one example of time-frequency transformation, and there is no need to limit to this especially, if iff is a conversion method for carrying out time-frequency transformation as to a multi-carrier communication signal.

The D/A conversion section 3A carries out analog conversion as to transmission data for which digital processing such as multi-carrier modulation was carried out by the digital processing section 2. The analog transmission section 4A is configured by having a band pass filter, an amplifier and so on, and carries out transmission processing for an analog transmission signal which was outputted from the D/A conversion section 3A. An analog transmission signal, which was outputted from the analog transmission section 4A, is transmitted to the electric power line 10A through the coupling transformer 5A.

The coupling transformer 5A couples the analog transmission section 4A, the analog reception section 6A and the unbalance component detection section 8A, and the electric power line 10.

The analog reception section 6A is configured by having a band pass filter etc., and carries out reception processing for an analog reception signal which was received from the electric power line 10A through the coupling transformer 5. The A/D conversion section 7A carries out digital conversion as to an analog reception signal which was outputted from the analog reception section 6A. Digital reception processing is applied to the digital-converted reception signal by the digital processing section 2A.

The unbalance component detection section 8A detects a common mode current of the electric power line 10A which is composed of a pair of transmission conductors, by use of an ampere meter, a volt meter etc., and thereby, detects an unbalance component on a transmission line. The A/D conversion section 9A converts the common mode current which was detected by the unbalance component detection section 8A into digital data. As to the digital data of an unbalance component on a transmission line (unbalance detection digital data), which was outputted by the A/D conversion section 9A, a detection value on a frequency domain of an unbalance component is calculated by the digital processing section 2A.

A detection result on a frequency domain of an unbalance component, which was calculated by the digital processing section 2A, is obtained as, for example, an amplitude of a common mode current with respect to each carrier on a frequency domain, and used for transmission control in the digital processing section 2A. This transmission control is of such a thing that, for example, in case that an amplitude of a common mode current with respect to each carrier is larger than a predetermined threshold value, a transmission level of a relevant carrier is reduced, and thereby, a common mode current is reduced. By this means, it is possible to reduce a radiation level from a transmission line.

Meanwhile, as to the unbalance component detection section 8A, there is not necessarily such necessity that the multi-carrier communication apparatus 1A has it, and for example, a multi-carrier communication apparatus of a communication partner has an unbalance component detection section, and thereby, it is possible to utilize a detection signal which was detected by that unbalance component detection section.

Figure 30:
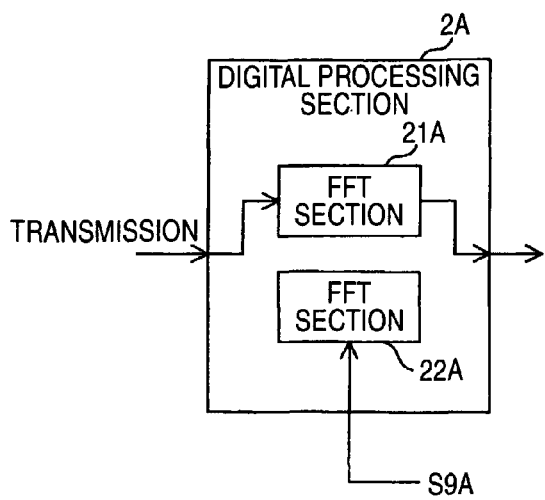
FIGS. 30(a) and 30(b) are explanatory views which show a first example of processing by a FFT section which relates to the seventh embodiment of the invention.
Figure 30:
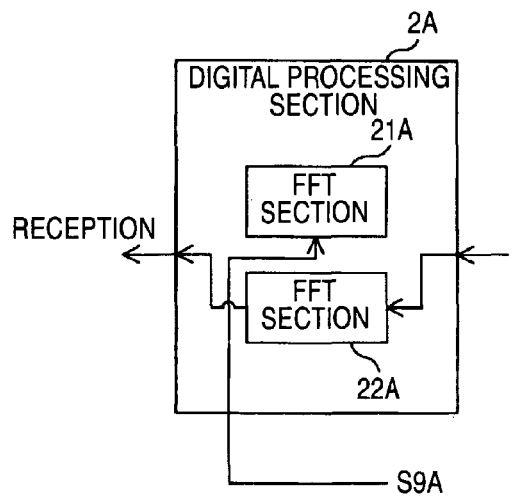

FIG. 30 is an explanatory view which shows a first example of processing by the FFT section that relates to the seventh embodiment of the invention, and FIG. 30(A) shows an occasion of transmission, and FIG. 30(B) shows an occasion of reception. FIG. 30 shows an example of such a case that a FFT section 21A is disposed for multi-carrier modulation processing at the time of transmission, and a FFT section 22A is disposed form multi-carrier demodulation processing at the time of reception.

As shown in FIG. 30(A), at the time of transmission, the FFT section 21A is used for inverse FFT computing processing for carrying out multi-carrier modulation to transmission data. Then, as to the FFT section 22A, unbalance detection digital data S9A, which was outputted from the A/D conversion section 9A, is inputted thereto, and it carries out FFT and converts detection data on a time domain of an unbalance component into data on a frequency domain, and calculates a detection value of an unbalance component with respect to each frequency band which corresponds to a plurality of carriers of a multi-carrier communication signal.

In addition, as shown in FIG. 30(B), at the time of reception, the FFT section 21A is used for FFT computing processing for carrying out multi-carrier demodulation to reception data. As to the FFT section 22A, in the same manner as the FFT section 21A at the time of transmission, unbalance detection digital data S9A, which was outputted from the A/D conversion section 9A, is inputted thereto, and it carries out FFT and converts detection data on a time domain of an unbalance component into data on a frequency domain, and calculates a detection value of an unbalance component with respect to each frequency band which corresponds to a plurality of carriers of a multi-carrier communication signal.

Meanwhile, there is not necessary such necessity that FFT processing for frequency analysis of an unbalance component is carried out at both occasions of transmission and reception, and it is all right even if it is carried out at any one of a transmission occasion and a reception occasion. In this manner, in case that FFTs are disposed for transmission processing and reception processing respectively, when at least one FFT does not carry out transmission or reception processing, FFT computing for frequency analysis of an unbalance component is carried out, and thereby, FFT which is used for a transmission occasion or a reception occasion and FFT for frequency analysis are used commonly, and therefore, it is possible to carry out frequency analysis of an unbalance component, without increasing a circuit size and cost, electric power consumption etc.

Figure 31:
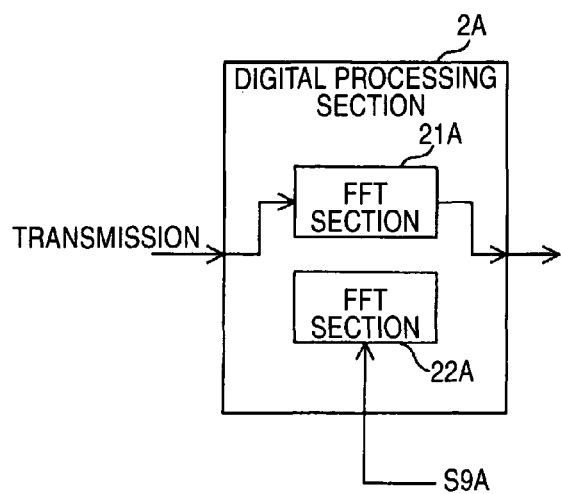
FIGS. 31(a) and 31(b) are explanatory views which show a second example of processing by a FFT section which relates to the seventh embodiment of the invention.
Figure 31:
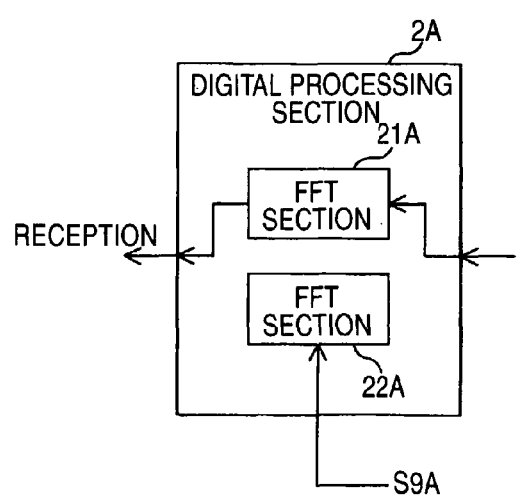

FIG. 31 is an explanatory view which shows a second example of processing by a FFT section that relates to the seventh embodiment of the invention, and FIG. 31(A) shows an occasion of transmission, and FIG. 31(B) shows an occasion of reception. FIG. 31 shows an example of such a case that a FFT section 21A is disposed for multi-carrier modulation processing at the time of transmission and multi-carrier demodulation processing at the time of reception, and a FFT section 22A is disposed for frequency analysis of an unbalance component.

As shown in FIG. 31(A), at the time of transmission, the FFT section 21A is used for inverse FFT computing processing for carrying out multi-carrier modulation to transmission data, and as shown in FIG. 31(B), at the time of reception, used for FFT computing processing for carrying out multi-carrier demodulation to reception data.

In addition, as shown in FIGS. 31(A) and 31(B), as to the FFT section 22, and as to the FFT section 22A, unbalance detection digital data S9A, which was outputted from the A/D conversion section 9A, is inputted thereto, and it carries out FFT and converts detection data on a time domain of an unbalance component into data on a frequency domain, and calculates a detection value of an unbalance component with respect to each frequency band which corresponds to a plurality of carriers of a multi-carrier communication signal.

Meanwhile, as to FFT processing for frequency analysis of an unbalance component, there is not necessary such necessity that it is carried out at both occasions of transmission and reception, and it is all right even if it is carried out at any one of a transmission occasion and a reception occasion. In this manner, in case that FFTs are disposed for transmission processing and reception processing respectively, when at least one FFT is commonly used for transmission and reception processing, and the other FFT carries out FFT computing for frequency analysis of an unbalance component, and thereby, it is possible to carry out transmission processing, reception processing and frequency analysis processing of an unbalance component by use of two FFTs.

According to the suchlike seventh embodiment of the invention, in a multi-carrier communication apparatus, the digital processing section is equipped with FFT, and by use of that FFT, it is possible to carry out frequency analysis of an unbalance component on a transmission line, and therefore, it becomes possible to carry out analysis of a frequency component which follows a fluctuating transmitting characteristic in real time.

Eighth Embodiment

Hereinafter, an eighth embodiment of the invention will be described with reference to drawings. A multi-carrier communication apparatus 1 of this embodiment will be explained as to a case of handling complex information as reception data, in a multi-carrier transmission system for carrying out data communication by digital modulation/demodulation processing using a real coefficient wavelet filter bank. A schematic configuration of the multi-carrier communication apparatus of this embodiment is the same as the schematic configuration of the multi-carrier communication apparatus 1A of the seventh embodiment shown in FIG. 29, and in the following explanation, processing, which is different from that of the seventh embodiment, will be centrally explained.

Figure 32:
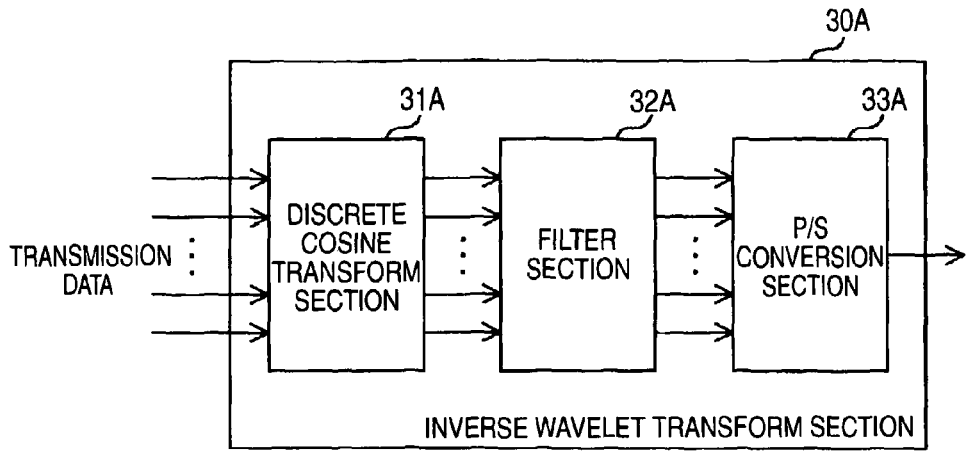
FIGS. 32(a) and 32(b) are block diagrams which show a schematic configuration of a multi-carrier modem section of a multi-carrier communication apparatus which relates to an eighth embodiment of the invention.
Figure 32:
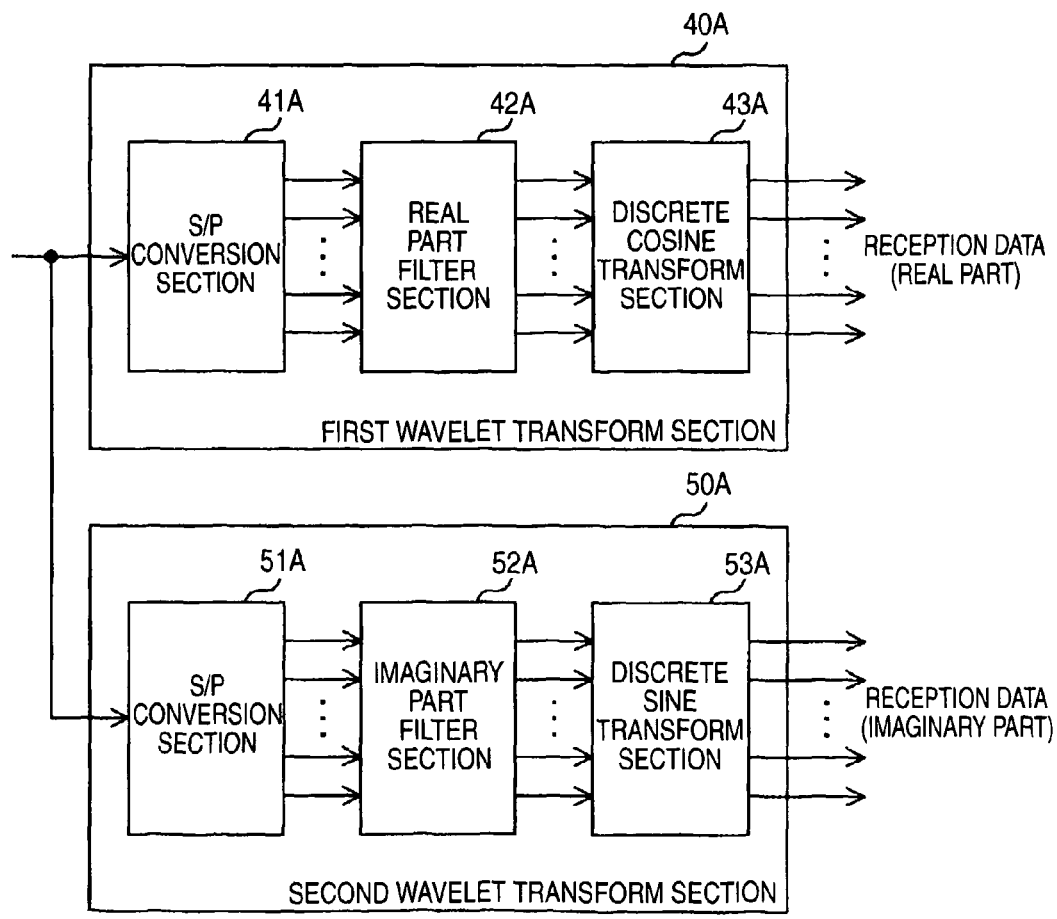

FIG. 32 is a block diagram which shows a schematic configuration of a multi-carrier modem section of a multi-carrier communication apparatus that relates to the eight embodiment of the invention, and FIG. 32(A) shows a multi-carrier modulation section at the time of transmission, and FIG. 32(B) shows a multi-carrier demodulation section at the time of reception, respectively. Meanwhile, these multi-carrier modulation section and multi-carrier demodulation section are included in the digital processing section 2A shown in FIG. 29, but are not shown in FIG. 29.

As shown in FIG. 32(A), the multi-carrier modulation section of this embodiment is equipped with an inverse wavelet transform section 30A which carries out inverse wavelet transform to transmission data. The inverse wavelet transform section 30A has a discrete cosine transform section 31A which carries out discrete cosine transform to transmission data, a filter section 32A which carries out filtering processing to an output of the discrete cosine transform section 31A, and a parallel/serial conversion section (hereinafter, P/S conversion section) 33A which converts parallel data, that was outputted from the filter section 32A, into serial data.

As shown in FIG. 32(B), the multi-carrier demodulation section of this embodiment has a first wavelet transform unit 40A and a second wavelet transform unit 50A which carry out wavelet transform to reception data. Here, as described earlier, this embodiment adopts a multi-carrier transmission system which carries out data communication by digital modulation/demodulation processing using a real coefficient wavelet filter bank which handles complex information, as reception data, and therefore, the multi-carrier demodulation section has two wavelet transform units for real part data and imaginary part data.

The first wavelet transform unit 40A has a serial/parallel conversion section (hereinafter, S/P conversion section) 41A which converts reception data, which is serial data, into parallel data, a real part filter section 42A which extracts real part data from data which was parallel-converted by the S/P conversion section 41A, and a discrete cosine transform section 43A which carries out discrete cosine transform to the extracted real part data.

In addition, the second wavelet transform unit 50A has a S/P conversion section 15A which converts reception data, which is serial data, into parallel data, a imaginary part filter section 52A which extracts imaginary part data from data which was parallel-converted by the S/P conversion section 51A, and a discrete sine transform section 53A which carries out discrete sine transform to the extracted imaginary part data.

In this manner, the multi-carrier communication apparatus 1A in this embodiment can handle complex information as reception data, by use of a real part component of reception data which is obtained by the first wavelet transform unit 40A, and an imaginary part component of reception data which is obtained by the second wavelet transform unit 50A.

In the meantime, the above-described discrete cosine transform sections 31A, 43A are, for example, a discrete cosine transform unit of a type IV, and the discrete sine transform unit 53A is, for example, a discrete sine transform unit of a type IV.

Figure 33:
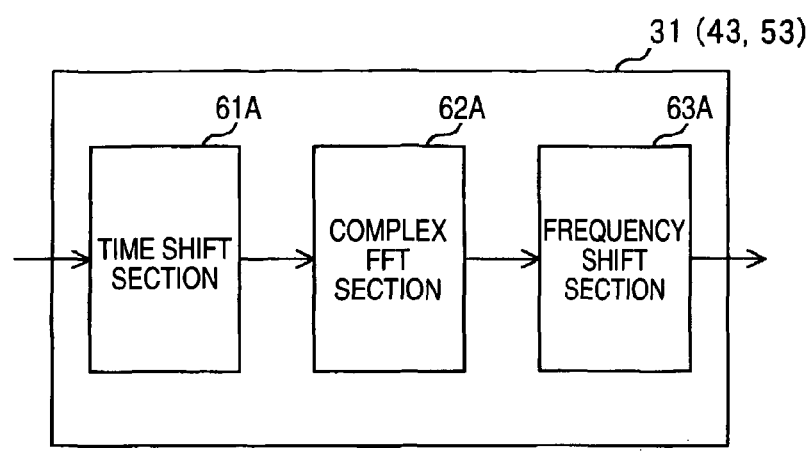
FIG. 33 is a block diagram which shows a schematic configuration of a discrete cosine transform section or a discrete sine transform section.

FIG. 33 is a block diagram which shows a schematic configuration of a discrete cosine transform section or a discrete sine transform section. As shown in FIG. 33, the discrete cosine transform sections 31A, 43A or the discrete sine transform section 53A has a time shift section 61A which carries out predetermined time shift to a signal which was inputted, a complex FFT section 62A which carries out complex FFT computing to a signal which was time-shifted, and a frequency shift section 63A which carries out predetermined time shift to a signal which was FFT-computed.

In this manner, in the discrete cosine transform and discrete sine transform processing, FFT computing is carried out, and as shown in FIG. 32, at the time of reception, in order to demodulate a real part component and an imaginary part component of reception data, two FFT sections become necessary in case of disposing both of the discrete cosine transform section 43A and the discrete sine transform section 53A. Here, by use of the FFT sections 21A, 22A in the digital processing section 2A shown in FIG. 29, a case of carrying out these processing will be described.

Figure 34:
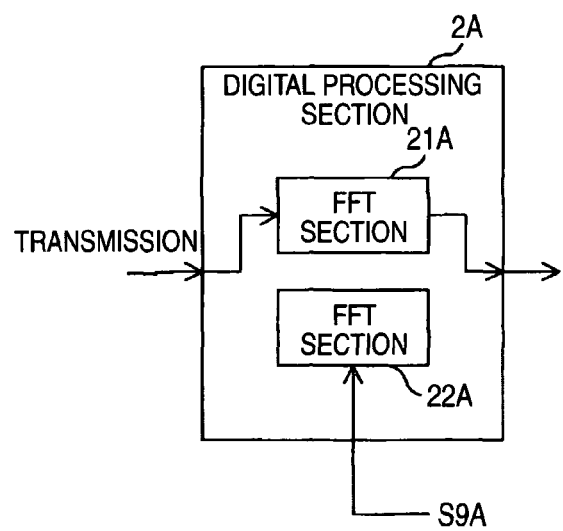
FIGS. 34(a) and 34(b) are explanatory views which show a processing example by the FFT section which relates to the eighth embodiment of the invention.
Figure 34:
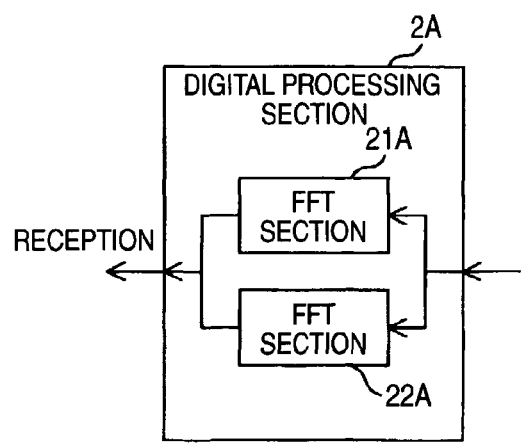

FIG. 34 is an explanatory view which shows a processing example by a FFT section that relates to the eighth embodiment of the invention, and FIG. 34(A) shows an occasion of transmission, and FIG. 34(B) shows an occasion of reception.

As shown in FIG. 34(A), at the time of transmission, the FFT section 21A is sued for FFT computing processing in discrete cosine transform which is carried out on the occasion of carrying out multi-carrier demodulation to transmission data. Then, as to the FFT section 22A, unbalance detection digital data S9A, which was outputted from the A/D conversion section 9A, is inputted thereto, and it carries out FFT and converts detection data on a time domain of an unbalance component into data on a frequency domain, and calculates a detection value of an unbalance component with respect to each frequency band which corresponds to a plurality of carriers of a multi-carrier communication signal.

In addition, as shown in FIG. 34(B), at the time of reception, as to the FFT section 21A and the FFT section 22A, one FFT section among them is used for FFT computing processing in discrete cosine transform which is carried out on the occasion of carrying out multi-carrier demodulation to reception data, and the other FFT section is used for FFT computing processing in discrete sine transform which is carried out on the occasion of carrying out multi-carrier demodulation to reception data.

therefore, at the time of reception, demodulation processing is carried out by use of both of the two FFT sections 21A, 22A, and at the time of transmission, demodulation processing is carried out by use of one of the two FFT sections 21A, 22A, and frequency analysis processing of an unbalance component is carried out by use of the other, and thereby, it is possible to carry out transmission processing, reception processing, frequency analysis processing of an unbalance component, by use of two FFTs.

According to the suchlike eighth embodiment of the invention, in case of handling complex information as reception data, in a multi-carrier transmission system which carries out data communication by digital modulation/demodulation processing through the use of a real coefficient wavelet filter bank, one of two FFT sections, which falls in non-use at the time of transmission, carries out frequency analysis of an unbalance component, and thereby, there is no need to newly dispose a FFT section for frequency analysis of an unbalance component, and therefore, it is possible to carry out frequency analysis of an unbalance component, without increasing a circuit size and cost, electric power consumption and so on.

Ninth Embodiment

An embodiment of the invention shows a configuration example of a communication apparatus which is equipped with a signal level adjustment device which adjusts a signal level of a multi-carrier communication signal depending on an unbalance component on a transmission line, and a transmission section and a reception section together with this signal level adjustment device, in a balance communication system which carries out data transmission through a balance transmission line. The signal level adjustment device in this embodiment is used suitably for a balance communication system such as an electric power line communication system using an electric power line as a transmission line. In addition, as data communication, it is applicable to electric power line communication using a frequency division multiplex signal, OFDM (Orthogonal Frequency division Multiplexing) and so on, and data communication such as ADSL (Asymmetric Digital Subscriber Line).

Figure 35:
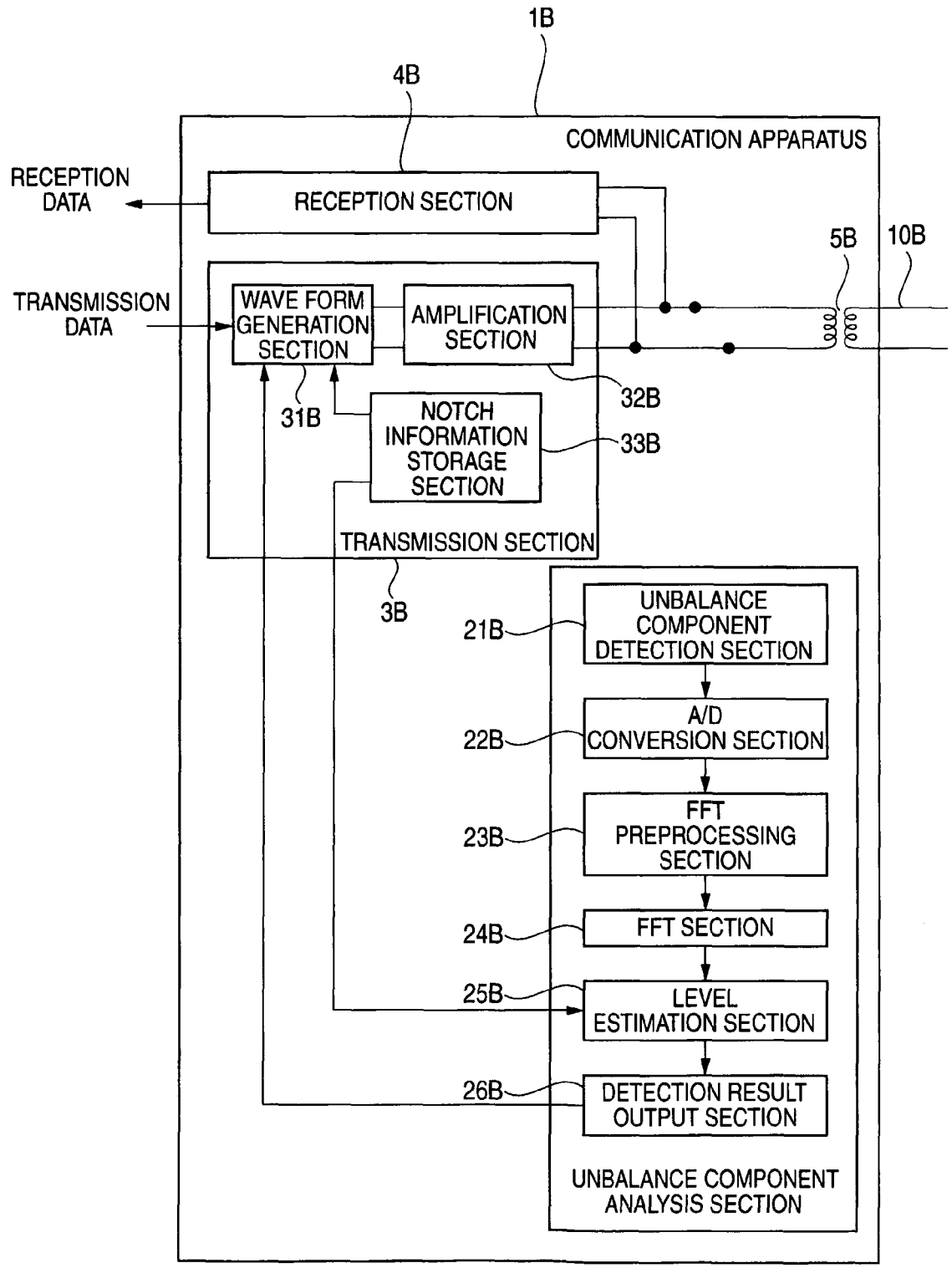
FIG. 35 is a block diagram which shows a configuration of a communication, apparatus that relates to a ninth embodiment of the invention.

FIG. 35 is a block diagram which shows a configuration of a communication apparatus that relates to an ninth embodiment of the invention. A communication apparatus 1B in this embodiment is a communication apparatus of an electric power line communication system, which utilizes an electric power line 10B such as an in-house electric lighting line as a transmission line, and carries out transmission/reception of data by a multi-carrier communication system using OFDM etc. This communication apparatus 1B is configured by having an unbalance component analysis section 2B which detects an unbalance component of the electric power line 10B and analyzes its frequency characteristic, a transmission section 3B which carries out transmission of data, a reception section 4B which carries out reception of data, a coupling transformer 5B which couples the transmission section 3B and the reception section 4B, and the electric power line 10B.

The unbalance component analysis section 2B is configured by having an unbalance component detection section 21B which detects a common mode current in the electric power line 10B, an A/D conversion section 22B which converts a common mode current, which was detected by the unbalance component detection section 21B, into digital data, a FFT preprocessing section (preprocessing section) 23B which applies preprocessing on the occasion of carrying out FFT (Fast Fourier Transform) to an output of the A/D conversion section 22B, a FFT section (time-frequency transformation section) 24B which FFT-processes an output of the FFT preprocessing section 23B to carry out time-frequency transformation, and calculates a detection value on a frequency domain of a common mode current to carry out frequency analysis, a level estimation section 25B which estimates a level of an unbalance component of another non-detected carrier, on the basis of a level detection result of an unbalance component in a detection carrier that is obtained as an output of the FFT section 24B, and a detection result output section 26B which outputs it as a detection result of an unbalance component by use of a level estimation value of an unbalance component. Meanwhile, FFT is one example of time-frequency transformation, and there is necessary no need to limit to this.

The unbalance component detection section 21B is a thing which detects an unbalance component on a transmission line, by detecting a common mode current of the electric power line 10B that is composed of a pair of transmission conductors, through the use of a transformer and a resister bridge, an ampere meter and a volt meter etc. The FFT preprocessing section 23B has a function for reducing the number of points of FFT at a subsequent stage, by applying addition processing or subtraction processing as to data with predetermined number of samples which were A/D-converted by the A/D conversion section 22B.

The FFT section 24B converts detection data on a time domain of an unbalance component by FFT into data on a frequency domain, and calculates a signal level of an unbalance component with respect to each frequency band which corresponds to a plurality of carriers in a multi-carrier communication signal, as a detection value. At this time, by carrying out FFT of the number of points which was reduced by the FFT preprocessing section 23B, processing quantity of FFT is reduced, and it becomes possible to carry out FFT processing at short times.

The level estimation section 25B estimates a signal level of an unbalance component, as to a frequency band of a carrier in which a signal level of an unbalance component is not calculated by the FFT processing in the FFT section 24B, in which the number of points was reduced (non-detection carrier), on the basis of a detection result in a frequency band of a carrier in which a signal level of an unbalance component was calculated by the FFT section 24B (detection carrier). The detection result output section 26B stores an unbalance component level of each carrier in association with information of carrier frequency etc., by use of a level estimation value which was estimated by the level estimation section 25B, and outputs it as a detection result of an unbalance component relating to all carriers. This detection result is obtained as an amplitude of a common mode current with respect to each carrier on a frequency domain, and supplied to the transmission section 3B.

The transmission section 3B is configured by having a wave form generation section 31B which generates a transmission wave form, a amplification section 32B which amplifies or attenuates a transmission wave form, and a notch information storage section 33B which stores information of a frequency band (notch band) in which a carrier is not transmitted. Information of the notch band is supplied to the wave form generation section 31B, and supplied to the level estimation section 25B in the unbalance component analysis section 2B.

The wave form generation section 31B controls a transmission level with respect to each carrier. Concretely speaking, in case that a value of an unbalance component of each carrier which is outputted from the detection result output section 26B exceeds a predetermined threshold value (power-down threshold value), a transmission level of that carrier is lowered by a predetermined amount. In addition, in case that a value of an unbalance component of each carrier is smaller than a predetermined threshold value B (power-up threshold value), a transmission level of that carrier is increased by a predetermined amount. Meanwhile, the threshold value A is set up to a larger value than the threshold value B. By this means, it is possible to keep a transmission level with respect each carrier in a large level, over reducing a common mode current with respect each carrier so as to prevent occurrence of such a matter that a radiation level from a transmission line becomes excessive. Meanwhile, the signal level adjustment device, which relates to this embodiment, is configured by including the above-described unbalance component analysis section 2B (at least the FFT section 23B and the level estimation section 25B), and the wave form generation section 31B of the transmission section 3B.

Meanwhile, in the above-described embodiment, the FFT preprocessing section 23B is disposed, but there is no need to necessarily dispose the FFT preprocessing section. It is possible to reduce the number of points in FFT without disposing the FFT preprocessing section. For example, in case of such an apparatus that a very high accurate calculation result is not required on the occasion of detection of an unbalance component and subsequent signal level adjustment, it is possible to realize simplification of a circuit configuration relating to the FFT preprocessing section and reduction of processing time, by configuring so as not to dispose the FFT preprocessing section.

Figure 36:
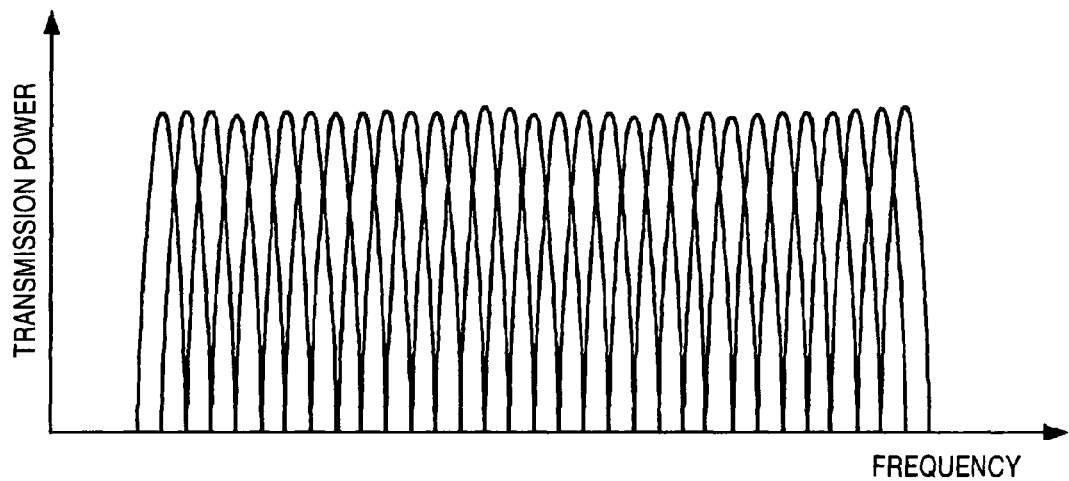
FIGS. 36(a) and 36(b) are views which show one example of a transmission signal wave form and a common mode current wave form.
Figure 36:
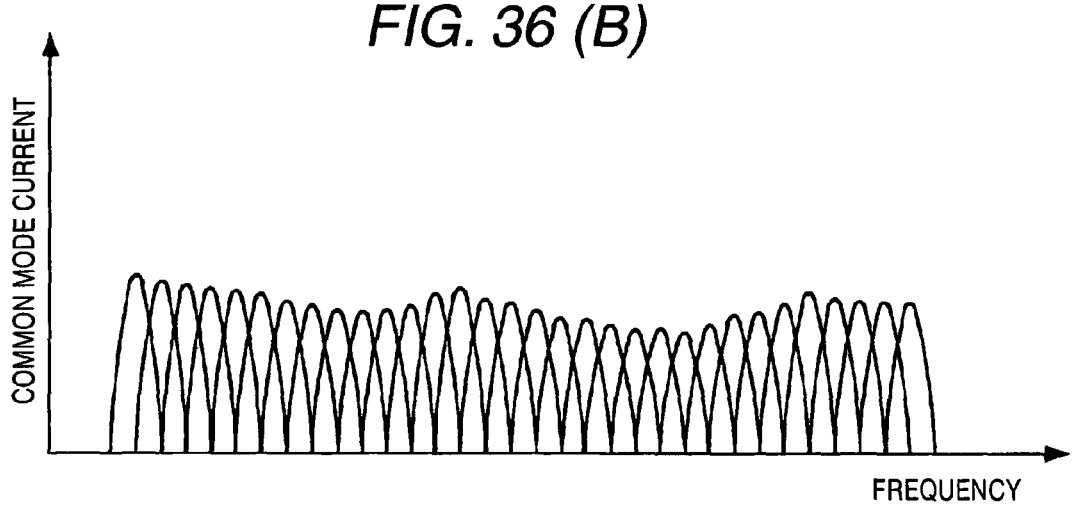

FIG. 36 is a view which shows one example of a transmission signal wave form and a common mode current wave form. In a transmission line of an electric power line communication system, a common mode current, which corresponds to a frequency characteristic of an unbalance component on the electric power line 10B, is generated to a transmission signal of a multi-carrier shown in FIG. 36(A), for example, as shown in FIG. 36(B).

Figure 37:
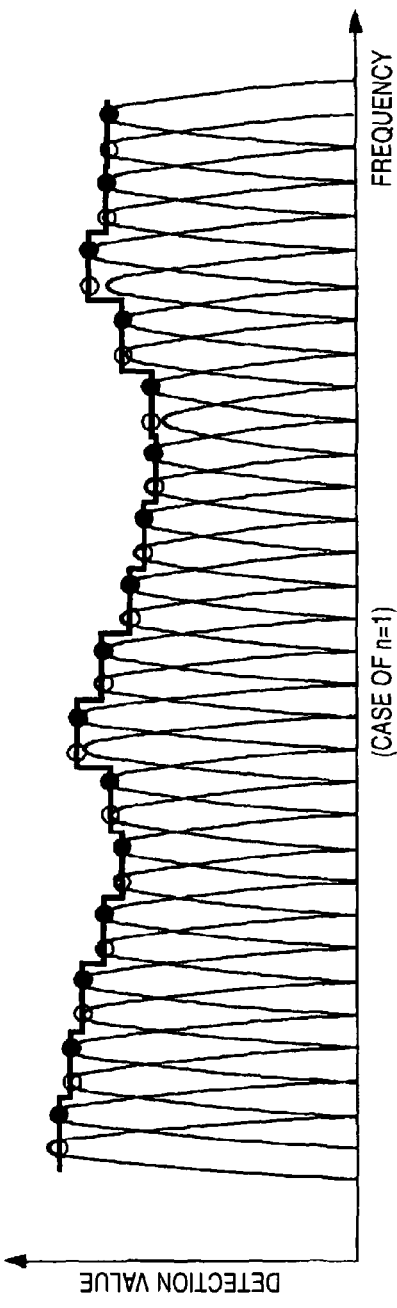
FIGS. 37(a) and 37(b) are views which show a detection point for detecting an unbalance component and an interpolation point for interpolates a detection result.
Figure 37:
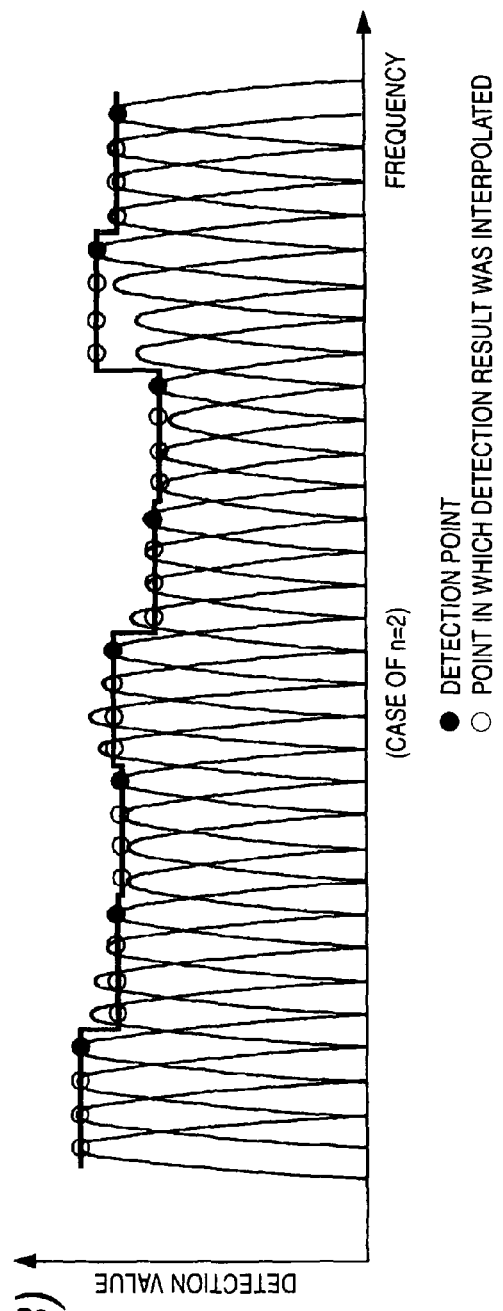

FIG. 37 is a view which shows a detection point for detecting an unbalance component and an interpolation point for interpolating a detection result. This FIG. 37 shows operations of a level estimation section 25B which estimates a level of an unbalance component of a non-detection carrier on the basis of a detection result of a detection carrier and interpolates it, and a detection result output section 26B. The unbalance component analysis section 2B carries out FFT by setting the number of points of FFT to ½$^n$ of the number of carriers in the FFT section 24B. FIG. 37 shows an example of carrying out estimation by allocating a detection result of the nearest detection carrier with high frequency, to a non-detection carrier. As shown in FIG. 37(A), in case of n=1, half (½) of carriers becomes detection points (shown by a black circle) which correspond to detection carriers. In this case, to an interpolation point (shown by a white circle) which corresponds to a non-detection carrier, a detection result of an adjacent detection point on a higher frequency side is allocated. As shown in FIG. 37(B), in case of n=2, ¼ of the number of all carriers become detection points (detection carrier). In this case, to an interpolation point (non-detection carrier, successive three carriers), a detection result of an adjacent detection point on a higher frequency side is allocated. As to a non-detection carrier for which a detection result is not obtained by thinning out the number of samples of FFT in this manner, a signal level is estimated by a detection result of a detection carrier to carry out interpolation.

Figure 38:
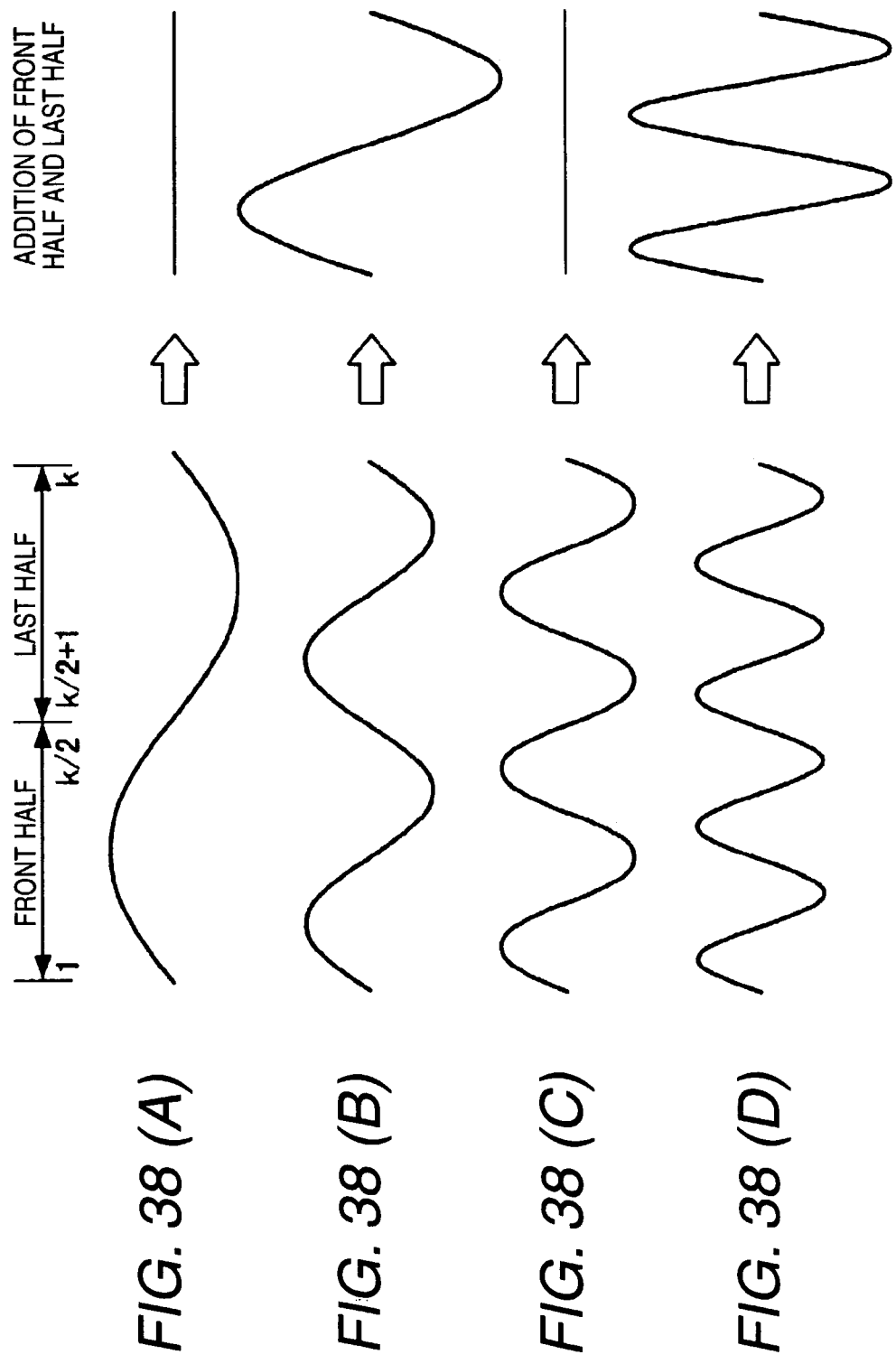
FIGS. 38(a) to 38(d) are views which show an operation for reducing the number of FFT points by addition processing and for taking out only a component of an even number times wave.

FIG. 38 is a view which shows an operation for reducing the number of points of FFT by addition processing and taking out only a component of an even number times wave, to remove an influence of an adjacent carrier. Meanwhile, FIG. 38 shows an analog like signal wave form image (i.e., an image of a wave form in which each frequency component was shown), but in a practical sense, it is realized by computing processing of digital data. As shown in FIGS. 38(A) through (D), by adding each data of a front half (1 through k/2) with a sampling number k and each data of a last half (k/2+1 through k) respectively, a signal at an odd number cycle in the sampling number k is eliminated, and as to a signal at an even number cycle, its amplitude becomes double. Therefore, by adding each data of a front half with the sampling number k and each data of a last half and reducing an amplitude to ½, it is possible to take out only a signal component of an even number times wave with the sampling number k, and to reduce the sampling number to half, k/2.

Meanwhile, as to the above-described signal at an even number cycle, it is also possible to take out only a signal component of a quadruple wave, by adding each data of first one quarter (1 through k/4) of a front half of the sampling k, each data of next one quarter (k/4+1 through k/2), and one quarter (k/2+1 through 3k/4) of a front half of a last half, and each data of next one quarter (3k/4+1 through k).

In addition, by deducting each data of a front half (1 through k/2) with the sampling number k and each data of a last half (k/2+1 through k) each other, a signal at an even number cycle with the sampling number k is negated, and a signal at an odd number cycle is doubled. Therefore, by subtracting each data of a front half with the sampling number k and each data of a last half and reducing an amplitude to ½, it is possible to take out only a signal component of an odd number times wave with the sampling number k.

Figure 39:
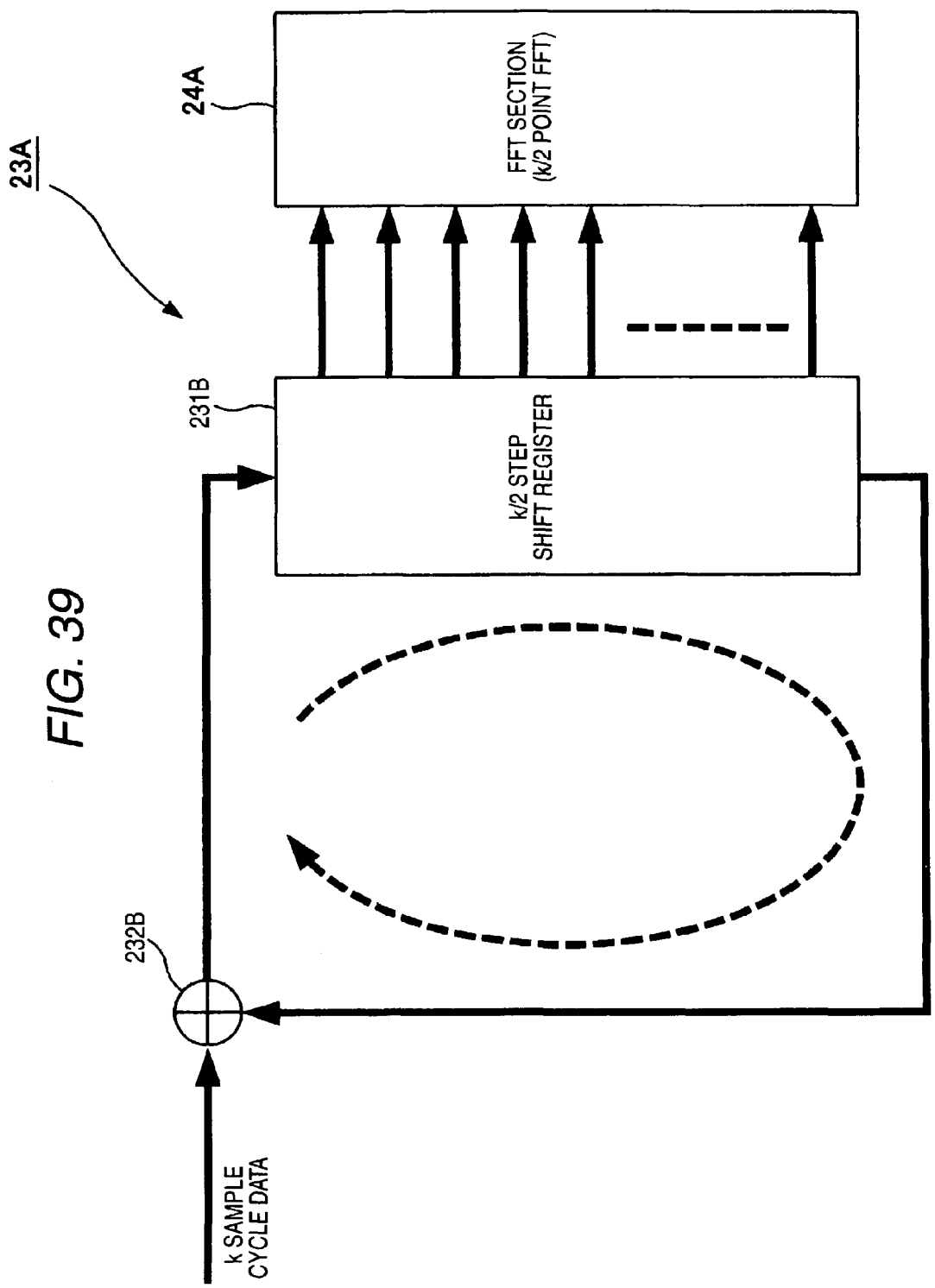
FIG. 39 is a view which shows one example of a FFT preprocessing section in this embodiment.

FIG. 39 is a view which shows one example of the FFT preprocessing section. This example is a configuration example for reducing the number of points of FFT by addition processing. The FFT preprocessing section 23A is configured by having a k/2 step shift register 231 and an adder 232B. In this configuration, by adding sampling data of a k sample cycle (such a cycle that a sampling cycle becomes k pieces) and sampling data which was k/2-step-shifted by the k/2 step shift register 231 through the use of the adder 232B, each data of a front half (1 through k/2) with the sampling number k and each data of a last half (k/2+1 through k) are added respectively. Then, FFT for the number of points which was reduced to k/2 is carried out by the FFT section 24A at a latter stage. By this means, it is possible to remove an influence of an adjacent carrier over reducing the number of points of FFT, and it is possible to accurately detect an amplitude of a desired carrier. In addition, since the number of points of FFT is reduced by half, it is possible to shorten processing time which is required for analysis of a frequency characteristic.

Figure 40:
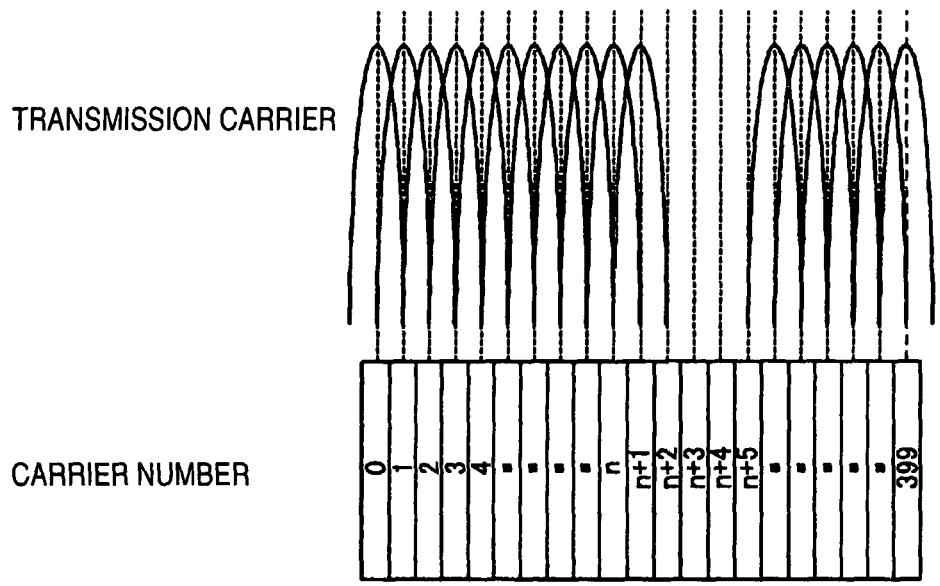
FIG. 40 is a view which shows a concrete example of a transmission carrier having a notch band.

FIG. 40 is a view which shows a concrete example of a transmission carrier having a notch band. This FIG. 40 shows an example of a transmission wave which was configured by 400 pieces of carriers on a frequency domain, as a transmission carrier for carrying out multi-carrier communication by wavelet OFDM. Meanwhile, a lower side of FIG. 40 shows carrier numbers of 0 through 39. In the example shown in the figure, realized is such a notch band that there are not four pieces of carriers with carrier numbers n+2 through n+5.

Figure 41:
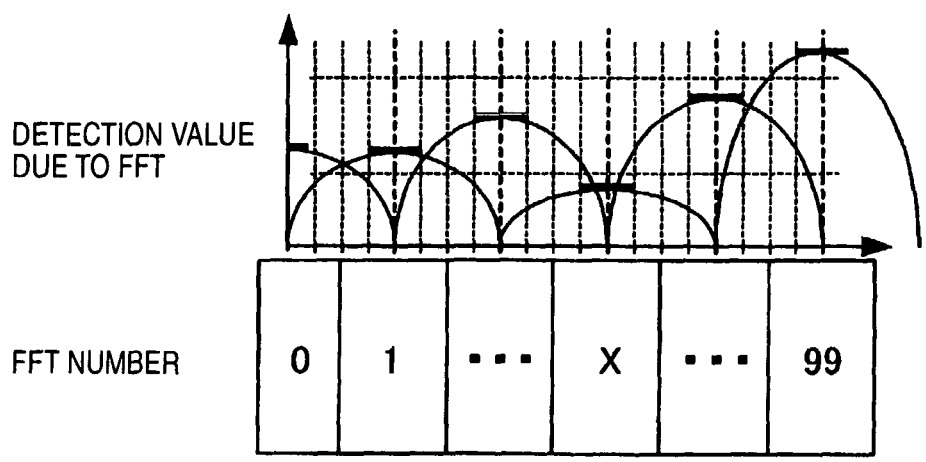
FIG. 41 is a view which shows a concrete example of a detection result of an unbalance component by FFT.

FIG. 41 is a view which shows a concrete example of a detection result of an unbalance component by FFT. Here, it is assumed that a detection value of a signal level of an unbalance component is obtained by FFT in the FFT section 24, as to 100 pieces of carriers, every 4 pieces to 400 pieces of carriers shown in FIG. 40. Meanwhile, a lower side of FIG. 41 shows FFT numbers of 0 through 99. In the example shown in the figure, detection values of respective signals levels are obtained as to detection carriers every 4 pieces, and as to a detection carrier of a FFT number X which corresponds to a notch band, a signal level becomes larger than 0 under the influence of an adjacent detection carrier.

Figure 42:
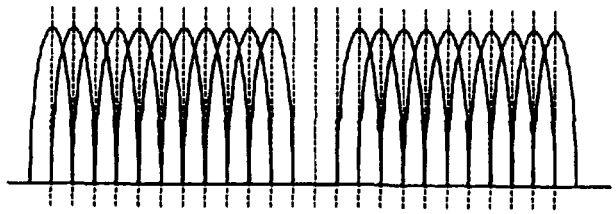
FIGS. 42(a) to 42(e) are views which explain a trouble in operations of level estimation in a level estimation section and transmission level control a wave form generation section.
Figure 42:
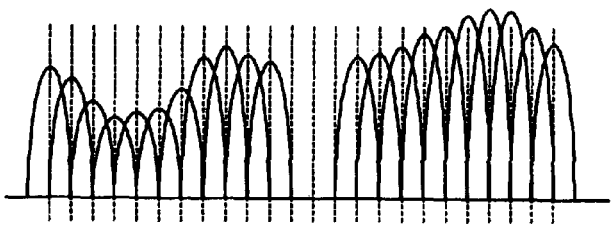
Figure 42:
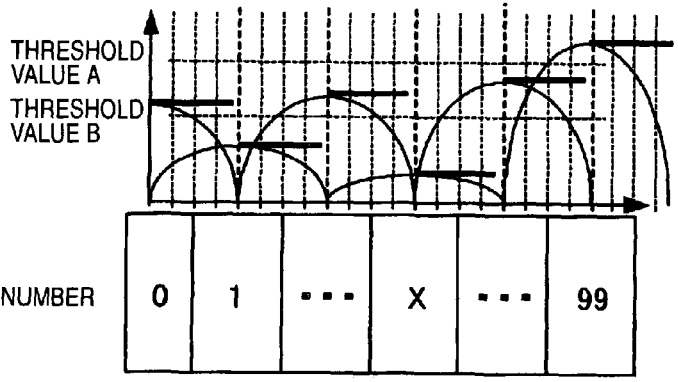
Figure 42:
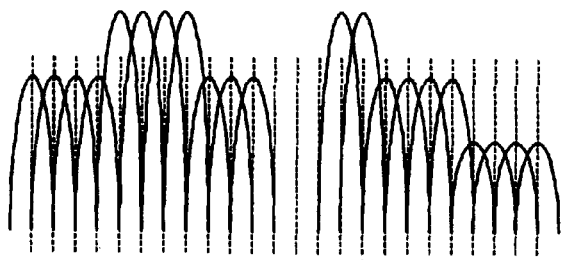
Figure 42:
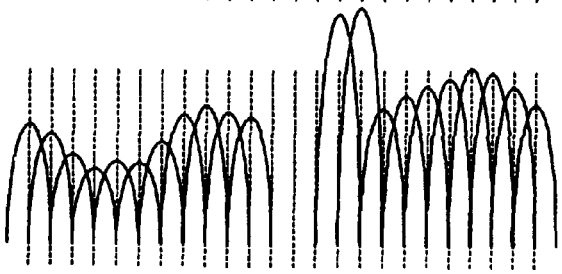

FIG. 42 is a view which explains troubles in operations of level estimation in the level estimation section 25B and transmission level control in the wave form generation section 31B. when a detection result of a detection carrier which exists in a notch band is applied to a non-detection carrier which exists in a non-notch band (normal carrier band) which is adjacent to this notch band, there is such fear that control for enlarging a transmission level by a detection value of a small signal level in the notch band is carried out, and a transmission level of the carrier becomes too much larger than an appropriate value. FIG. 42(A) shows a transmission carrier, and there is a notch band in this transmission carrier. FIG. 42(B) shows a measurement value of an unbalance component which corresponds to a transmission carrier shown in FIG. 42(A), and in the notch band, there exists no carrier, and therefore, an unbalance component is not generated.

FIG. 42(C) shows a detection value of a signal level which is a processing result due to such a matter that FFT was applied to a measurement value of an unbalance component shown in FIG. 42(B) in the FFT section 24B, and a level estimation value of a non-detection carrier by the level estimation section 25B. In this example, the number of points of FFT is set to ¼ of the number of carriers, and a value, which corresponds to each FFT number (a value shown by a vertical broken line, i.e., a value of a top of a mountain of a real line) becomes a detection value of a signal level of an unbalance component in each detection carrier, which was calculated by FFT respectively. Then, in FIG. 42(C), as shown by a thick line extended in a lateral direction from each detection value, as to 3 pieces of adjacent non-detection carriers on a higher frequency side than respective detection carriers, a value, which is identical to a detection value of the detection carrier, is used as a level estimation value of an unbalance component.

In case that a value of an unbalance component of each carrier exceeds the threshold value A, the wave form generation section 31B of the transmission section 5B controls to let down a transmission level by a predetermined amount, and in case that it is smaller than the threshold value B, it controls so as to raise the transmission level by a predetermined amount. In case that a detection carrier is in a notch band, a detection value of a signal level of a detection carrier in the notch band becomes a smaller value than the threshold value B, and therefore, when this low value is allocated as level estimation values of unbalance components of 3 pieces of adjacent non-detection carriers, it becomes different from a value of an actual unbalance component in this non-detection carrier. FIG. 42(D) shows a transmission carrier after transmission level control. As shown in the figure, as to a carrier in which a detection value of a signal level of an unbalance component or a level estimation value exceeds the threshold value A, a transmission level is lowered, and as to a carrier in which a detection value of a signal level of an unbalance component or a level estimation value is smaller than the threshold value B, a transmission level is increased. As a result of this control, as shown in FIG. 42(E), as to an unbalance component after transmission level control, a value of the unbalance component becomes large in two non-detection carriers in each of which a level estimation value was set to the same as a detection value of a signal level in a notch band.

In order to avoid the above-described bad effect, in this embodiment, on the occasion of carrying out level estimation of an unbalance component of a non-detection carrier in the level estimation section 25B, processing for removing an influence due to a detection value of a signal level of a detection carrier in a notch band is carried out in a non-detection carrier surrounding a notch band.

Figure 43:
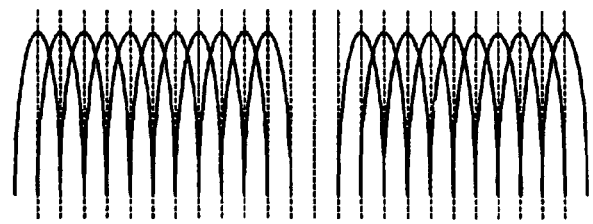
FIGS. 43(a) to 43(e) are views which show a ninth embodiment of the operations in the level estimation section and the wave form generation section of this embodiment.
Figure 43:
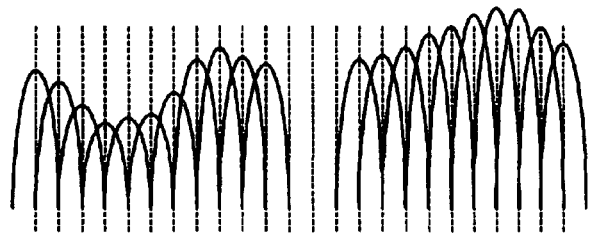
Figure 43:
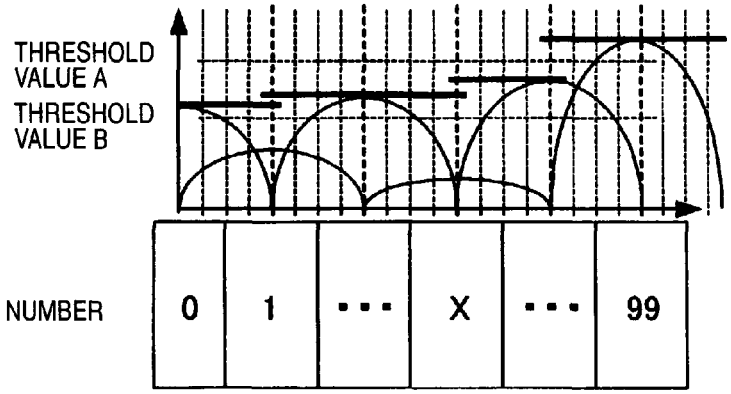
Figure 43:
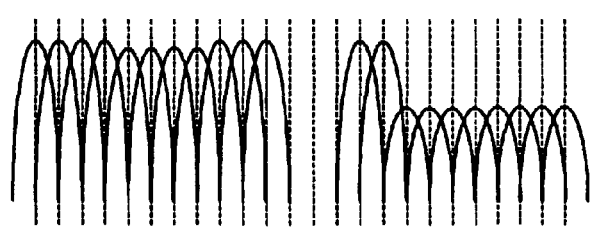
Figure 43:
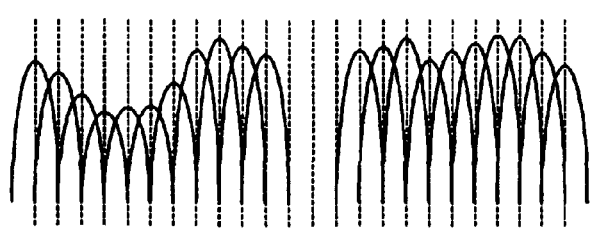

FIG. 43 is a view which shows a ninth embodiment of operations in the level estimation section 25B and the wave form generation section 31B. The ninth embodiment is of such a thing that, as a level estimation value for N pieces of detection carriers and non-detection carriers in between, a maximum value or an average value in (N+a) pieces of detection carriers in which a pieces of adjacent detection carriers were added to N pieces of detection carriers is obtained, and this is used as a representative value of a corresponding estimation range (N pieces of detection carriers and non-detection carriers in between and a pieces of non-detection carriers on the side of detection carriers), and the level estimation value M is set up, and by use of the level estimation value M, a transmission level of each carrier is controlled.

In the ninth embodiment, as shown in FIG. 43(A), there is a notch band with a size of 3 pieces of carriers in a transmission carrier, and as shown in FIG. 43(B), a measurement value of an unbalance component, which corresponds to each transmission carrier, is obtained. At this time, a detection value of a signal level by FFT processing in the FFT section 24B becomes a value which is shown by a vertical broken line in FIG. 43(C), i.e., a value of a top of a mountain of a real line. Here, it is assumed that N=1 and a=1. The level estimation section 25B obtains a maximum value or an average value in (N+a) pieces of detection carriers, i.e., total 2 pieces of detection carriers of a spotlighted detection carrier and 1 piece of a detection carrier on a higher frequency side than this, in a direction from low frequency to high frequency on a frequency domain. Then, this value is used as a representative value for 2 pieces of relevant detection carriers and 3 pieces of non-detection carriers in between, and this is set up as the level estimation value M. Meanwhile, FIG. 43 shows such a case that a maximum value was used as the level estimation value M.

When the above-described processing is carried out repeatedly in sequence from low frequency to high frequency as to all detection carriers, a level estimation value of each carrier becomes one shown by a thick line extended in a lateral direction in FIG. 43(C). The detection result output section 26B stores a level estimation value of an unbalance component which was obtained by the above-described level estimation, in association with information of frequency etc. of each carrier, and outputs it as a detection result of an unbalance component relating to all carriers.

The wave form generation section 31 controls so as to increase a transmission level by a predetermined amount in case that a value of an unbalance component of each carrier exceeds the threshold value A, and control so as to reduce a transmission level by a predetermined amount in case that it is smaller than the threshold value B. In this case, a detection result of an unbalance component exceeds the threshold value A in a high frequency band, and therefore, as shown in FIG. 43(D), a transmission level of a carrier in a high frequency band in which a number of unbalance components were detected is lowered in a transmission carrier after transmission level control.

By this means, as shown in FIG. 43(E), a transmission level with respect to each carrier is adjusted in such a manner that an unbalance component after transmission level control falls in an appropriate range.

Figure 44:
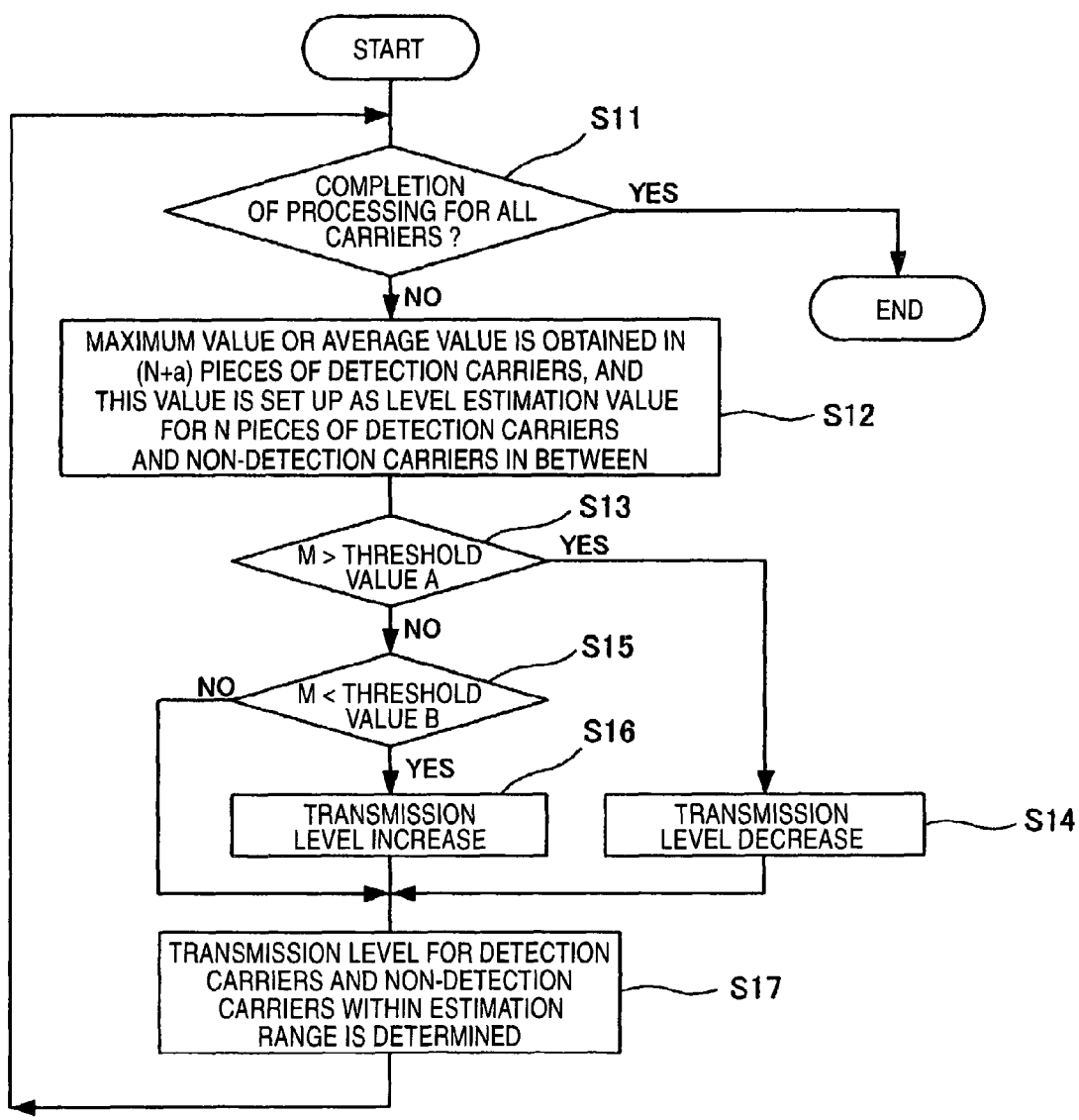
FIG. 44 is a flow chart which shows a processing sequence of the ninth embodiment of the operations in the level estimation section and the wave form generation section of this embodiment.

FIG. 44 is a flow chart which shows a processing sequence of the ninth embodiment of operations in the level estimation section 25B and the wave form generation section 31B. Firstly, as to all carriers, it is judged whether processing of unbalance component level estimation and transmission level control was completed or not (step S11), and in case that it is not completed, it moves to level estimation processing by the level estimation section 25B in a next step S12, and in case that it has been completed, this processing is terminated. In the step S12, the level estimation section 25B obtains a maximum value or an average value in (N+a) pieces (Here 2 pieces) of detection carriers, and sets up this value as a level estimation value M for N pieces (here, 1 piece) of detection carriers and non-detection carriers in between.

Next, the wave form generation section 31B judges whether the level estimation value M is larger than the threshold value A or not (step S13), and in case that it is larger, it carries out control for reducing a transmission level of a corresponding carrier (step S14). In the step S13, in case that the level estimation value M is less than the threshold value A, it judges whether the level estimation value M is smaller than the threshold value B or not (step S15), and in case that it is smaller, it carries out control for increasing a transmission level of a corresponding carrier (step S16). Then, by the above-described control result of the transmission level, a transmission level of detection carriers and non-detection carriers in an estimation range, which is a range where the above-described level estimation value M was set up, is determined (step S17). After this, it goes back to the step S1, and the above-described processing is repeated until processing of estimation of an unbalance component level and control of a transmission level are completed as to all carriers.

By carrying out the processing of the above-described ninth embodiment, the level estimation value M for non-detection carriers within the estimation range (in N pieces of detection carriers for which level estimation is carried out) is determined by a maximum value or an average value of (N+1) pieces of detection carriers. On this account, by arbitrarily setting up a value of N and a, even in case that there exists a notch band, for example, by configuring in such a manner that the level estimation value M can be obtained in a larger range than a value of the notch band, it is possible to prevent occurrence of such a matter that level estimation of non-detection carriers outside the notch band is carried out by a detection value of a signal level in the notch band. By this means, it is possible to appropriately carry out transmission level control through the use of a detection result of an unbalance component, and it is possible to eliminate such a trouble that a transmission level is controlled to be larger than an appropriate range.

Meanwhile, the above-described processing example showed an operation of carrying out selection of N pieces of detection carriers and a pieces of detection carriers which are next to them in a direction from low frequency to high frequency, and determination of the level estimation value M, but conversely, it is all right even if it is configured so as to carry out the same processing in a direction from high frequency to low frequency. In addition, as to values of N and a by which an estimation range for carrying out level estimation is determined, it is all right even if fixed values are set up arbitrarily, depending on a setting status of a notch band, and it is also possible to make them variable by a width and frequency etc. of a notch band. By setting values of N and a depending on a notch band to set up an estimation range appropriately, it is possible to carry out transmission level control with respect to each carrier in a fine manner.

Tenth Embodiment

Figure 45:
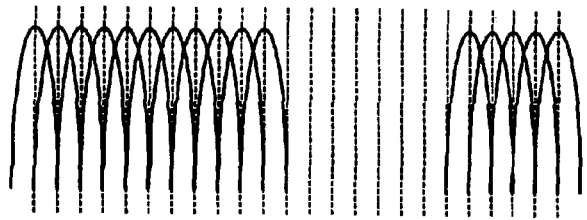
FIGS. 45(a) to 45(e) are views which show a tenth embodiment of the operations in the level estimation section and the wave form generation section of this embodiment.
Figure 45:
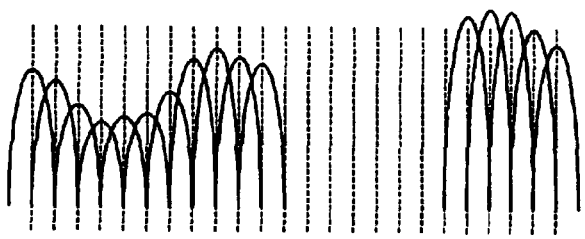
Figure 45:
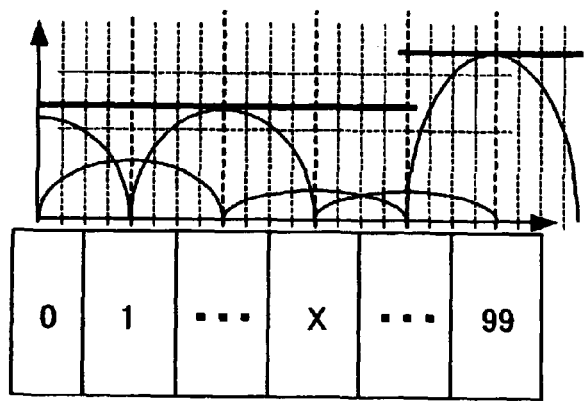
Figure 45:
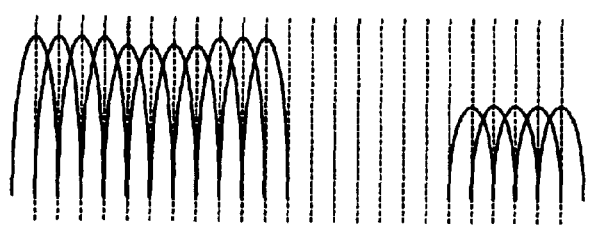
Figure 45:
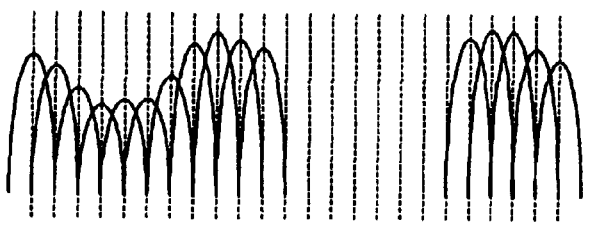

FIG. 45 is a view which shows a tenth embodiment of operations in the level estimation section 25 and the wave form generation section 31. The tenth embodiment is of such a thing that an estimation range for carrying out level estimation is set up to become a wider range than a width of a notch band, and a maximum value or an average value in N pieces of detection carriers in this estimation range is obtained, and this value is set up as the level estimation value M, and by use of the level estimation value M, a transmission level of each carrier is controlled.

In the tenth embodiment, as shown in FIG. 45(A), there is a notch band with a size of 8 pieces of carriers in a transmission carrier, and as shown in FIG. 45(b), a measurement value of an unbalance component, which corresponds to each transmission carrier, is obtained. At this time, a detection value of a signal level by FFT processing in the FFT section 24B becomes a value which is shown by a vertical broken line in FIG. 43(C), i.e., a value of a top of a mountain of a real line. Here, since detection carriers are located every 4 pieces, it is set up to N=3 (a size of 9 pieces of carriers) in order to realize a wider estimation range than a notch band with a size of 8 pieces of carriers. The level estimation section 25B obtains a maximum value or an average value in N pieces of detection carriers, i.e., 3 pieces of detection carriers including a spotlighted detection carrier, on a higher frequency side than this, in a direction from low frequency to high frequency on a frequency domain. Then, this value is used as a representative value for 3 pieces of relevant detection carriers and 6 pieces of non-detection carriers in between, and this is set up as the level estimation value M. Meanwhile, FIG. 45 shows such a case that a maximum value was used as the level estimation value M.

When the above-described processing is carried out repeatedly in sequence from low frequency to high frequency as to all detection carriers, a level estimation value of each carrier becomes one shown by a thick line extended in a lateral direction in FIG. 45(C). The detection result output section 26B stores a level estimation value of an unbalance component which was obtained by the above-described level estimation, in association with information of frequency etc. of each carrier, and outputs it as a detection result of an unbalance component relating to all carriers.

The wave form generation section 31 controls so as to increase a transmission level by a predetermined amount in case that a value of an unbalance component of each carrier exceeds the threshold value A, and control so as to reduce a transmission level by a predetermined amount in case that it is smaller than the threshold value B. In this case, a detection result of an unbalance component exceeds the threshold value A in a higher frequency band than a notch band, and therefore, as shown in FIG. 45(D), a transmission level of a carrier in a high frequency band in which a number of unbalance components were detected is lowered in a transmission carrier after transmission level control. By this means, as shown in FIG. 45(E), a transmission level with respect to each carrier is adjusted in such a manner that an unbalance component after transmission level control falls in an appropriate range.

Figure 46:
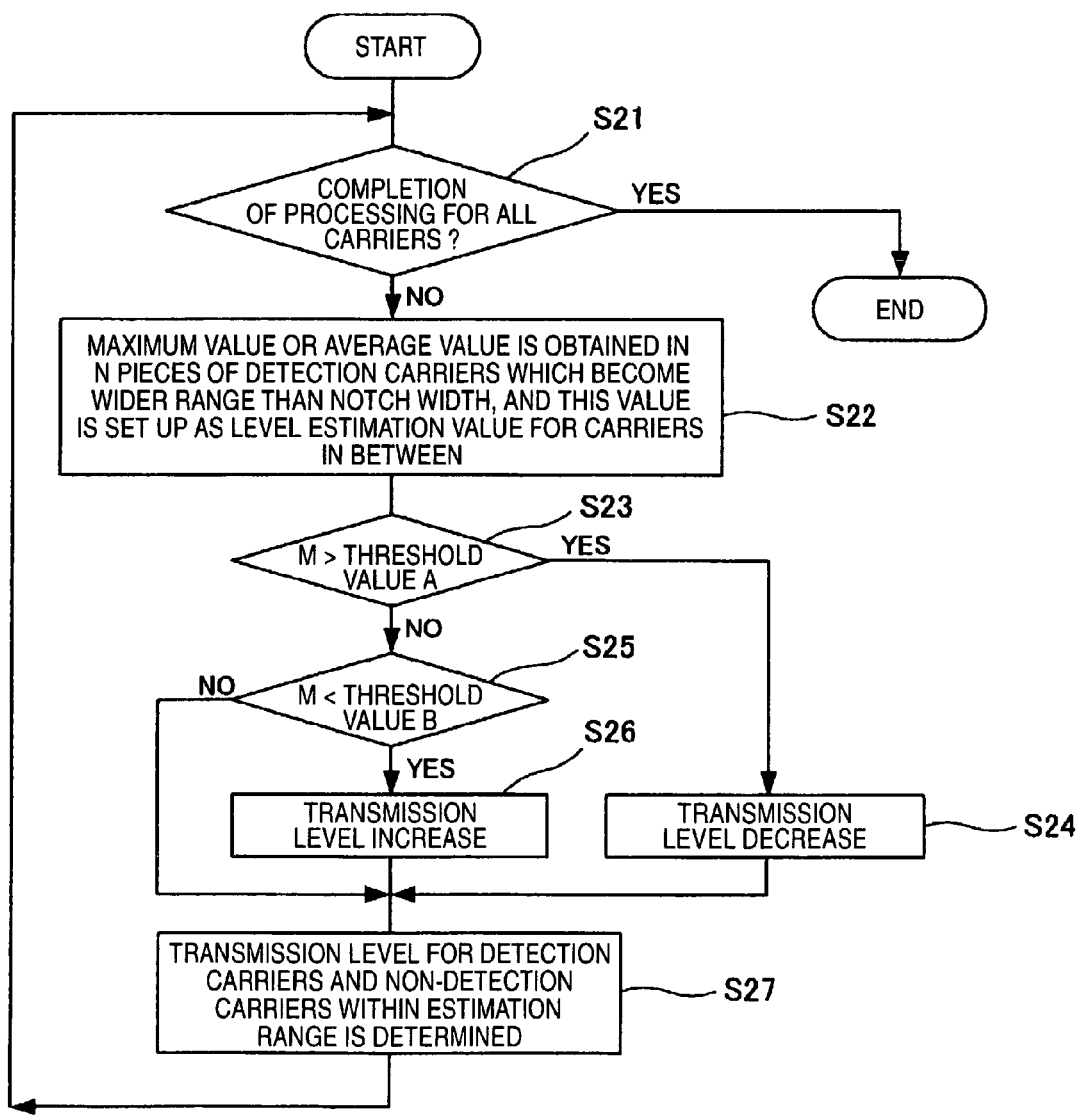
FIG. 46 is a flow chart which shows a processing sequence of the tenth embodiment of the operations in the level estimation section and the wave form generation section of this embodiment.

FIG. 46 is a flow chart which shows a processing sequence of the tenth embodiment of operations in the level estimation section 25B and the wave form generation section 31B. Firstly, as to all carriers, it is judged whether processing of unbalance component level estimation and transmission level control was completed or not (step S21), and in case that it is not completed, it moves to level estimation processing by the level estimation section 25B in a next step S22, and in case that it has been completed, this processing is terminated. In the step S12, the level estimation section 25B obtains a maximum value or an average value in N pieces (Here 3 pieces) of detection carriers, and sets up this value as a level estimation value M for detection carriers and non-detection carriers in between.

Processing in subsequent steps S23 through 27 are the same as that in the steps S13 through S17 shown in FIG. 44, and in the wave form generation section 31, a transmission level is adjusted to be increased or decreased, in case that the level estimation value M exceeded the threshold values A, B by judgment of the level estimation value M, the threshold value A and the threshold value B, and it is determined as a transmission level for detection carriers and non-detection carriers in an estimation range.

Meanwhile, the above-described processing example showed an operation of carrying out selection of N pieces of detection carriers in a direction from low frequency to high frequency, and determination of the level estimation value M, but conversely, it is all right even if it is configured so as to carry out the same processing in a direction from high frequency to low frequency. In addition, in case that a width of a notch band is variable, by configuring in such a manner that a value of N by which an estimation range for carrying out level estimation is determined is variable, it is possible to carry out appropriate level estimation by varying an estimation range depending on a width of a notch band.

By carrying out the above-described processing of the tenth embodiment, an estimation range has become a range of N pieces of detection carriers, which is wider range than a width of a notch band, and a level estimation value M for non-detection carriers in this estimation range is determined by a maximum value or an average value of N pieces of detection carriers. On this account, even in case that detection carriers are located in a notch band, it is possible to prevent occurrence of such a matter that level estimation for non-detection carriers outside a notch band is carried out by a detection value of a signal level in a notch band. By this means, it is possible to appropriately carry out transmission level control through the use of a detection result of an unbalance component, and it becomes to eliminate such a trouble that a transmission level is controlled to be larger than an appropriate range. In addition, in the tenth embodiment, a processing sequence is simple, and therefore, it is possible to carry out processing of level estimation of an unbalance component of a carrier and transmission level control at high speed.

Eleventh Embodiment

Figure 47:
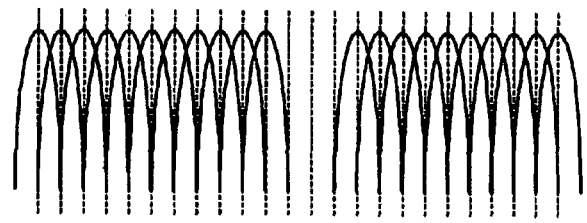
FIGS. 47(a) to 47(e) are views which show an eleventh embodiment of the operations in the level estimation section and the wave form generation section of this embodiment.
Figure 47:
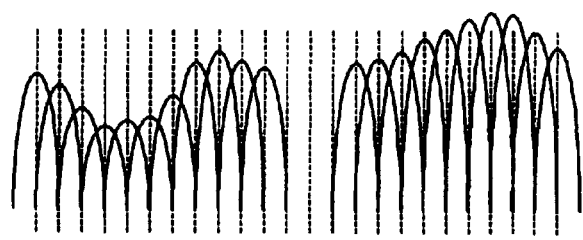
Figure 47:
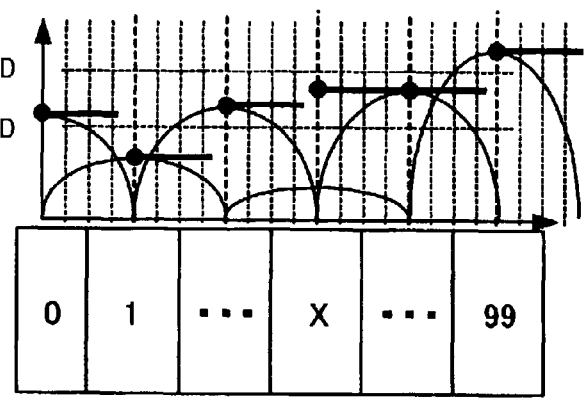
Figure 47:
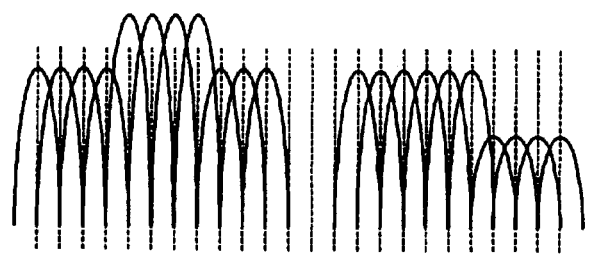
Figure 47:
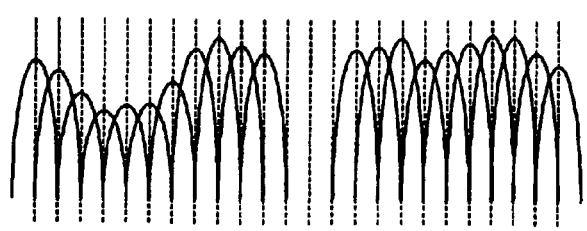

FIG. 47 is a view which shows an eleventh embodiment of operations in the level estimation section 25 and the wave form generation section 31. The eleventh embodiment is of such a thing that, in case that detection carriers are located in a notch band, on the occasion of carrying out level estimation of non-detection carriers in the vicinity of the notch band, a detection value of a signal level of the nearest detection carrier with high frequency or low frequency, which is next to the notch band, is used, and this value is set up as the level estimation value M.

In the eleventh embodiment, as shown in FIG. 47(A), there is a notch band with a size of 3 pieces of carriers in a transmission carrier, and as shown in FIG. 47(B), a measurement value of an unbalance component, which corresponds to each transmission carrier, is obtained. At this time, a detection value of a signal level by FFT processing in the FFT section 24B becomes a value which is shown by a vertical broken line in FIG. 47(C), i.e., a value of a top of a mountain of a real line. Here, it is assumed that N=1 as the number of detection carriers for which level estimation is carried out at one time. The level estimation section 25B obtains a maximum value or an average value in N pieces of detection carriers including a spotlighted detection carrier on a higher frequency side than this, in a direction from low frequency to high frequency on a frequency domain. Here, because of N=1, a detection value of a signal level for the relevant detection carriers is a maximum value or an average value, and this value is used as a representative value for the relevant detection carriers and 3 pieces of non-detection carriers on a higher frequency side than this, and this is set up as the level estimation value M.

In addition, the level estimation section 25B judges whether a detection carrier is located in a notch band or not, with reference to information of the notch band which was stored in the notch information storage section 33B. Here, in case that it is in the notch band, a detection value of a signal level of the nearest detection carrier on a high frequency side which is next to the notch band, or a detection carrier on a low frequency side is used, and this value is used as a representative value for detection carriers in the relevant notch band and 3 pieces of non-detection carriers on a higher frequency side or lower frequency side than this, and this is set up as the level estimation value M. Meanwhile, FIG. 47 shows a case of using a detection value of a signal level for detection carriers on a high frequency side as the level estimation value M.

When the above-described processing is carried out repeatedly in sequence from low frequency to high frequency as to all detection carriers, a level estimation value of each carrier becomes one shown by black points on detection carriers and a thick line extended in a lateral direction in FIG. 47(C). The detection result output section 26B stores a level estimation value of an unbalance component which was obtained by the above-described level estimation, in association with information of frequency etc. of each carrier, and outputs it as a detection result of an unbalance component relating to all carriers.

The wave form generation section 31B controls a transmission level so as to be increased by a predetermined amount in case that a value of an unbalance component of each carrier exceeds the threshold value A, and so as to be decreased by a predetermined amount in case that it is smaller than the threshold value. In this case, a detection result of an unbalance component is less than the threshold value B in a low frequency band (a band which corresponds to FFT number 1), and it exceeds the threshold value A in a high frequency band (a band which corresponds to FFT number 99), and therefore, as shown in FIG. 47(D), a transmission level for carriers in a low frequency band in which an unbalance component was detected less is raised in a transmission carrier after transmission level control, and a transmission level for carriers in a high frequency band in which a number of unbalance components were detected is lowered. By this means, as shown in FIG. 47(E), a transmission level with respect to each carrier is adjusted in such a manner that unbalance components after transmission level control fall in an appropriate range.

Figure 48:
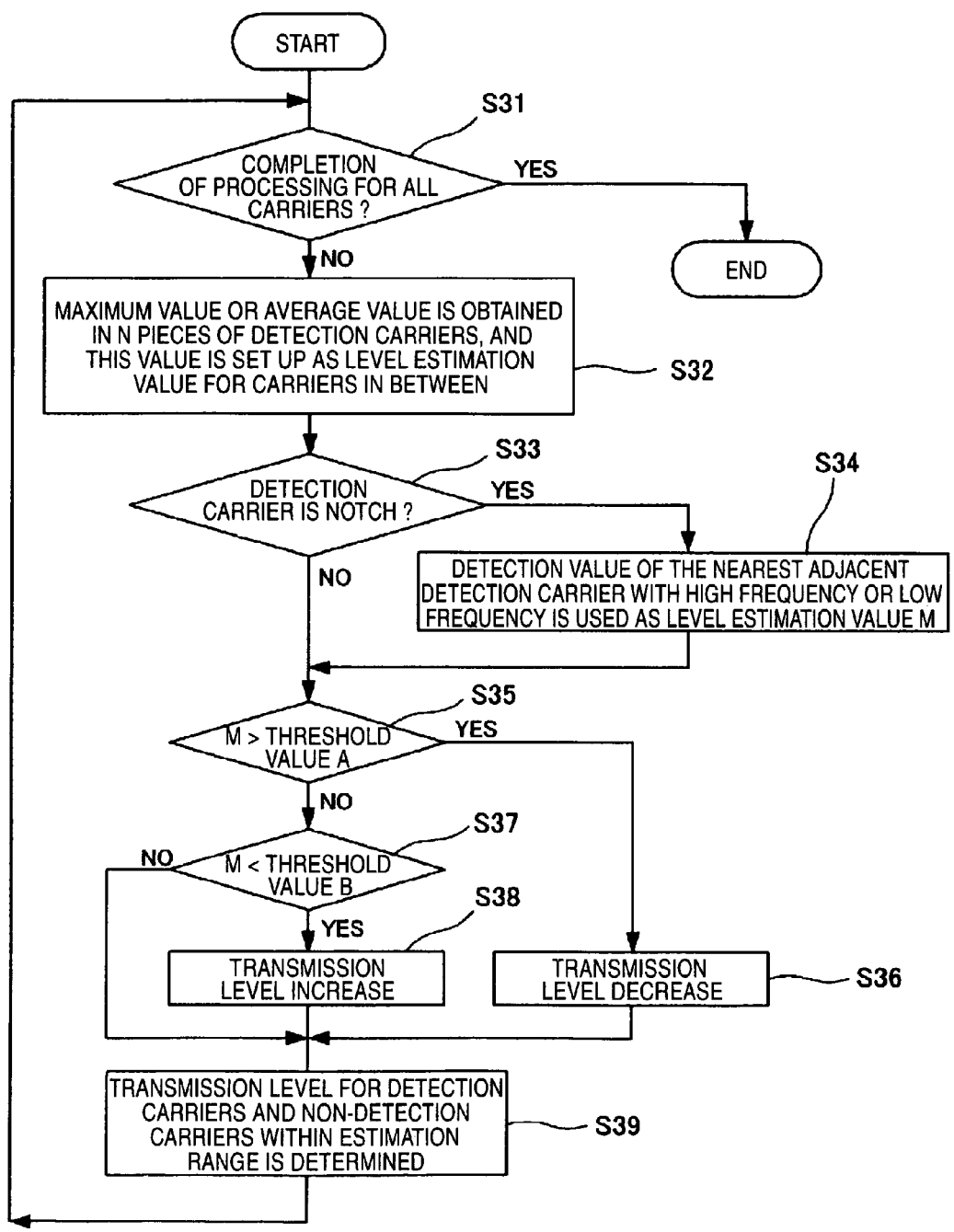
FIG. 48 is a flow chart which shows a processing sequence of the eleventh embodiment of the operations in the level estimation section and the wave form generation section of this embodiment.

FIG. 48 is a flow chart which shows a processing sequence of the eleventh embodiment of operations in the level estimation section 25B and the wave form generation section 31B. Firstly, as to all carriers, it is judged whether processing of unbalance component level estimation and transmission level control was completed or not (step S31), and in case that it is not completed, it moves to level estimation processing by the level estimation section 25B in a next step S32 or later, and in case that it has been completed, this processing is terminated. In the step S32, the level estimation section 25B obtains a maximum value or an average value in N pieces (Here 1 piece) of detection carriers, and sets up this value (here, a detection value of signal level for the relevant detection carriers) as a level estimation value M for the relevant detection carriers and 3 pieces of non-detection carriers up to an adjacent detection carrier on a higher frequency side than this, and sets up this as the level estimation value M.

In addition, the level estimation section 25B judges whether a detection carrier is located in a notch band or not, with reference to information of a notch band (step S33). Here, in case that it is in the notch band, a detection value of a signal level of the nearest adjacent detection carrier on a high frequency, or a detection carrier on a low frequency side is used, and this value is used as a representative value for detection carriers in the relevant notch band and 3 pieces of non-detection carriers on a higher frequency side or lower frequency side than this, and this is set up as the level estimation value M (step S34).

Processing of subsequent steps S35 through S39 are the same as processing of the steps S13 through S17 shown in FIG. 44, and in the wave form generation section 31, a transmission level is adjusted to be increased or decreased, in case that the level estimation value M exceeded the threshold values A, B by judgment of the level estimation value M, the threshold value A and the threshold value B, and it is determined as a transmission level for detection carriers and non-detection carriers in an estimation range.

Meanwhile, the above-described processing example showed an operation of carrying out selection of N pieces of detection carriers, judgment of a notch band, and determination of the level estimation value M, in a direction from low frequency to high frequency, but conversely, it is all right even if it is configured so as to carry out the same processing in a direction from high frequency to low frequency. In addition, it is also all right even if detection values of signal levels in the nearest adjacent detection carriers on both of a high frequency side and a low frequency side level are used to carry out estimation by a maximum value and an average value etc. of them.

By carrying out the processing of the above-described eleventh embodiment, in case that detection carriers are located in a notch band, the level estimation value M for detection carriers and non-detection carriers in this notch band, and non-detection carriers in the vicinity of the notch band is determined by a detection value of a signal level of the nearest detection carrier which is adjacent to an upper part or a lower part of this notch band. On this account, even in case that detection carriers are located in the notch band, a detection value of a signal level outside the notch band is used for level estimation, and it is possible to prevent occurrence of such a matter that level estimation for non-detection carriers outside the notch band is carried out by a detection value of a signal level in the notch band, and it is possible to eliminate such a trouble that a transmission level is controlled to be larger than an appropriate range.

Twelfth Embodiment

Figure 49:
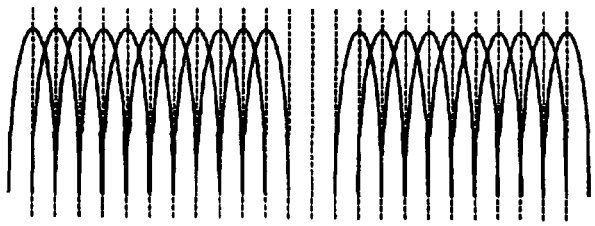
FIGS. 49(a) to 49(e) are views which show a twelfth embodiment of the operations in the level estimation section and the wave form generation section of this embodiment.
Figure 49:
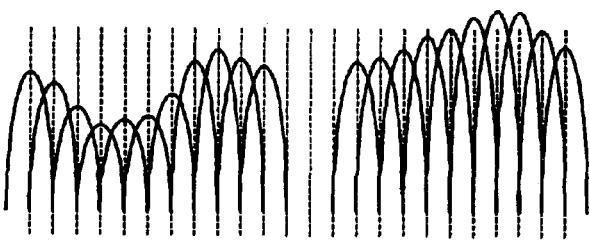

FIG. 49 is a view which shows a twelfth embodiment of operations in the level estimation section 25 and the wave form generation section 331. The twelfth embodiment is of such a thing that, on the occasion of carrying out level estimation of a non-detection carrier, the level estimation value M is set up by using detection values of signal levels in the nearest detection carriers with high frequency and low frequency which are adjacent to this non-detection carrier, and a detection value of a signal level in the detection carrier is used as the level estimation value M as it is, as to detection carriers, and a transmission level of each carrier is controlled by use of these level estimation values M.

In the twelfth embodiment, as shown in FIG. 49(A), there is a notch band with a size of 3 pieces of carriers in a transmission carrier, and as shown in FIG. 49(B), a measurement value of an unbalance component which corresponds to each transmission carrier is obtained. At this time, a detection value of a signal level by FFT processing in the FFT section 24B becomes a value which is shown by a vertical broken line in FIG. 49(C), i.e., a value of a top of a thick line mountain. The level estimation section 25B judges firstly whether a carrier is a detection carrier or not, in order to carry out level estimation processing in a direction from low frequency to high frequency on a frequency domain. Here, in case of a non-detection carrier, detection values of signal levels in the nearest adjacent detection carrier on a high frequency side and a detection carrier on a low frequency side are used, and a larger value among these detection values is set up as the level estimation value M of the relevant non-detection carrier. In addition, in case of a detection carrier, a detection value of a signal level in the detection carrier is set up as the level estimation value M. Meanwhile, it is all right even if an average value of detection carriers on a high frequency side and a low frequency side is used as the level estimation value M of a non-detection carrier.

Figure 49C:
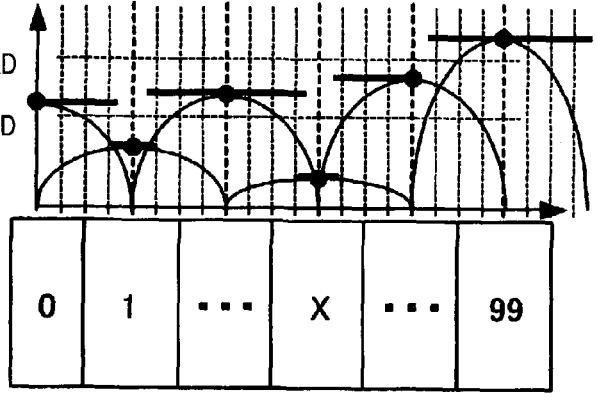
Figure 49:
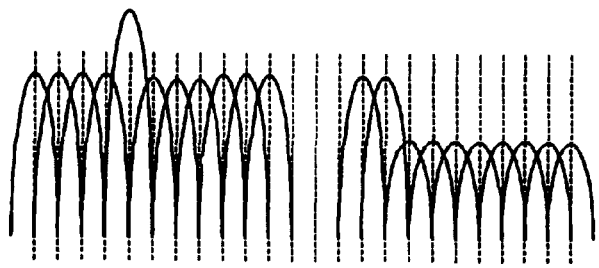
Figure 49:
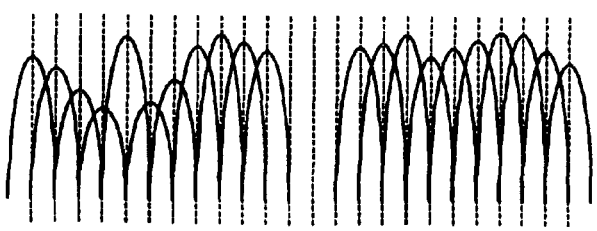

When the above-described processing is carried out repeatedly in sequence from low frequency to high frequency as to all carriers, a level estimation value of each carrier becomes one shown by black points on detection carriers and a thick line extended in a lateral direction in FIG. 49(C). The detection result output section 26B stores a level estimation value of an unbalance component which was obtained by the above-described level estimation, in association with information of frequency etc. of each carrier, and outputs it as a detection result of an unbalance component relating to all carriers.

The wave form generation section 31B controls so as to increase a transmission level by a predetermined amount in case that a value of an unbalance component of each carrier exceeds the threshold value A, and controls so as to decrease a transmission level by a predetermined amount in case that it is smaller than the threshold value B. In this case, a detection result of an unbalance component is less than the threshold value B in a low frequency band (a band which corresponds to FFT number 1), and it exceeds the threshold value A in a high frequency band (a band which corresponds to FFT number 99), and therefore, as shown in FIG. 49(D), a transmission level for carriers in a low frequency band in which an unbalance component was detected less is raised in a transmission carrier after transmission level control, and a transmission level for carriers in a high frequency band in which a number of unbalance components were detected is lowered. By this means, as shown in FIG. 49(E), a transmission level with respect to each carrier is adjusted in such a manner that unbalance components after transmission level control fall in an appropriate range.

Figure 50:
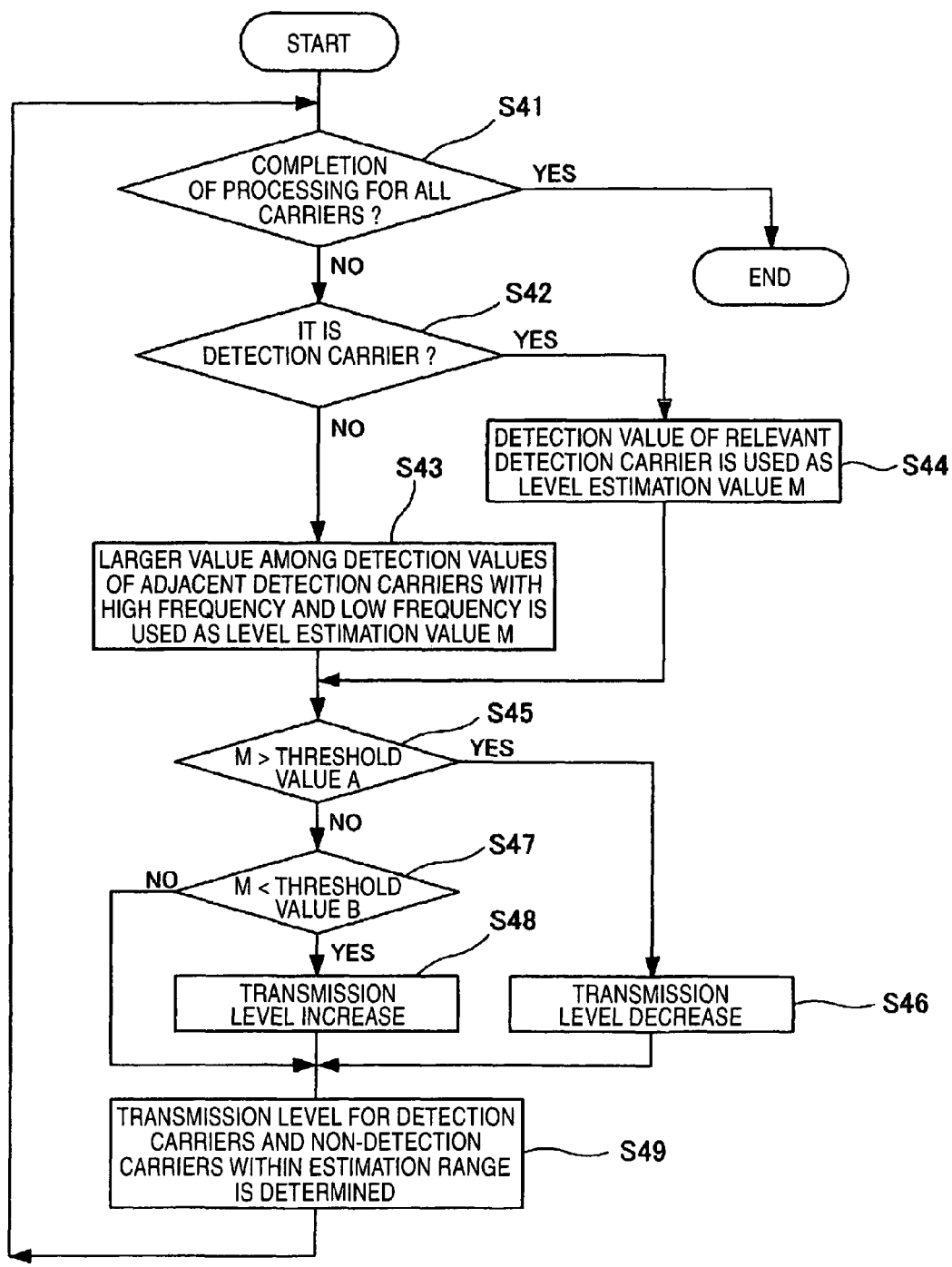
FIG. 50 is a flow chart which shows a processing sequence of the twelfth embodiment of the operations in the level estimation section and the wave form generation section of this embodiment

FIG. 50 is a flow chart which shows a processing sequence of the twelfth embodiment of operations in the level estimation section 25B and the wave form generation section 31B. Firstly, as to all carriers, it is judged whether processing of unbalance component level estimation and transmission level control was completed or not (step S41), and in case that it is not completed, it moves to level estimation processing by the level estimation section 25B in a next step S42 or later, and in case that it has been completed, this processing is terminated. In the step S42, the level estimation section 25B judges whether a carrier is a detection carrier or not. Here, in case that a carrier is a non-detection carrier (it is not a detection carrier), detection values of signal levels in the nearest adjacent detection carrier on a high frequency side and a detection carrier on a low frequency side are used, and a larger value among these detection values is set up as the level estimation value M of the relevant non-detection carrier (step S43). In addition, in case that a carrier is a detection carrier, a detection value of a signal level in the detection carrier is set up as the level estimation value M (step S44).

Processing of subsequent steps S45 through S49 are the same as processing of the steps S13 through S17 shown in FIG. 44, and in the wave form generation section 31, a transmission level is adjusted to be increased or decreased, in case that the level estimation value M exceeded the threshold values A, B by judgment of the level estimation value M, the threshold value A and the threshold value B, and it is determined as a transmission level for detection carriers and non-detection carriers in an estimation range.

Meanwhile, the above-described processing example showed an operation of carrying out determination of the level estimation value M, in a direction from low frequency to high frequency, but conversely, it is all right even if it is configured so as to carry out the same processing in a direction from high frequency to low frequency.

By carrying out the processing of the above-described twelfth embodiment, the level estimation value M for non-detection carriers is determined by a detection value of a signal level in the nearest upper and lower detection carrier. On this account, even in case that there exists a notch band, it is possible to prevent occurrence of such a matter that level estimation for inappropriate non-detection carriers is carried out only by a detection value of a signal level in the notch band. By this means, it is possible to fairly carry out transmission level control by use of a detection result of an unbalance component, and it is possible to eliminate such a trouble that a transmission level is controlled to be larger than an appropriate range.

In this twelfth embodiment, there is no need to use information of a notch band, and it is possible to omit means for storing notch information. In addition, it is possible to carry out level estimation of an unbalance component of each carrier and transmission level control without being dependent on a width of a notch band, and it is possible to respond to even such a case that a notch band is variable. In addition, it is possible to carry out much finer transmission level control. In this regard, however, in case that there exists only a non-detection carrier in a band which was sandwiched by detection carriers that exit in a notch band, a transmission level of a relevant non-detection carrier is controlled to be larger than an appropriate value in this twelfth embodiment, and therefore, the twelfth embodiment is applicable in such a case that the suchlike setup of the notch band is not carried out. Meanwhile, it is also possible to do such a thing that, as to a portion in which the above-described status is assumed, processing of other ninth through eleventh embodiments is used, and as to other portions, processing of the twelfth embodiment is used.

As described above, according to this twelfth embodiment, by doing such a matter that a detection value of a signal level of a detection carrier which exists in a notch band is not used for level estimation of an unbalance component of a non-detection carrier, it is possible to prevent occurrence of such a matter that a level estimation value of an unbalance component becomes a low value which corresponds to such a status that a carrier is not transmitted, and it is possible to obtain an appropriate level estimation value. By this means, it becomes possible to fairly carry out transmission level control of each carrier in multi-carrier communication.

It should be understood that various alternatives to the structures described herein may be employed in practicing the present invention. It is intended that the following claims define the invention and that the structure within the scope of these claims and their equivalents be covered thereby.

This application is based upon and claims the benefit of priorities of Japanese Patent Application Nos. 2004-373508 filed on Dec. 24, 2004, 2004-378960 filed on Dec. 28, 2005, and 2004-380465 filed on Dec. 28, 2004, the contents of which are incorporated herein by reference in its entirety.

INDUSTRIAL APPLICABILITY

According to the present invention, it is provided a line status detection apparatus or a line status detection method which enables detecting a balance status of a transmission line in a balance communication system, easily with high accuracy. Additionally, a communication apparatus of a balance communication system can control a balance status of a transmission line on the basis of a detection result, and enables improving balancing.

The invention claimed is:

1. A communication apparatus for carrying out data transmission by use of a pair of conductors, comprising:
   a line status detection apparatus configured to detect a balance status of the pair of conductors, the line detection apparatus comprising
   a signal transmission section which transmits a reference timing signal, a pilot signal, and a transmission signal to another communication apparatus through said pair of conductors, the signal transmission section transmits the pilot signal between the reference timing signal and the transmission signal, a signal level of said pilot signal being known
   an unbalance component detection section which detects an unbalance component between said conductors, the unbalance component indicating the balance status of the pair of conductors, based on said pilot signal transmitted to said pair of conductors by said signal transmission section,
   a transmission control section which controls said transmission signal based on said unbalance component detected by said unbalance component detection section so as to reduce said unbalance component of said pair of conductors,
   a time-frequency transformation section which calculates a signal level of said unbalance component detected by said unbalance component detection section, on a frequency domain, through the use of time-frequency transformation,
   a signal level estimation section which estimates a signal level of an estimated unbalance component which is not calculated by said time-frequency transformation section, by use of a signal level of the unbalance component calculated by the time-frequency transformation section, and
   a wave form generation section which generates a multi-carrier communication signal, on the basis of the signal level of estimated unbalance component estimated by said signal level estimation section;
   wherein said communication apparatus transmits multi-carrier communication signals, and
   said signal level estimation section estimates a signal level of said estimated unbalance component, around a notch band in which a predetermined carrier is not transmitted, by use of the signal level of the unbalance component calculated by said time-frequency transformation section.

2. The communication apparatus as set forth in claim 1, wherein said unbalance component detection section detects the unbalance component between the conductors directly.

3. The communication apparatus as set forth in claim 1, wherein said pair of conductors are a power line.

4. The communication apparatus as set forth in claim 3, wherein said pilot signal transmission section transmits said pilot signal at a zero cross point of an alternating voltage applied to said power line or in the vicinity thereof.

5. The communication apparatus as set forth in claim 1, wherein said pilot signal is composed of a carrier signal which is used in a frequency band for communication.

6. The communication apparatus as set forth in claim 5, wherein said pilot signal is composed of a plurality of said carrier signals, and adjacent carrier signals among said plurality of carrier signals are signals which are orthogonal to each other.

7. The communication apparatus as set forth in claim 1, wherein said pilot signal is composed of a plurality of carrier signals which are selected discretely, among said carrier signals which are used in a frequency band.

8. The communication apparatus as set forth in claim 7, further comprising: a calculation section which calculates said unbalance component of the frequency band including frequency other than frequency of said pilot signal, on the basis of said unbalance component detected by said unbalance component detection section.

9. The communication apparatus as set forth in claim 1 wherein said pilot signal is a reference signal which is transmitted for auto gain control (AGC) on a reception side.

10. The communication apparatus as set forth in claim 1, wherein said pilot signal is a reference signal for estimating a transmission characteristic of said pair of conductors.

11. The communication apparatus as set forth in claim 1, wherein said pilot signal is a reference signal for demodulation on a reception side.

12. The communication apparatus as set forth in claim 1, wherein said pilot signal is a header signal which shows a head of the transmission signal.

13. The communication apparatus as set forth in claim 1, wherein the transmission control section controls electric power of the transmission signal which transmits through said pair of conductor, on the basis of said unbalance component detected by said unbalance component detection section of said line status detection apparatus.

14. The communication apparatus as set forth in claim 1, wherein said communication apparatus transmits multi-carrier communication signals, and the communication apparatus comprises:
a digital processing section which carries out digital processing of at least one of reception data from said pair of conductors and transmission data which is transmitted to said pair of conductors, and
wherein, said digital processing section has a first time-frequency transformation section which carries out time-frequency transformation, and
digital data of an unbalance component, which is detected by said unbalance component detection section is inputted to said digital processing section, and
said first time-frequency transformation section carries out time-frequency transformation of said digital data which is inputted to said digital processing section, and calculates a value on a frequency domain of the unbalance component which is detected by said unbalance component detection section and inputted to said digital processing section.

15. The communication apparatus as set forth in claim 14, wherein said first time-frequency transformation section is used for calculation of time-frequency transformation in any one of multi-carrier modulation at the time of transmission and multi-carrier demodulation at the time of reception, and carries out time-frequency transformation of said digital data when said first time-frequency transformation section does not carry out said multi-carrier modulation or demodulation.

16. The communication apparatus as set forth in claim 14, wherein said digital processing section further has a second time-frequency transformation section which carries out time-frequency transformation, and
at the time of reception, one time-frequency transformation section among said first time-frequency transformation section and said second time-frequency transformation section carries out time-frequency transformation of a real part component of said reception data, and the other time-frequency transformation section carries out time-frequency transformation about an imaginary part of said reception data, and
at the time of transmission, said first time-frequency transformation section carries out time-frequency transformation of said digital data, and said second time-frequency transformation section carries out time-frequency transformation of said transmission data.

17. The communication apparatus as set forth in claim 1, wherein in case that a detected carrier, whose signal level of said unbalance component is calculated by said time-frequency transformation section, is located in said notch band, said signal level estimation section carries out estimation of a signal level of an undetected carrier which is such a carrier that a signal level of said estimated unbalance component is not calculated by said time-frequency transformation section, by use of a signal level of a detected carrier which exists outside of said notch band which is adjacent to or in the vicinity of said notch band.

* * * * *